(12) United States Patent
Islam et al.

(10) Patent No.: US 12,165,361 B2
(45) Date of Patent: Dec. 10, 2024

(54) METHOD AND SYSTEM FOR PERFORMING AUTOMATIC CAMERA CALIBRATION

(71) Applicant: MUJIN, INC., Tokyo (JP)

(72) Inventors: Russell Islam, Tokyo (JP); Xutao Ye, Tokyo (JP)

(73) Assignee: MUJIN, INC., Tokyo (JP)

( * ) Notice: Subject to any disclaimer, the term of this patent is extended or adjusted under 35 U.S.C. 154(b) by 0 days.

(21) Appl. No.: 17/956,274

(22) Filed: Sep. 29, 2022

(65) Prior Publication Data

US 2023/0025684 A1    Jan. 26, 2023

Related U.S. Application Data

(63) Continuation of application No. 16/871,361, filed on May 11, 2020, now Pat. No. 11,508,088.

(60) Provisional application No. 62/969,673, filed on Feb. 4, 2020.

(51) Int. Cl.
*G06T 7/80* (2017.01)
*B25J 9/16* (2006.01)

(52) U.S. Cl.
CPC .............. *G06T 7/80* (2017.01); *B25J 9/1697* (2013.01)

(58) Field of Classification Search
CPC ............. G06T 7/80; G06T 2207/10016; G06T 2207/30208; G06T 7/0004; G06T 7/33; G06T 7/73; G06T 7/85; G06T 2207/10012; G06T 2207/30244; B25J 9/1697; G05B 2219/37009; G05B 2219/39008
See application file for complete search history.

(56) References Cited

U.S. PATENT DOCUMENTS

| | | | |
|---|---|---|---|
| 11,508,088 B2* | 11/2022 | Islam | B25J 9/1697 |
| 2012/0056982 A1 | 3/2012 | Katz et al. | |
| 2014/0100694 A1* | 4/2014 | Rueckl | B25J 9/1692 700/254 |
| 2014/0340508 A1* | 11/2014 | Yamamoto | B23Q 17/2233 348/94 |

(Continued)

FOREIGN PATENT DOCUMENTS

| | | |
|---|---|---|
| CN | 101867703 A | 10/2010 |
| CN | 103827917 A | 5/2014 |

(Continued)

*Primary Examiner* — Molly Wilburn
(74) *Attorney, Agent, or Firm* — MEDLER FERRO WOODHOUSE & MILLS PLLC

(57) ABSTRACT

A system and method for performing automatic camera calibration is provided. The system receives a calibration image, and determines a plurality of image coordinates for representing respective locations at which a plurality of pattern elements of a calibration pattern appear in a calibration image. The system determines, based on the plurality of image coordinates and defined pattern element coordinates, an estimate for a first lens distortion parameter of a set of lens distortion parameters, wherein the estimate for the first lens distortion parameter is determined while estimating a second lens distortion parameter of the set of lens distortion parameters to be zero, or is determined without estimating the second lens distortion parameter. The system determines, after the estimate of the first lens distortion parameter is determined, an estimate for the second lens distortion parameter based on the estimate for the first lens distortion parameter.

20 Claims, 35 Drawing Sheets

(56) References Cited

U.S. PATENT DOCUMENTS

| | | | |
|---|---|---|---|
| 2019/0364206 A1* | 11/2019 | Dal Mutto | H04N 23/698 |
| 2020/0380729 A1* | 12/2020 | Ikeda | G06T 3/0062 |
| 2021/0110575 A1* | 4/2021 | Hu | G06F 3/14 |

FOREIGN PATENT DOCUMENTS

| | | |
|---|---|---|
| CN | 104703762 A | 6/2015 |
| CN | 105308503 A | 2/2016 |
| CN | 108140247 A | 6/2018 |
| CN | 110378879 A | 10/2019 |
| JP | 2000111523 A | 4/2000 |
| JP | 2007192832 A | 8/2007 |
| JP | 2015-088029 A | 5/2015 |
| JP | 2015-139126 A | 7/2015 |
| JP | 2015530276 A | 10/2015 |
| WO | 2012056982 A1 | 5/2014 |

\* cited by examiner

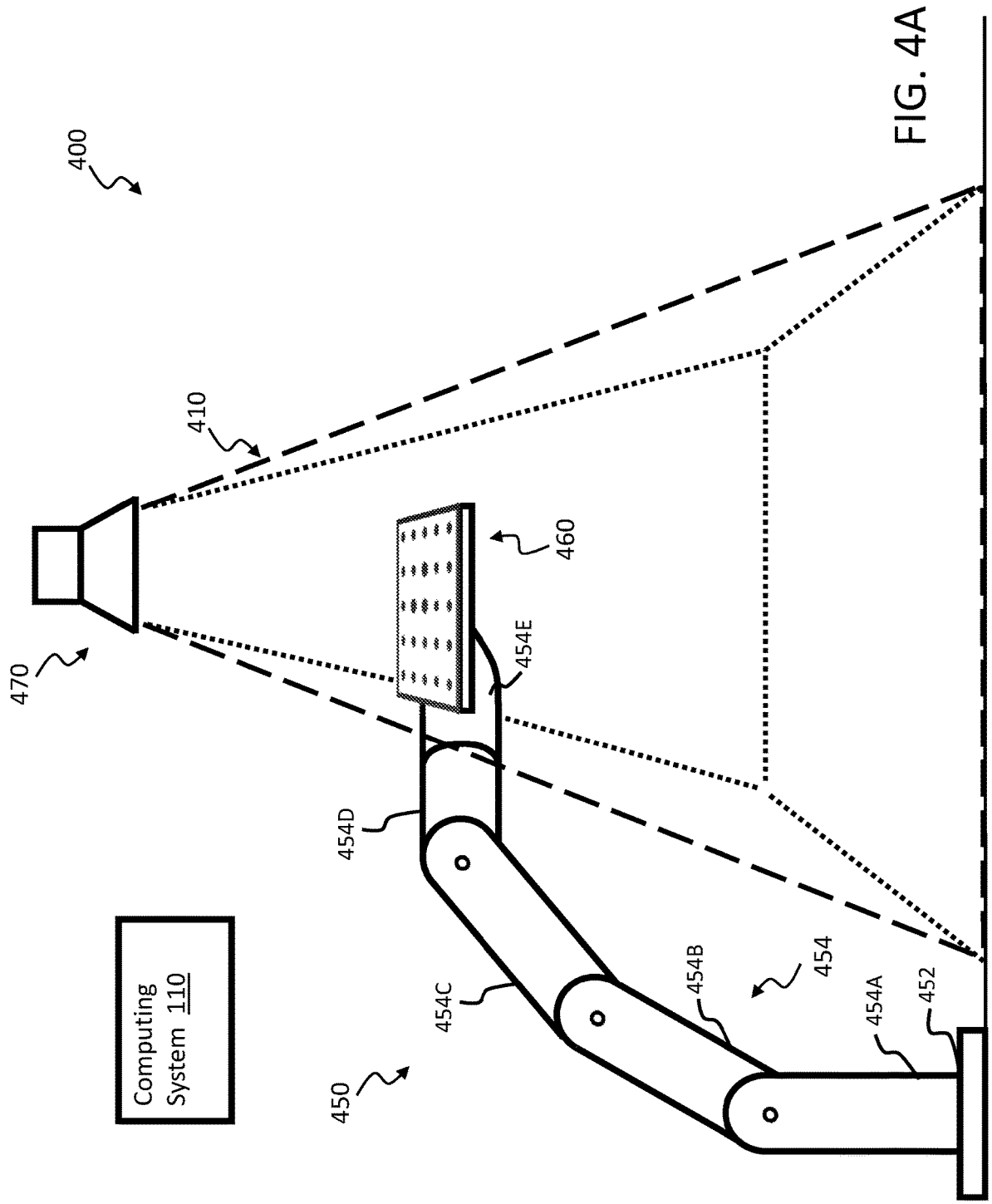

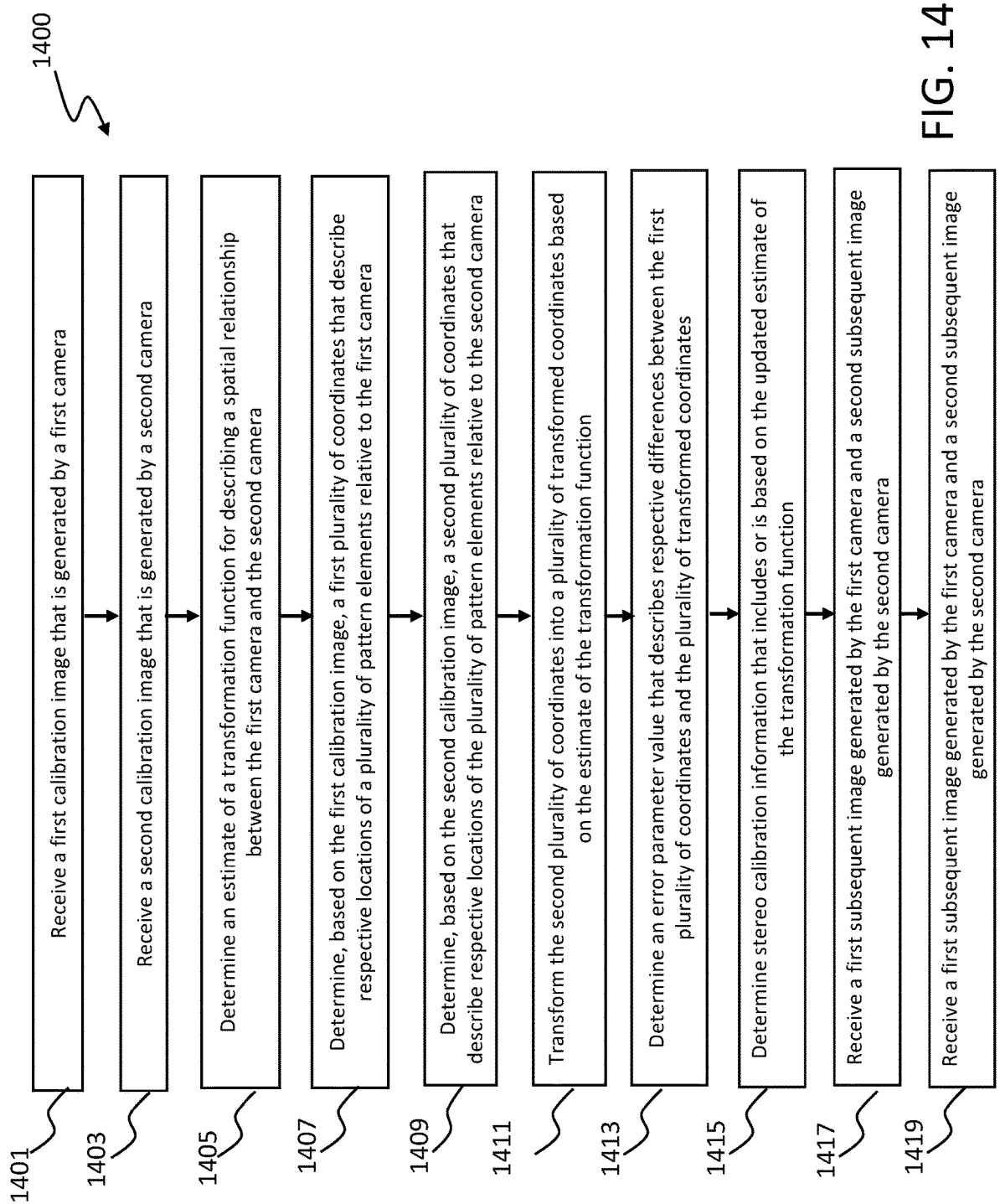

METHOD AND SYSTEM FOR PERFORMING AUTOMATIC CAMERA CALIBRATION

CROSS-REFERENCE TO RELATED APPLICATIONS

The present application is a continuation application of U.S. patent application Ser. No. 16/871,361, filed May 11, 2020, which claims priority to U.S. Provisional Application No. 62/969,673, entitled "A Robotic System with Calibration Mechanism" and filed on Feb. 4, 2020, the entire contents of each of which is incorporated herein by reference in its entirety.

FIELD OF THE INVENTION

The present invention is directed to a method and system for performing automatic camera calibration.

BACKGROUND

As automation becomes more common, robots are being used in more environments, such as in warehousing and manufacturing environments. For instance, robots may be used to load items onto or off of a pallet in a warehouse, or to pick up objects from a conveyor belt in a factory. The movement of the robot may be fixed, or may be based on an input, such as an image taken by a camera in the warehouse or factory. In the latter situation, calibration may be performed so as to determine a property of the camera, and to determine a relationship between the camera and an environment in which the robot is located. The calibration may be referred to as camera calibration, and may generate camera calibration information that is used to control the robot based on images captured by the camera. In some implementations, the camera calibration may involve manual operation by a person, such as manual determination of a property of the camera.

SUMMARY

One aspect of the embodiments herein relates to a computing system, a method performed by the computing system, or a non-transitory computer-readable medium having instructions for causing the computing system to perform the method. The computing system may comprise a communication interface configured to communicate with a camera having a camera field of view, and comprise a control circuit. The control circuit may execute the method when the camera has generated a calibration image for a calibration pattern in the camera field of view, and when the calibration pattern includes a plurality of pattern elements having respective defined pattern element coordinates in a pattern coordinate system. More specifically, the control circuit may perform camera calibration by: receiving the calibration image; determining a plurality of image coordinates for representing respective locations at which the plurality of pattern elements appear in the calibration image; determining, based on the plurality of image coordinates and the defined pattern element coordinates, an estimate for a first lens distortion parameter of a set of lens distortion parameters, wherein the estimate for the first lens distortion parameter is determined while estimating a second lens distortion parameter of the set of lens distortion parameters to be zero, or is determined without estimating the second lens distortion parameter; determining, after the estimate of the first lens distortion parameter is determined, an estimate for the second lens distortion parameter based on the estimate for the first lens distortion parameter; and determining camera calibration information that includes respective estimates for the set of lens distortion parameters.

One aspect of the embodiments herein relates to relates to a computing system, a method performed by the computing system, or a non-transitory computer-readable medium having instructions for causing the computing system to perform the method. The computing system may comprise a communication interface configured to communicate with a first camera having a first camera field of view and a second camera having a second camera field of view, and comprises a control circuit. The control circuit may perform the method when a calibration pattern having a plurality of pattern elements is or has been in the first camera field of view and in the second camera field of view, and when the first camera has generated a first calibration image for the calibration pattern, and the second camera has generated a second calibration image for the calibration pattern. More specifically, the control circuit may perform the following: receive the first calibration image; receive a second calibration image; determine an estimate of a transformation function for describing a spatial relationship between the first camera and the second camera; determine, based on the first calibration image, a first plurality of coordinates that describe respective locations of the plurality of the pattern elements relative to the first camera; determine, based on the second calibration image, a second plurality of coordinates that describe respective locations of the plurality of the pattern elements relative to the second camera; transform, based on the estimate of the transformation function, the second plurality of coordinates into a plurality of transformed coordinates that are relative to the first camera; determine an error parameter value that describes respective differences between the first plurality of coordinates and the plurality of transformed coordinates.

BRIEF DESCRIPTION OF THE DRAWINGS

The foregoing and other features, objects and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIGS. 4A and 4B depict an example system in which camera calibration is performed, according to an embodiment herein.

FIG. 14 depicts a flow diagram that illustrates a method for determining stereo calibration information, according to an embodiment herein.

DETAILED DESCRIPTION

Figure 1A:
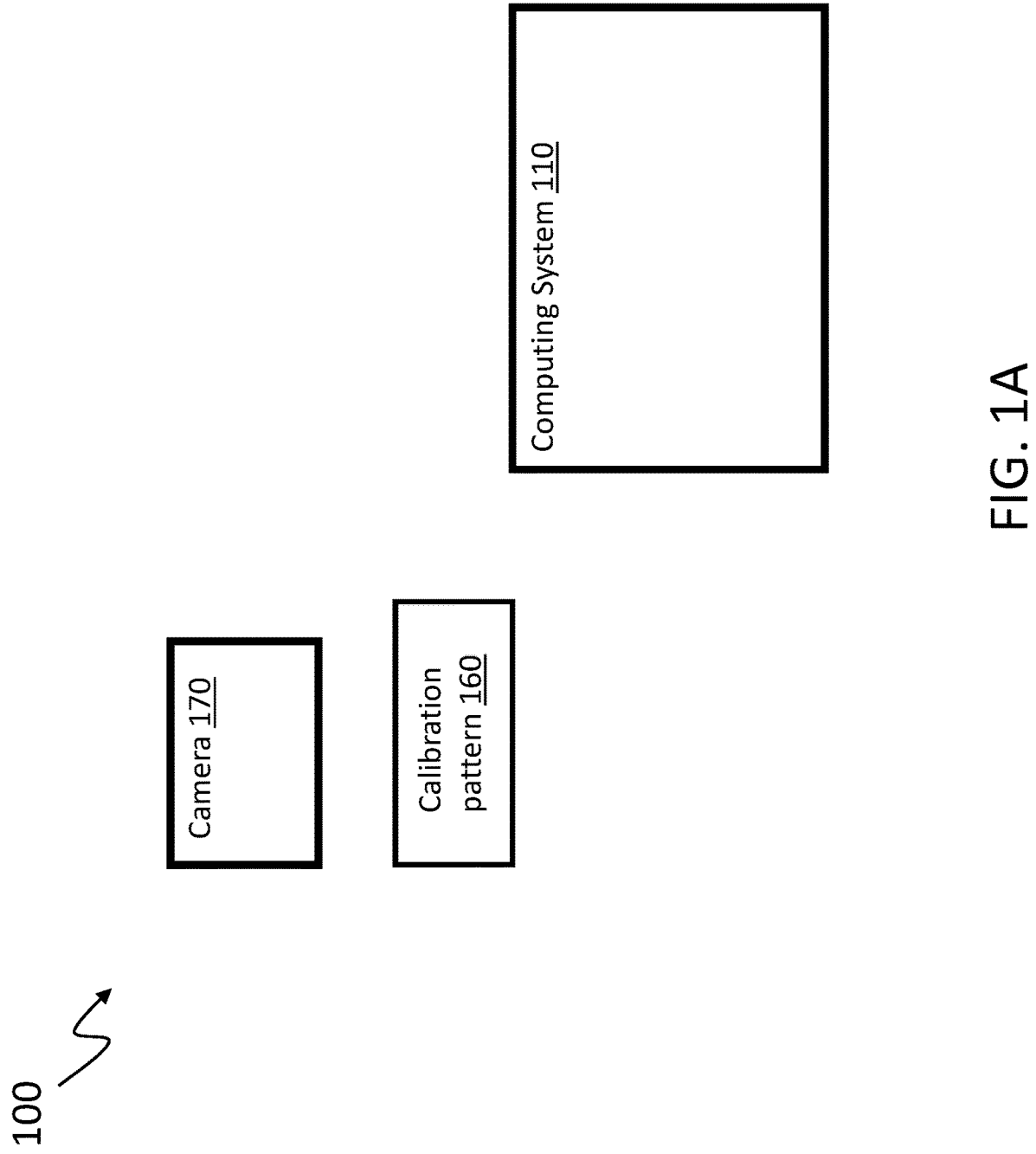
FIGS. 1A-1C depict block diagrams of systems in which camera calibration is performed, according to embodiments herein.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

One aspects of the present application relates to improving an accuracy of camera calibration, such as intrinsic camera calibration. In an embodiment, the intrinsic camera calibration may involve determining respective estimates for lens distortion parameters and/or projection parameters. In some implementations, all lens distortion parameters for a camera calibration operation may be estimated in a single stage. However, determining respective estimates for the lens distortion parameters in a single stage may reduce an accuracy of such estimates because the nonlinearity introduced by lens distortion may be complex and difficult to accurately approximate. Thus, one aspect of the present application relates to estimating the lens distortion parameters in multiple stages (also referred to as multiple rounds).

In some cases, the multiple stages may be arranged as a sequence of stages, and an estimate outputted by one stage may be used as an initial estimate or other input for a next stage. In some cases, one or more of the multiple stages may apply a simplification to a lens distortion model (and/or projection model) used in the camera calibration. For example, a first stage of the multiple stages may assume that some lens distortion parameters have negligible effect and can be ignored in that stage, such as by setting such lens distortion parameters to zero in that stage, or by using a simplified distortion function. In some cases, earlier stages of the multiple stages may use a simpler lens distortion model to focus on estimating, e.g., a lens distortion parameter that accounts for a large portion or large component of the lens distortion, while later stages may increase a complexity of the lens distortion model to estimate a greater number of lens distortion parameters, which may account for a remaining portion of the lens distortion. In some cases, a later stage may fix a particular camera calibration parameter(s) (e.g., a lens distortion parameter or projection parameter) in value so as to focus on updating respective estimates for other camera calibration parameters (e.g., other lens distortion parameters).

One aspect of the present application relates to improving an accuracy of stereo camera calibration, and more specifically to determining an error parameter value that characterizes an amount of error in stereo camera calibration, and improving the accuracy of the stereo camera calibration by reducing the error parameter value. In some cases, performing the stereo camera calibration may involve determining an estimate of a transformation function that describes a spatial relationship between a first camera and a second camera. In such cases, the error parameter value may be determined for the estimate of the transformation function. In an embodiment, the transformation function may be used to determine a plurality of transformed coordinates, which may be compared against another plurality of coordinates to determine an error parameter value. As discussed below in more detail, the error parameter value may include a re-projection error, a reconstruction error, a reconstruction error angle, and/or some other error parameter value.

FIG. 1A illustrates a block diagram of a system 100 for performing automatic camera calibration. The system 100 includes a computing system 110 and a camera 170. In an embodiment, the system 110 may further include a calibration pattern 160. In this example, the camera 170 may be configured to generate a calibration image, which is an image representing the calibration pattern 160, and the computing system 110 may be configured to perform camera calibration based on the calibration image. In an embodiment, the computing system 110 and the camera 170 may be located at the same premises (e.g., the same warehouse). In an embodiment, the computing system 110 and the camera 170 may be located remotely from each other. The computing system 110 may be configured to receive the calibration image directly from the camera 170, such as via a wired connection, or indirectly from the camera 170, such as via a storage device located between the camera 170 and the computing system 110. In an embodiment, the camera 170 may be any type of image sensing device that is configured to generate or otherwise acquire an image (or, more generally, image data) that represents a scene in a camera field of view. The camera 170 may be, e.g., a color image camera, a grayscale image camera, a depth-sensing camera (e.g., a time-of-flight (TOF) or structured light camera), or any other camera (the term "or" in this disclosure may be used to refer to "and/or").

Figure 1B:
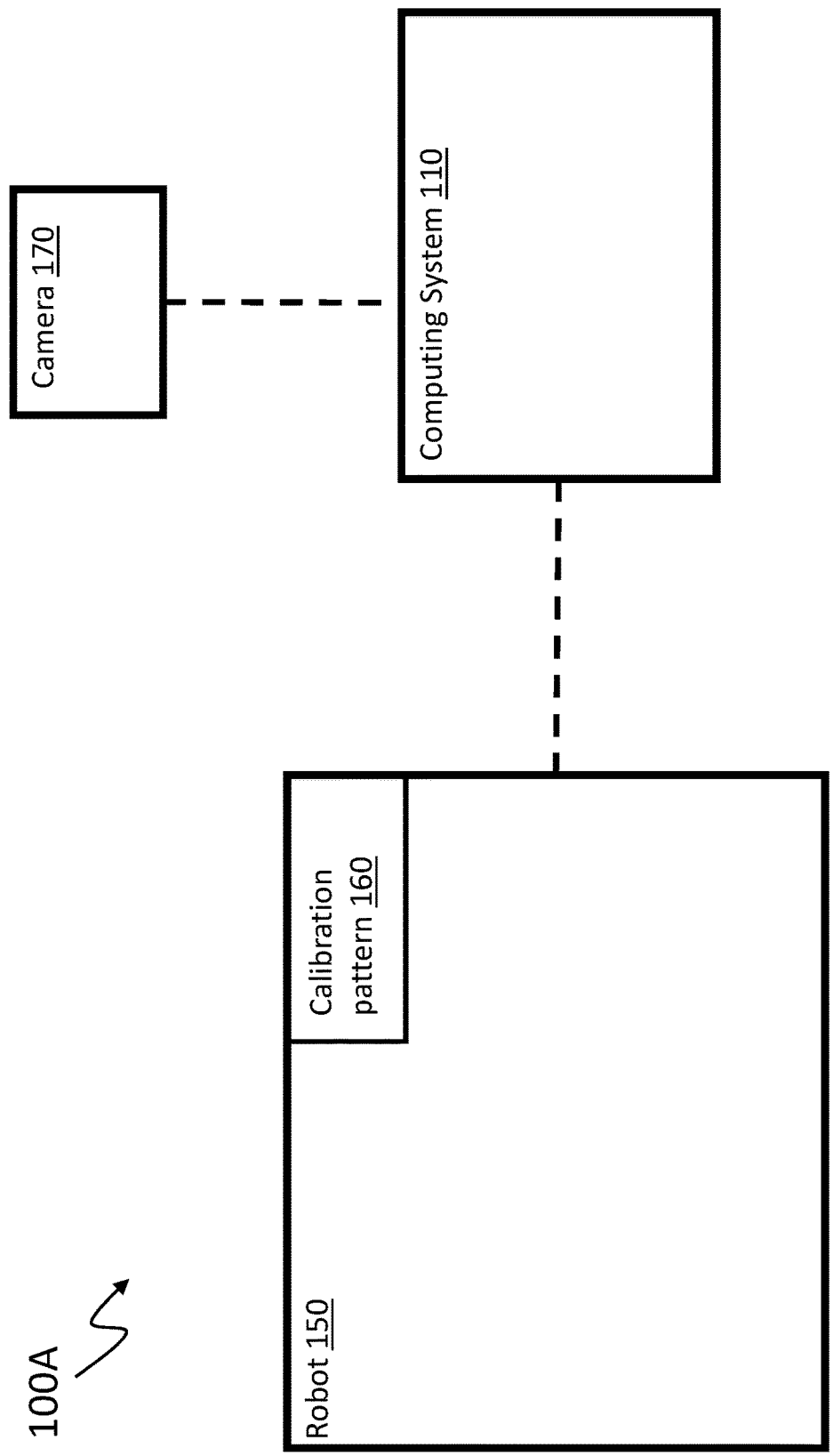

In an embodiment, the system 100 may be a robot operation system 100A, which is depicted in FIG. 1B. The robot operation system 100A includes the computing system 110, the camera 170, and a robot 150 on which the calibration pattern 160 is disposed. In some cases, the computing system 110 may be configured to control the robot 150, and may be referred to in those cases as a robot control system or a robot controller. In an embodiment, the robot operation system 100A may be located within a warehouse, a manufacturing plant, or other premises. As stated above, the computing system 110 may be configured to perform camera calibration, such as by determining camera calibration information. In the example of FIG. 1B, the camera calibration information may later be used to control the robot 150. In some cases, the computing system 110 in FIG. 1B is configured both to perform the camera calibration and to control the robot 150 based on the calibration information. In some cases, the computing system 110 may be dedicated to performing the camera calibration, and may communicate the calibration information to another computing system that is dedicated to controlling the robot 150. For instance, the robot 150 may be positioned based on images generated by the camera 170 and on the camera calibration information. In some cases, the computing system 110 may be part of a vision system that acquires images of an environment in which the camera 170 is located. The robot 150 may be, e.g., a de-vanning robot, a de-palletizing robot, or any other robot.

In an embodiment, the computing system 110 of FIG. 1B may be configured to communicate via a wired or wireless communication with the robot 150 and/or the camera 170. For instance, the computing system 110 may be configured to communicate with the robot 150 and/or the camera 170 via a RS-232 interface, a universal serial bus (USB) interface, an Ethernet interface, a Bluetooth® interface, a near-field communication (NFC) interface, an IEEE 802.11 interface, an IEEE 1394 interface, or any combination thereof. In an embodiment, the computing system 110 may be configured to communicate with the robot 150 and/or the camera 170 via a local computer bus, such as a peripheral component interconnect (PCI) bus or small computer system interface (SCSI) bus.

In an embodiment, the computing system 110 of FIG. 1B may be separate from the robot 150, and may communicate with the robot 150 via the wireless or wired connection discussed above. For instance, the computing system 110 may be a standalone computer that is configured to communicate with the robot 150 and the camera 170 via a wired connection or wireless connection. In an embodiment, the computing system 110 may be an integral component of the robot 150, and may communicate with other components of the robot 150 via the local computer bus discussed above. In some cases, the computing system 110 may be a dedicated control system (also referred to as a dedicated controller) that controls only the robot 150. In other cases, the computing system 110 may be configured to control multiple robots, including the robot 150. In an embodiment, the computing system 110, the robot 150, and the camera 170 are located at the same premises (e.g., warehouse). In an embodiment, the computing system 110 may be remote from the robot 150 and the camera 170, and may be configured to communicate with the robot 150 and the camera 170 via a network connection (e.g., local area network (LAN) connection).

In an embodiment, the computing system 110 of FIG. 1B may be configured to access and to process calibration images, which are images of the calibration pattern 160. The computing system 110 may access the calibration images by retrieving or, more generally receiving, the calibration images from the camera 170 or from another source, such as from a storage device or other non-transitory computer-readable medium on which the calibration images are stored. In some instances, the computing system 110 may be configured to control the camera 170 to capture or otherwise generate such images. For example, the computing system 110 may be configured to generate a camera command that causes the camera 170 to generate an image that captures a scene in a field of view of the camera 170 (also referred to as a camera field of view), and to communicate the camera command to the camera 170 via the wired or wireless connection. The same command may cause the camera 170 to also communicate the image (as image data) back to the computing system 110, or more generally to a storage device accessible by the computing system 110. Alternatively, the computing system 110 may generate another camera command that causes the camera 170, upon receiving the camera command, to communicate an image(s) it has captured to the computing system 110. In an embodiment, the camera 170 may automatically capture an image of a scene in its camera field of view, either periodically or in response to a defined triggering condition, without needing a camera command from the computing system 110. In such an embodiment, the camera 170 may also be configured to automatically, without a camera command from the computing system 110, communicate the image to the computing system 110 or, more generally, to a storage device accessible by the computing system 110.

In an embodiment, the computing system 110 of FIG. 1B may be configured to control movement of the robot 150 via movement commands that are generated by the computing system 110 and communicated over the wired or wireless connection to the robot 150. The movement commands may cause the robot to move the calibration pattern 160. The calibration pattern 160 may be permanently disposed on the robot 150, or may be a separate component that can be attached to and detached from the robot 150.

Figure 1C:
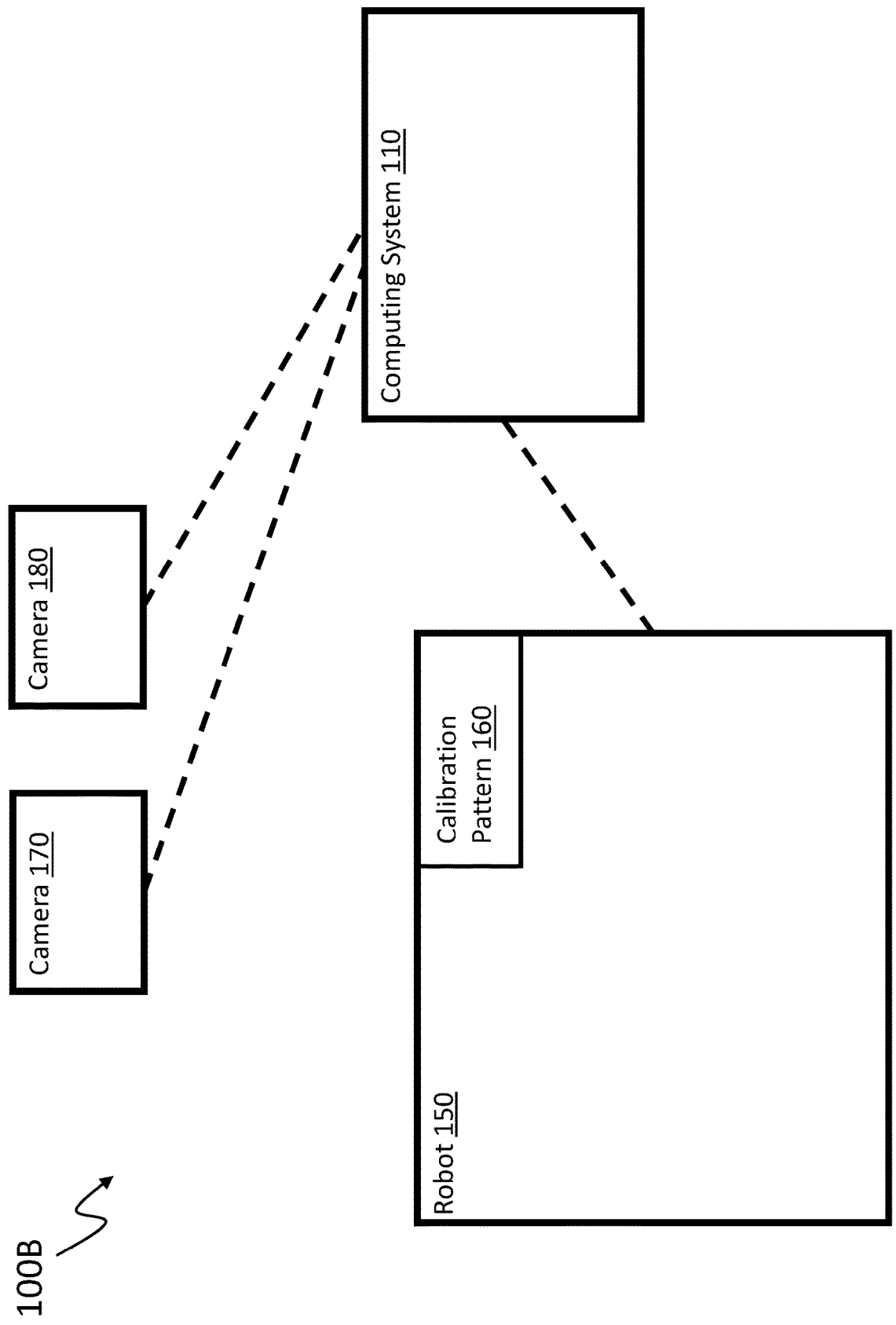

In an embodiment, the computing system 110 may be configured to receive respective images from multiple cameras. For instance, FIG. 1C illustrates a robot operation system 100B that is an embodiment of the robot operation system 100A. The system 100B includes multiple cameras, such as camera 170 and camera 180. The cameras 170, 180 may be the same type of camera, or may be different types of cameras. In some instances, the cameras 170, 180 may have a fixed relative position and/or relative orientation. For example, the cameras 170, 180 may both be rigidly attached to a common mounting frame, which may cause the two cameras 170, 180 to remain stationary relative to each other.

In an embodiment, the robot control system 110 of FIG. 1C may be configured to both receive images from camera 170 and receive images from camera 180. In some cases, the computing system 110 may be configured to control movement of the robot 150, such as by generating a movement command, based on the images from the two cameras 170, 180. In some instances, the presence of the two cameras 170, 180 may provide the computing system 110 with stereoscopic vision. In some cases, the computing system 110 may be configured to use an image generated by the camera 170 and an image generated by the camera 180 to determine object structure information, which may describe a three-dimensional structure of an object captured by both images. In some instances, the computing system 110 may be configured to perform camera calibration for both the camera 170 and the camera 180, as discussed in more detail below. In an embodiment, the computing system 110 may control both cameras 170, 180 to capture respective images of the calibration pattern 160 in order to perform camera calibration. In such an embodiment, the computing system 110 may communicate with the camera 180 in a manner that is the same as or similar to how it communicates with the camera 170. In an embodiment, the robot operation system 100B may have exactly two cameras, or may have more than two cameras.

Figure 2:
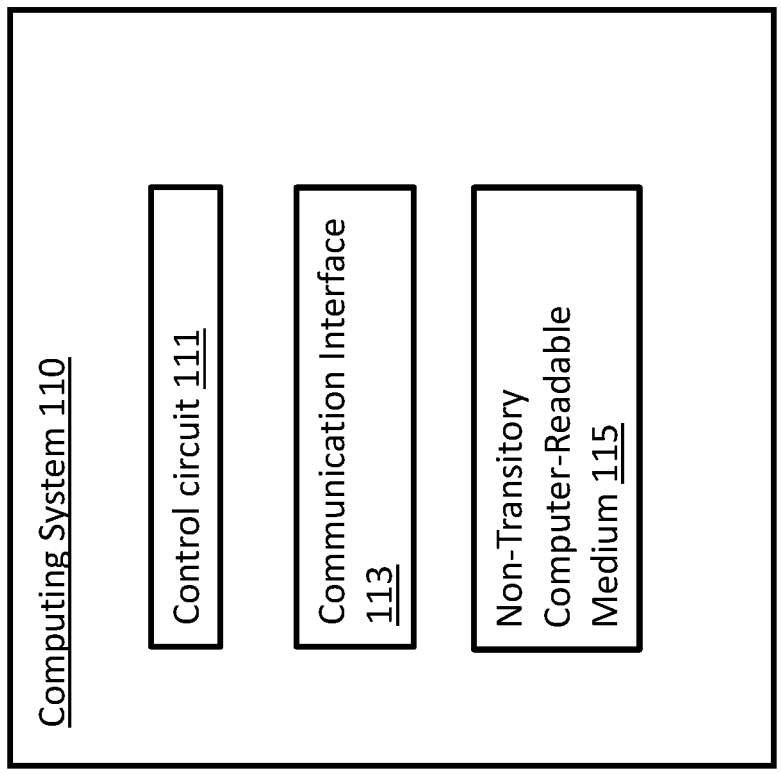
FIG. 2 depicts a computing system that for determining camera calibration information, according to an embodiment herein.

FIG. 2 depicts a block diagram of the computing system 110 of FIGS. 1A-1C. As illustrated in the block diagram, the computing system 110 can include a control circuit 111, a communication interface 113, and a non-transitory computer-readable medium 115 (e.g., memory). In an embodiment, the control circuit 111 may include one or more processors, a programmable logic circuit (PLC) or a programmable logic array (PLA), a field programmable gate array (FPGA), an application specific integrated circuit (ASIC), or any other control circuit. In some cases, if the control circuit 111 includes multiple processors, they may be part of a single device, or may be distributed across multiple devices. For instance, if the computing system 110 is formed by a single standalone device, the multiple processors may all be part of the single standalone device (e.g., a multiprocessor desktop computer). If the computing system 110 is a distributed system that includes multiple computing devices (e.g., multiple desktop computers), the multiple processors may be distributed across the multiple computing devices.

In an embodiment, the communication interface 113 may include one or more components that are configured to communicate with the camera 170 and the robot 150. For instance, the communication interface 113 may include a communication circuit configured to perform communication over a wired or wireless protocol. As an example, the communication circuit may include a RS-232 port controller, a USB controller, an Ethernet controller, an IEEE 802.11 controller, an IEEE 1394 controller, a Bluetooth® controller, an NFC controller, a PCI bus or SCSI controller, any other communication circuit, or a combination thereof.

In an embodiment, the non-transitory computer-readable medium 115 may include an information storage device, such as computer memory. The computer memory may comprise, e.g., dynamic random access memory (DRAM), solid state integrated memory, and/or a hard disk drive (HDD). In some cases, the camera calibration may be implemented through computer-executable instructions (e.g., computer code) stored on the non-transitory computer-readable medium 115. In such cases, the control circuit 111 may include one or more processors configured to execute the computer-executable instructions to perform the camera calibration (e.g., the steps illustrated in FIG. 9). In an embodiment, the non-transitory computer-readable medium 115 may be configured to store one or more calibration images that are generated by the camera 170 (of FIGS. 1A-1C) and/or one or more calibration images that are generated by the camera 180.

Figure 3A:
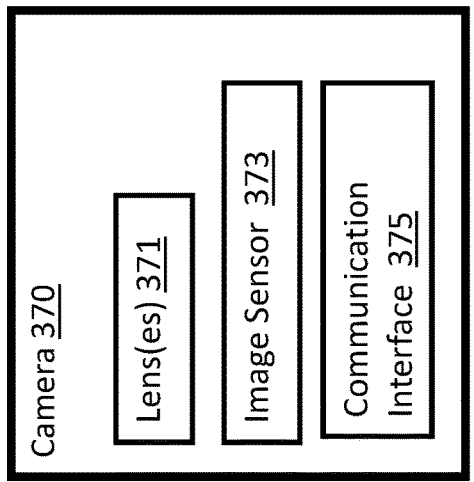
FIGS. 3A and 3B depict models of a camera involved in camera calibration, according to embodiments herein.

As stated above, one aspect of the present application relates to determining camera calibration information for the camera 170/180 of FIGS. 1A-1C. FIG. 3A depicts a block diagram of a camera 370 which may be a more specific embodiment of the camera 170/180 of FIGS. 1A-1C. In this embodiment, the camera 370 may include one or more lenses 371, an image sensor 373, and a communication interface 375. The communication interface 375 may be configured to communicate with the computing system 110 of FIGS. 1A-1C, and may be similar to the communication interface 113 of FIG. 2 of the computing system 110.

In an embodiment, the one or more lenses 371 may focus light (e.g., visible light or infrared radiation) that is coming from outside the camera 370 onto the image sensor 373. In an embodiment, the image sensor 373 may include an array of pixels configured to represent an image via respective pixel intensity values. The image sensor 373 may include a charge-coupled device (CCD) sensor, a complementary metal oxide semiconductor (CMOS) sensor, a quanta image sensor (QIS), or any other image sensor. In an embodiment, the image sensor 373 may define an image plane, which may be a two-dimensional (2D) plane that is coincident with a surface of the image sensor.

In an embodiment, the camera calibration information may include one or more camera calibration parameters, or more specifically one or more respective values for the one or more camera calibration parameters. Camera calibration parameters may include intrinsic camera calibration parameters (also referred to simply as intrinsic calibration parameters), which may describe one or more intrinsic properties of the camera 170/370. In some cases, the one or more intrinsic camera parameters may each have a value that is independent of a location and orientation of the camera 170/370. In an embodiment, camera calibration parameters may include parameters which describe a relationship between the camera 170/370 and its external environment. For instance, these parameters may include hand-eye calibration parameters and/or stereo calibration parameters. Hand-eye calibration parameters may describe, e.g., a spatial relationship between the camera 170/370 and the robot 150. In some cases, the hand-eye calibration parameters may include a transformation function which describes a relative position and relative orientation between a coordinate system of the camera 170/370 and a world coordinate system, which may be a coordinate system defined based on the robot 150. In an embodiment, the stereo calibration parameters may describe, e.g., a spatial relationship between the camera 170/370 and any other camera, such as the camera 180. In some cases, the stereo calibration parameters may include a transformation function which describes a relative position and relative orientation between a coordinate system of the camera 170/370 and a coordinate system of the other camera 180. In some cases, the camera calibration information may include a transformation function which describes a spatial relationship between the camera 170/370 and the calibration pattern 160 (of FIG. 1A-1C), or which describes a spatial relationship between the camera 180 and the calibration pattern 160.

Figure 3B:
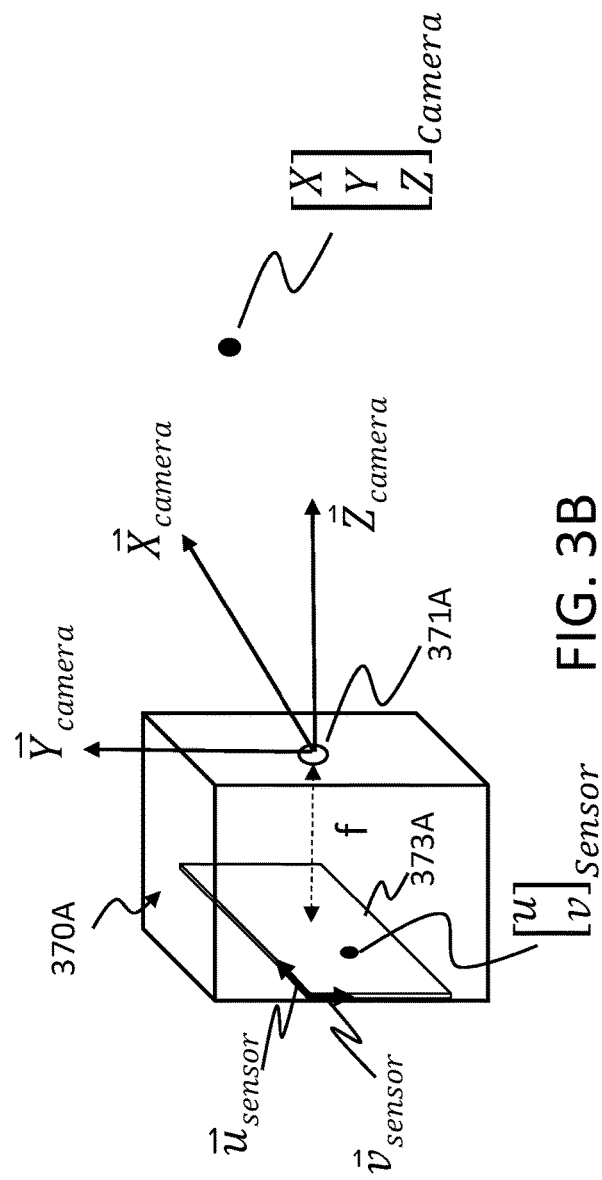

In an embodiment, the intrinsic camera calibration parameters may include projection parameters. The projection parameters may describe camera image projection associated with the camera. The camera image projection may refer to how a location in a camera field of view is projected onto a camera's image sensor (e.g., 373). For instance, FIG. 3B illustrates a location $[X\ Y\ Z]^T_{Camera}$ external to a camera 370A and in a field of view of the camera 370A (the superscript T refers to a transpose, and the subscript of Camera refers to the X, Y, and Z coordinate components being expressed in a camera coordinate system). More specifically, the camera 370A may be an embodiment of the camera 370, and may include one or more lenses 371A and an image sensor 373A. The camera coordinate system in this example may be a coordinate system that is defined with respect to a location and orientation of the camera 370A. More particularly, FIG. 3B depicts the camera coordinate system to be defined by the orthogonal coordinate axes $\vec{X}_{camera}, \vec{Y}_{camera}, \vec{Z}_{camera}$, which may be aligned with an orientation of various components of the camera 370A. In an embodiment, light from the location $[X\ Y\ Z]^T_{Camera}$ may be projected onto an image coordinate $[u\ v]^T_{Sensor}$ (e.g., a pixel coordinate) on an image sensor coordinate system. As illustrated in FIG. 3B, the image sensor coordinate system may in an example be defined by the coordinate axes $\vec{U}_{sensor}, \vec{V}_{sensor}$, which may be aligned with respective edges of the image sensor 373A. In an embodiment, the manner in which the location $[X\ Y\ Z]^T_{Camera}$ is projected onto the image coordinate $[u\ v]^T_{Sensor}$ may be modeled by a projection matrix K. The projection matrix K may be a function, or more specifically a linear transformation, which converts the location $[X\ Y\ Z]^T_{Camera}$ to the image coordinate $[u\ v]^T_{Sensor}$ based on the relationship $[u\ v\ 1]^T_{Sensor} = K\ [X/Z\ Y/Z\ 1]^T_{Camera}$. This relationship may omit an effect of lens distortion (lens distortion is discussed below in more detail).

In one example, the projection matrix may be equal to $$\begin{bmatrix} f_x & 0 & C_x \\ 0 & f_x & C_y \\ 0 & 0 & 1 \end{bmatrix}.$$

In this example, $f_x$ may be a first scale factor based on the focal length f of FIG. 3B and a pixel size of the image sensor 373A along the $\vec{U}_{sensor}$ axis. Similarly, $f_y$ may be a second scale factor based on a focal length f of the camera 370A and a pixel size of the image sensor 373A along the $\vec{V}_{sensor}$ axis. In some cases, $f_x$ may be considered a focal length of the camera 370A along the $\vec{U}_{sensor}$ axis, while $f_y$ may be considered a focal length of the camera 370A along the $\vec{V}_{sensor}$ axis. Both $f_x$ and $f_y$ may have a unit of pixels per millimeter, and may correlate physical measurements with a number of pixels on the image sensor 373A. The value $C_x$ may be a first part of a principal point offset, and may be based on a distance along the $\vec{U}_{sensor}$ axis between an origin of the image sensor coordinate system and an origin of the camera coordinate system. The value $C_y$ may be a second part of a principal point offset, and may be based on a distance along the $\vec{V}_{sensor}$ axis between the origin of the image sensor coordinate system and the origin of the camera coordinate system. In some cases, Cx and Cy may describe respective offsets between a center of an image generated by the camera 371A and an origin of the image sensor coordinate system along the $\vec{U}_{sensor}$ axis and the $\vec{V}_{sensor}$ axis, respectively.

In the above example, the projection matrix K may be considered a projection parameter, and each of $f_x$, $f_y$, $C_x$, and $C_y$ may be a component of the projection matrix. Further, each of the components $f_x$, $f_y$, $C_x$, $C_y$, and the focal length f may also be considered a projection parameter. In such an example, an estimate of the projection matrix K may be a matrix, while an estimate (also referred to as an estimated value) of $f_x$, $f_y$, $C_x$, or $C_y$ may be a scalar value.

In an embodiment, the intrinsic camera calibration parameters may include lens distortion parameters, which may describe lens distortion associated with the camera 170/370/370A or camera 180. For instance, the one or more lens distortion parameters may characterize an effect of lens distortion caused by the one or more lenses 371A, such as radial lens distortion (e.g., barrel distortion or pincushion distortion) and/or tangential lens distortion. In an embodiment, each of the one or more lens distortion parameters may be a parameter of a lens distortion model which characterizes or otherwise describes the lens distortion. For instance, the lens distortion model may be a polynomial distortion model, a rational distortion model, or a field-of-view distortion model, which are discussed below in more detail.

In an embodiment, a lens distortion model may include one or more functions, also referred to as one or more distortion functions, that characterize the lens distortion. In such an embodiment, a lens distortion parameter may be a parameter of the one or more distortion functions. More specifically, lens distortion of a camera may be modeled using one or more distortion functions that describe how one or more lenses (e.g., 371A) of the camera cause a feature which is actually located at $[X\ Y\ Z]^T_{Camera}$ in the camera's field of view appear as if the feature is instead located at $[\hat{X}\ \hat{Y}\ Z]^T_{Camera}$. The lens distortion may cause a relationship between locations in a camera field of view and pixel locations on an image sensor (e.g. 373A) to become nonlinear. As an example, when predicting a pixel $[u\ v]^T$ to which a location $[X\ Y\ Z]^T_{Camera}$ will be projected, a first distortion function $d_x$ and a second distortion function $d_y$ may be used to take lens distortion into account, such as by using the following equation:

$$\begin{bmatrix} u \\ v \\ 1 \end{bmatrix} = K \begin{bmatrix} \hat{X} \\ \hat{Y} \\ 1 \end{bmatrix} = K \begin{bmatrix} d_x(\tilde{X}, \tilde{Y}) \\ d_y(\tilde{X}, \tilde{Y}) \\ 1 \end{bmatrix} = K \begin{bmatrix} d_x(X/Z, Y/Z) \\ d_y(X/Z, Y/Z) \\ 1 \end{bmatrix} \quad \text{(Equation 1)}$$

In the above example, $\tilde{X}$ may refer to X/Z, and $\tilde{Y}$ may refer to Y/Z. The first distortion function $d_x$ may be, e.g., a nonlinear function that determines $\hat{X}$ as a function of $\tilde{X}$ and $\tilde{Y}$. The second distortion function $d_y$ may be, e.g., a nonlinear function that determines $\hat{Y}$ as a function of $\tilde{X}$ and $\tilde{Y}$. Lens distortion is discussed in more detail in U.S. patent application Ser. No. 16/295,940, entitled "Method and System for Performing Automatic Camera Calibration for Robot Control," the entire content of which is incorporated by reference herein in its entirety.

As stated above, examples of a lens distortion model include a polynomial distortion model, a rational distortion model, or a field-of-view distortion model. In an embodiment, the polynomial distortion model may be used to characterize radial lens distortion, either alone or along with some other type of lens distortion (e.g., tangential lens distortion). In some cases, the distortion functions $d_x$ and $d_y$ for the polynomial distortion model may be:

$$\hat{X} = d_x(\tilde{X}, \tilde{Y}) = \tilde{X}(1 + k_1 r^2 + k_2 r^4 + k_3 r^6) + 2p_1 \tilde{X}\tilde{Y} + p_2(r^2 + 2\tilde{X}^2) \quad \text{(Equation 2)}$$

$$\hat{Y} = d_y(\tilde{X}, \tilde{Y}) = \tilde{Y}(1 + k_1 r^2 + k_2 r^4 + k_3 r^6) + 2p_2 \tilde{X}\tilde{Y} + p_1(r^2 + 2\tilde{Y}^2) \quad \text{(Equation 3)}$$

In the above example, $r^2 = \tilde{X}^2 + \tilde{Y}^2$. Further, $k_1$, $k_2$, $k_3$, $p_1$, $p_2$, may each be a lens distortion parameter. In some cases, some or all of the above lens distortion parameters have a scalar value.

In an embodiment, $k_1$, $k_2$, and $k_3$ may be respective coefficients that describe radial lens distortion, which may be a type of lens distortion caused by the one or more lenses (e.g., 371A) bending or refracting light. More specifically, $k_1$, $k_2$, and $k_3$ may describe a first polynomial component $k_1 r^2$, a second polynomial component $k_2 r^4$, and a third polynomial component $k_3 r^6$, respectively. These polynomial components may be referred to as radial polynomial components, because they describe radial lens distortion, and because they are based on the term r. The term r may indicate a distance between a location $[X\ Y\ Z]^T_{Camera}$ and a central axis of the one or more lenses (e.g., 371A) of the camera (e.g., 370A). For example, the central axis may be an optical axis defined by a vector $[0\ 0\ Z]^T_{Camera}$, and the term r may be equal to or based on a distance between $[X\ Y\ Z]^T_{Camera}$ and $[0\ 0\ Z]^T_{Camera}$. An increasing value of r may indicate that light reflecting off $[X\ Y\ Z]^T_{Camera}$ will travel along a path that is farther away from a center of the one or more lenses (e.g., 371A), which may cause more radial lens distortion.

In an embodiment, the radial polynomial components discussed above may describe different degrees of radial lens distortion, also referred to as different orders of radial lens distortion. For instance, the first radial polynomial component $k_1 r^2$ may be considered to have a degree of 2 (because of the $r^2$ term) and may in some cases be referred to as a second-order radial distortion effect. The second radial polynomial component $k_2 r^4$ may be considered to have a degree of 4 (because of the $r^4$ term) and may in some cases be referred to as a fourth-order radial distortion effect. The third radial polynomial component $k_3 r^6$ may be considered to have a degree of 6 (because of the $r^6$ term) and may in some cases be referred to as a sixth-order radial distortion effect. In this example, the first radial polynomial component $k_1 r^2$ may be a lowest-degree radial polynomial component among the multiple radial polynomial components ($k_1 r^2$, $k_2 r^4$, $k_3 r^6$), and may describe a lowest-degree radial polynomial component (also referred to as describing a lowest-order radial distortion effect, or a lowest-order component of the radial lens distortion). For instance, the first radial polynomial component may describe a second order component of the radial lens distortion, because it has a $r^2$ term. The second radial polynomial component $k_2 r^4$ in this example may describe a higher-order component (e.g., fourth-order component) of the radial lens distortion relative to the first radial polynomial component. In this example, the third radial polynomial component may be a highest-degree polynomial component among the multiple radial polynomial components ($k_1 r^2$, $k_2 r^4$, $k_3 r^6$), and may describe a highest-order component of the radial lens distortion among the multiple radial polynomial components.

In the above example, $p_1$ and $p_2$ (e.g. equation 2 and equation 3) may be respective coefficients that describe tangential lens distortion, which may be a type of lens distortion that stretches out features in an image. The tangential lens distortion may be caused by, e.g., one or more lenses (e.g., 371A) not being completely parallel with an image sensor (e.g., 373A) of the camera (e.g., 370A). In other words, the tangential lens distortion may arise when an optical axis of the one or more lenses (e.g., 371A) is not completely orthogonal to a plane of the image sensor (e.g., 373A). More specifically, the lens distortion parameter $p_1$ may describe a tangential polynomial component $2p_1 \tilde{X}\tilde{Y}$ in the first distortion function $d_x$ and a tangential polynomial component $p_1(r^2+2\tilde{Y}^2)$ in the second distortion function $d_y$. The lens distortion parameter $p_2$ may describe a tangential polynomial component $p_2(r^2+2\tilde{X}^2)$ in the first distortion function $d_x$, and describe a tangential polynomial component $2p_2 \tilde{X}\tilde{Y}$ in the second distortion function $d_y$.

In an embodiment, the rational polynomial model may also be used to characterize radial lens distortion or some other type of distortion, and may include the following distortion functions $d_x$ and $d_y$:

$$\hat{X} = \qquad\qquad\qquad\qquad\qquad\qquad\qquad\text{(Equation 4)}$$
$$d_x(\tilde{X}, \tilde{Y}) = \tilde{X}\left(\frac{1+k_1 r^2+k_2 r^4+k_3 r^6}{1+k_4 r^2+k_5 r^4+k_6 r^6}\right) 2p_1 \tilde{X}\tilde{Y} + p_2(r^2+2\tilde{X}^2)$$

$$\hat{Y} = \qquad\qquad\qquad\qquad\qquad\qquad\qquad\text{(Equation 5)}$$
$$d_y(\tilde{X}, \tilde{Y}) = \tilde{Y}\left(\frac{1+k_1 r^2+k_2 r^4+k_3 r^6}{1+k_4 r^2+k_5 r^4+k_6 r^6}\right) 2p_2 \tilde{X}\tilde{Y} + p_1(r^2+2\tilde{Y}^2)$$

Similar to the example involving the polynomial distortion model, $r^2=\tilde{X}^2+\tilde{Y}^2$ in the rational distortion model. Further, each of $k_1$, $k_2$, $k_3$, $k_4$, $k_5$, $k_6$, $p_1$, and $p_2$ may be a lens distortion parameter of the rational distortion model. The lens distortion parameters $k_1$, $k_2$, $k_3$, $k_4$, $k_5$, $k_6$ may describe radial distortion, while the lens distortion parameters $p_1$ and $p_2$ may describe tangential distortion.

In an embodiment, the Field-Of-View Model may include the following distortion functions:

$$\hat{X} = d_x(\tilde{X}) = \frac{\tilde{X}\tan(r\tan(\omega))}{\tan(\omega)} \qquad\text{(Equation 5)}$$

$$\hat{Y} = d_y(\tilde{Y}) = \frac{\tilde{Y}\tan(r\tan(\omega))}{\tan(\omega)} \qquad\text{(Equation 6)}$$

In the above example, $r^2=\tilde{X}^2+\tilde{Y}^2$. Further, $\omega$ is a lens distortion parameter, and may have a scalar value.

Figure 4B:
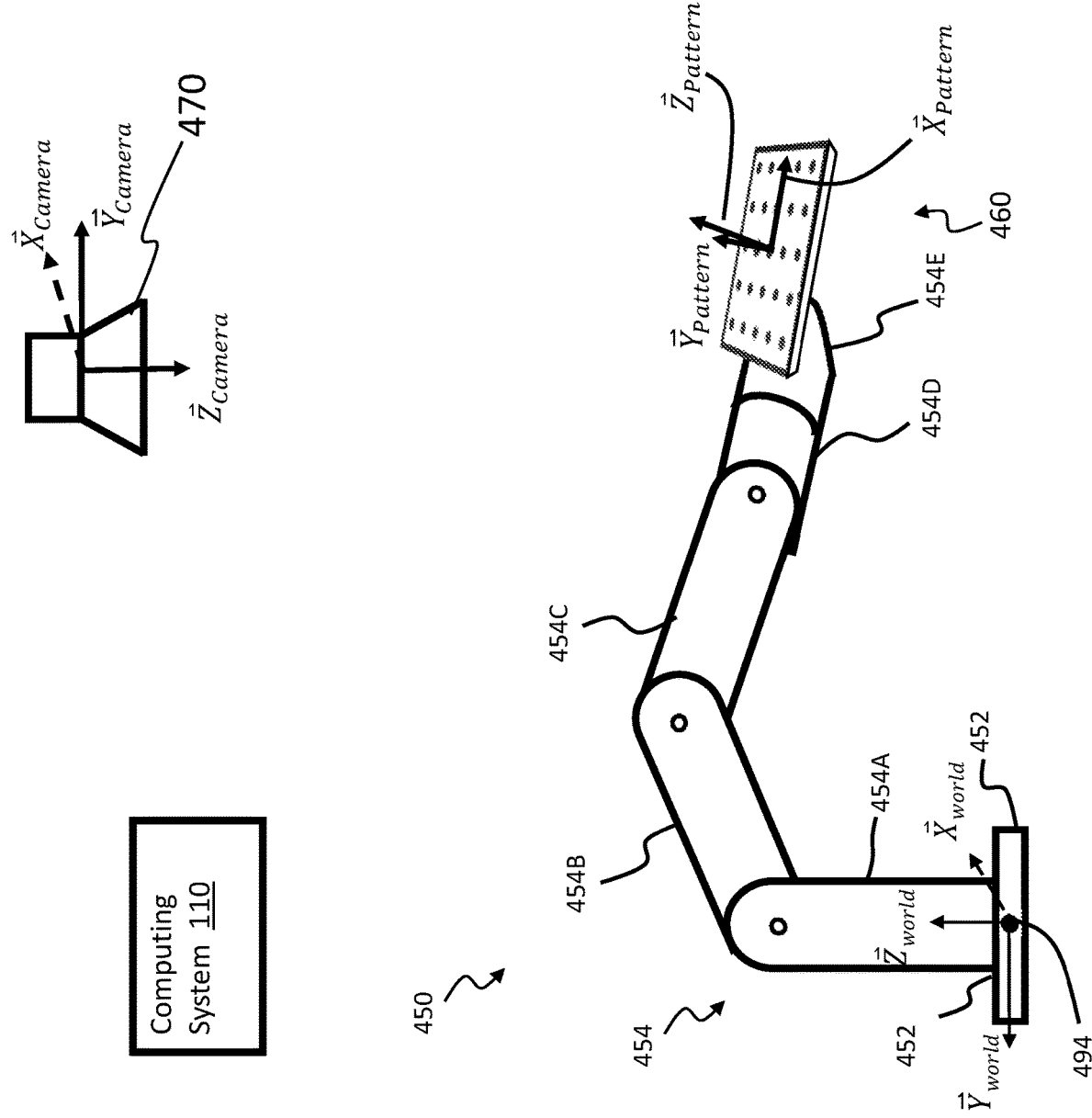

As stated above, estimating values for the intrinsic camera calibration parameters, such as the lens distortion parameters and/or projection parameters of the camera 170/370/370A in FIGS. 1A-1C and 3A-3B, may involve using the camera 170/370/370A to generate one or more calibration images which capture or otherwise represent a calibration pattern 160. FIGS. 4A and 4B illustrate a more specific environment in which calibration images are generated. More specifically, FIGS. 4A and 4B depict a robot operation system 400, which may be an embodiment of the robot operation system 100A or 100B (of FIGS. 1B and 1C). The robot operation system 400 includes the computing system 110, a robot 450, and a camera 470. Further, a calibration pattern 460 may be disposed on the robot 450. The robot 450, camera 470, and calibration pattern 460 may be an embodiment of the robot 150, camera 170, and the calibration pattern 160 (of FIGS. 1A-1C), respectively. In an embodiment, if the system 400 includes a camera in addition to the camera 470, then the camera 470 may be referred to as a first camera 470.

In the embodiment of FIG. 4A, the robot 450 may include a base 452 and a robot arm 454 movable relative to the base 452. The robot arm 454 may include one or more links, such as links 454A through link 454E. In an embodiment, the base 452 may be used to mount the robot 450 to, e.g., a mounting frame or mounting surface (e.g., floor of a warehouse). In an embodiment, the robot 450 may include a plurality of motors or other actuators that are configured to move the robot arm 454 by rotating or otherwise actuating the links 454A-454E. In some cases, the robot arm 454 may include an end effector, such as a robot hand, attached to one of the links 454A-454E. The calibration pattern 460 may be disposed on the end effector, or on one of the links (e.g., 454E). In an embodiment, the links 454A-454E may be rotatably attached to each other, and may be connected in series to, e.g., form a kinematic chain that is able to move the calibration pattern 460 to different poses in a camera field of view 410 of the camera 470, such as through rotation of the plurality of motors. The different poses may refer to different combinations of a respective location and respective orientation of the calibration pattern 460. For instance, FIG. 4A illustrates the robot arm 454 moving the calibration pattern 460 to a first pose, while FIG. 4B illustrates the robot arm 454 moving the calibration pattern 460 to a second pose different than the first pose.

In some cases, respective estimates of the lens distortion parameters and/or projection parameters may be used to perform hand-eye calibration, which may involve determining other camera calibration information, such as a transformation function that describes a relationship between the camera 470 and the robot 450. For example, FIG. 4B illustrates a camera coordinate system defined by $\vec{x}_{Camera}$, $\vec{y}_{Camera}$, $\vec{z}_{Camera}$ and a world coordinate system defined by $\vec{x}_{world}$, $\vec{y}_{world}$, $\vec{z}_{world}$. The world coordinate system may be a point that is stationary relative to the base 452 of the robot 450. In the example of FIG. 4B, the hand-eye calibration may involve determining a transformation matrix that describes a relative location and relative orientation between the camera coordinate system and the world coordinate system.

Figure 4C:
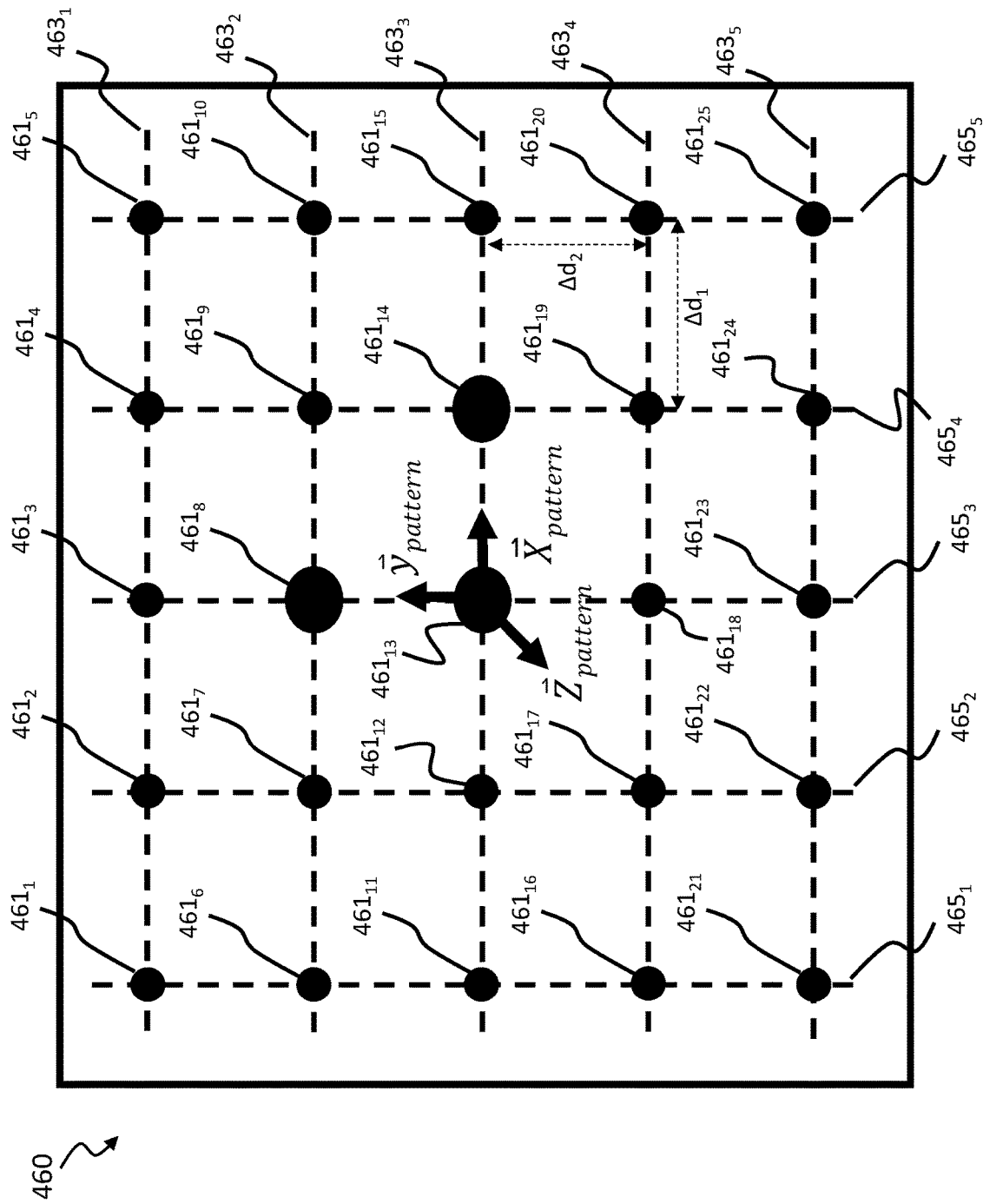
FIG. 4C depicts an example of a calibration pattern, according to an embodiment hereof.

In an embodiment, the calibration pattern 460 may be printed directly on the robot arm 454. In an embodiment, as illustrated in FIGS. 4A and 4B, the calibration pattern 460 may be printed on a flat calibration board. The calibration board may be formed from a material that is resistant to temperature-induced warping, such as carbon fiber. FIG. 4C depicts an example of the calibration pattern 460, which may include a plurality of pattern elements $461_1$ through $461_{25}$ that are arranged along imaginary straight grid lines ($463_1$ through $463_5$, and $465_1$ through $465_5$) of a rectangular grid. For example, the imaginary grid lines may include a first set of uniformly spaced straight lines $463_1$ through $463_5$, and a second set of uniformly spaced straight lines $465_1$ through $465_5$, wherein the first set of imaginary grid lines $463_1$ through $463_5$ are orthogonal to the second set of imaginary grid lines $465_1$ through $465_5$. In the example of FIG. 4C, each of the pattern elements $461_1$ through $461_{25}$ may be a circular dot. In an embodiment, the pattern elements $461_1$ through $461_{25}$ may differ in size. For instance, the pattern elements $461_8$, $461_{13}$, and $461_{14}$, have a first diameter, while all remaining pattern elements have a second diameter smaller than the first diameter. In an embodiment, the plurality of pattern elements $461_1$ through $461_{25}$ have a defined size(s) and a defined spacing among them. For instance, the first diameter and the second diameter may be values defined by a manufacturer of the calibration pattern 460 before or during the manufacturing thereof, and may thus be known, predefined values during camera calibration. Further, the plurality of pattern elements $461_1$ through $461_{25}$ may have a defined distance $\Delta d_1$ (which may also be a predefined distance) along the grid lines $465_1$ through $465_5$, and have a defined distance $\Delta d_2$ along the grid lines $463_1$ through $463_5$, wherein the defined distances may be known values during camera calibration. In an embodiment, $\Delta d_1$ is equal to $\Delta d_2$. In an embodiment, the pattern elements $461_1$ through $461_{25}$ may all have the same size (e.g., same diameter), and the calibration pattern 460 may further include a feature (e.g., a rotationally asymmetrical shape) that indicates an orientation of the calibration pattern 460.

As stated above, the pattern coordinate system may be defined with respect to a calibration pattern, such as the calibration pattern 460. In an embodiment, as depicted in FIGS. 4B and 4C, a pattern element at or near a center of the calibration pattern 460, such as pattern element $461_{13}$ may define an origin of the calibration coordinate system. That is, the pattern element $461_{13}$ may have a coordinate $[0\ 0\ 0]^T_{Pattern}$. In this embodiment, the $\vec{X}_{Pattern}$ axis may be aligned with the imaginary grid lines $463_1$ through $463_5$, while the $\vec{Y}_{Pattern}$ axis may be aligned the imaginary grid lines $465_1$ through $465_5$, and the $\vec{Z}_{Pattern}$ axis is orthogonal to a plane formed by the calibration pattern 460.

Figure 5:
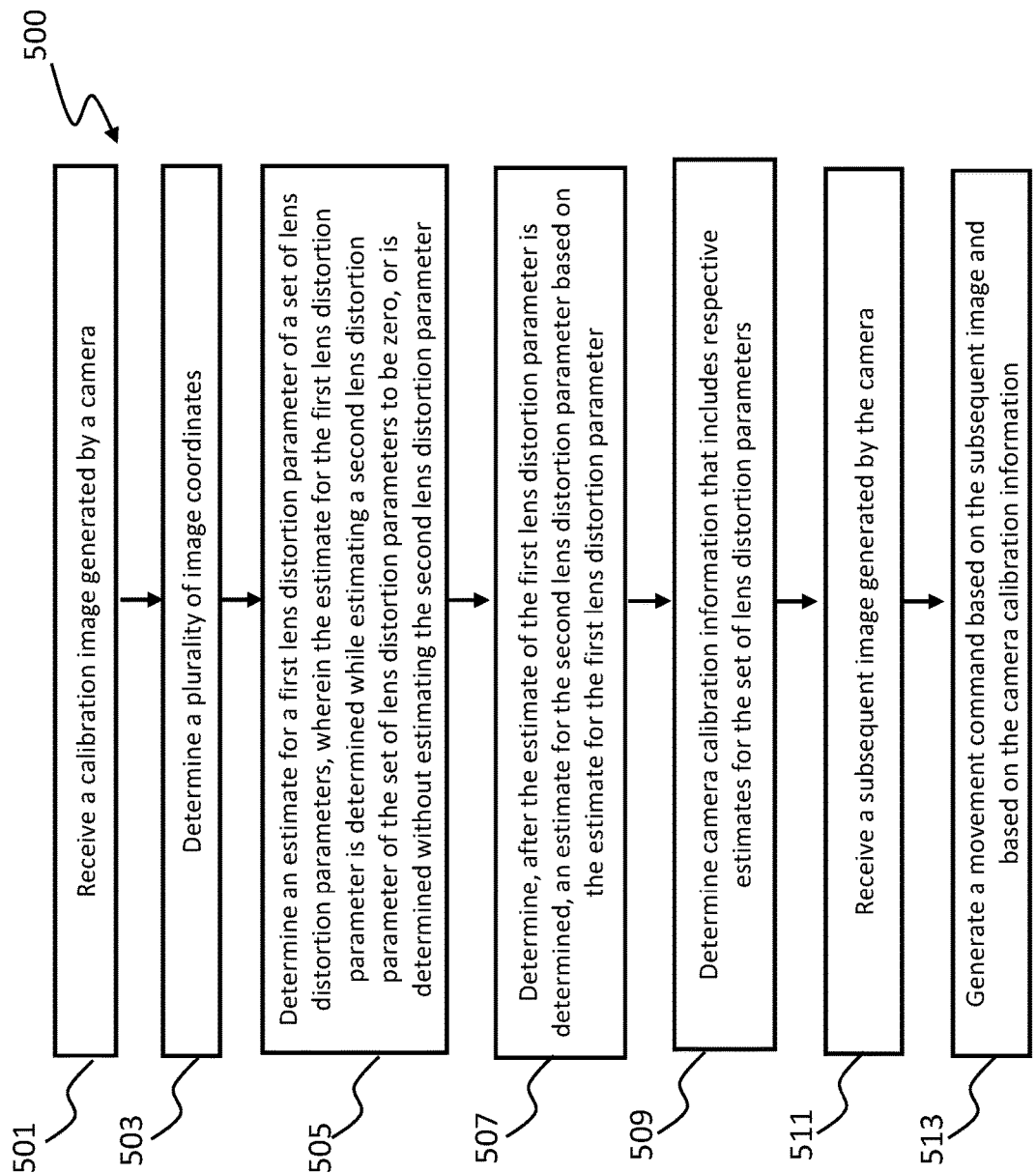
FIG. 5 provides a flow diagram that illustrates a method for estimating intrinsic camera calibration parameters, according to an embodiment herein.

As stated above, one aspect of the present application relates to estimating lens distortion parameters in different stages (also referred to as different stages) so as to improve an accuracy by which the lens distortion parameters are estimated. The different stages may be, e.g., a sequence of stages, in which an output of one stage in the sequence is used as an input for a next stage in the sequence (e.g., as an initial estimate for the next stage). One or more of the stages may focus on estimating a particular lens distortion parameter while treating other lens distortion parameters to be zero or some other fixed value, and/or ignoring other lens distortion parameters. FIG. 5 depicts a flow diagram that illustrates a method 500 for estimating lens distortion parameters in a manner that relates to the features discussed above.

In an embodiment, the method 500 is performed by the control circuit 111 of the computing system 110 of FIG. 1A through FIG. 4, and may be performed as part of performing camera calibration. As depicted in FIG. 2, the computing system 110 may include a communication interface 113 configured to communicate a camera (e.g., 470) and/or with a robot (e.g., 450). In an embodiment, the method 500 may be performed when the camera (e.g., 470) has generated a calibration image. The calibration image may capture or otherwise represent a calibration pattern (e.g., 460) that is in a camera field of view (e.g., 410) of the camera (e.g., 470). As stated above with respect to FIG. 4C, the calibration pattern (e.g., 460) may in this example include a plurality of pattern elements (e.g., $461_1$ through $461_{25}$). In an embodiment, the plurality of pattern elements may have a defined spatial arrangement. For example, they may be arranged along an orthogonal grid, and adjacent pattern elements along the grid may have defined spacing. In some cases, the spacing may be defined during or before manufacturing of the calibration pattern (e.g., 460), in which case the spacing may be referred to as being predefined.

In some cases, the pattern elements (e.g., $461_1$ through $461_{25}$) may have respective defined pattern element coordinates in a pattern coordinate system (which may be a coordinate system defined with respect to a location and orientation of the calibration pattern). The defined pattern element coordinates may also be referred to as defined pattern element locations, and may identify respective physical locations of the pattern elements (e.g., $461_1$ through $461_{25}$) with respect to a location and orientation of the calibration pattern (e.g., 460), or more specifically with respect to the pattern coordinate system. For example, the defined pattern element locations or pattern element coordinates may be $[X\ Y\ Z]^T$ coordinates, or more specifically $[X_1\ Y_1\ Z_1]^T_{Pattern}$ through $[X_{25}\ Y_{25}\ Z_{25}]^T_{Pattern}$, which define respective physical locations of the pattern elements $461_1$ through $461_{25}$ in the pattern coordinate system.

Figure 6A:
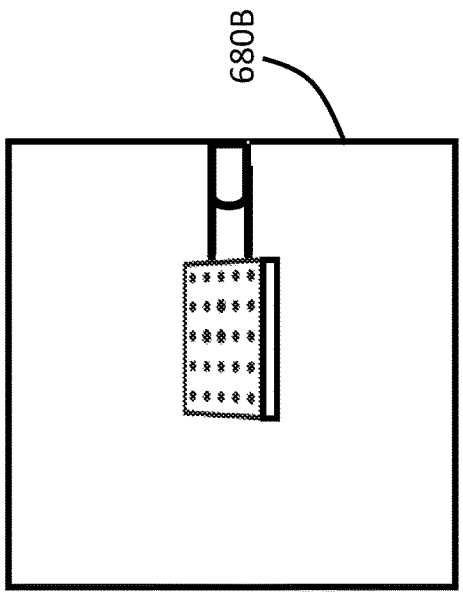
FIGS. 6A-6E illustrate example calibration images, according to an embodiment herein.
Figure 6B:
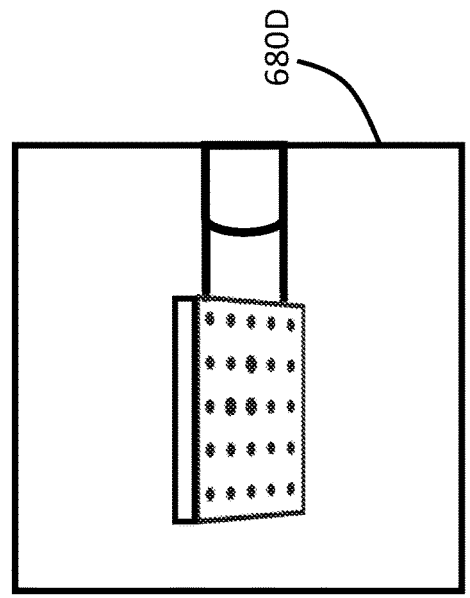
Figure 6C:
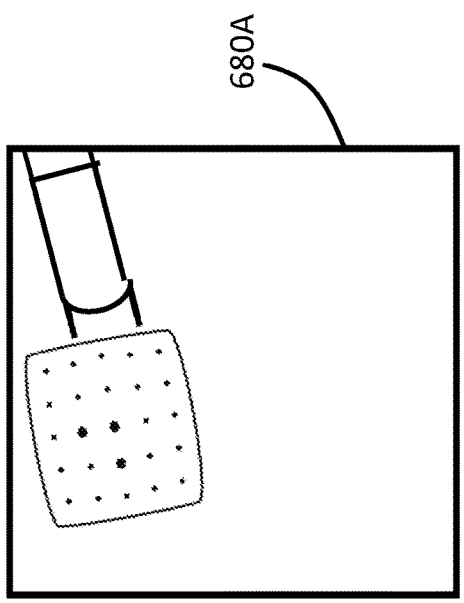
Figure 6D:
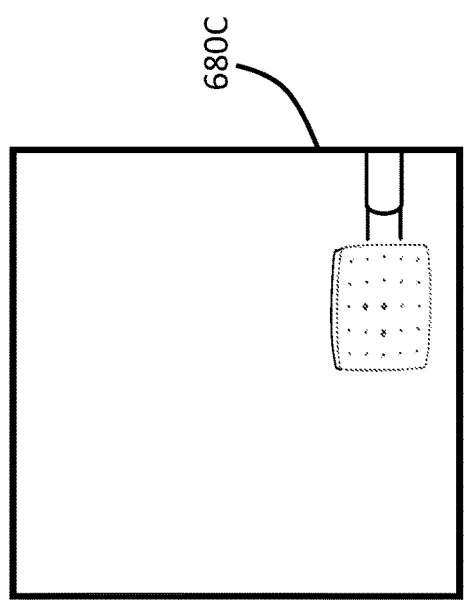
Figure 6E:
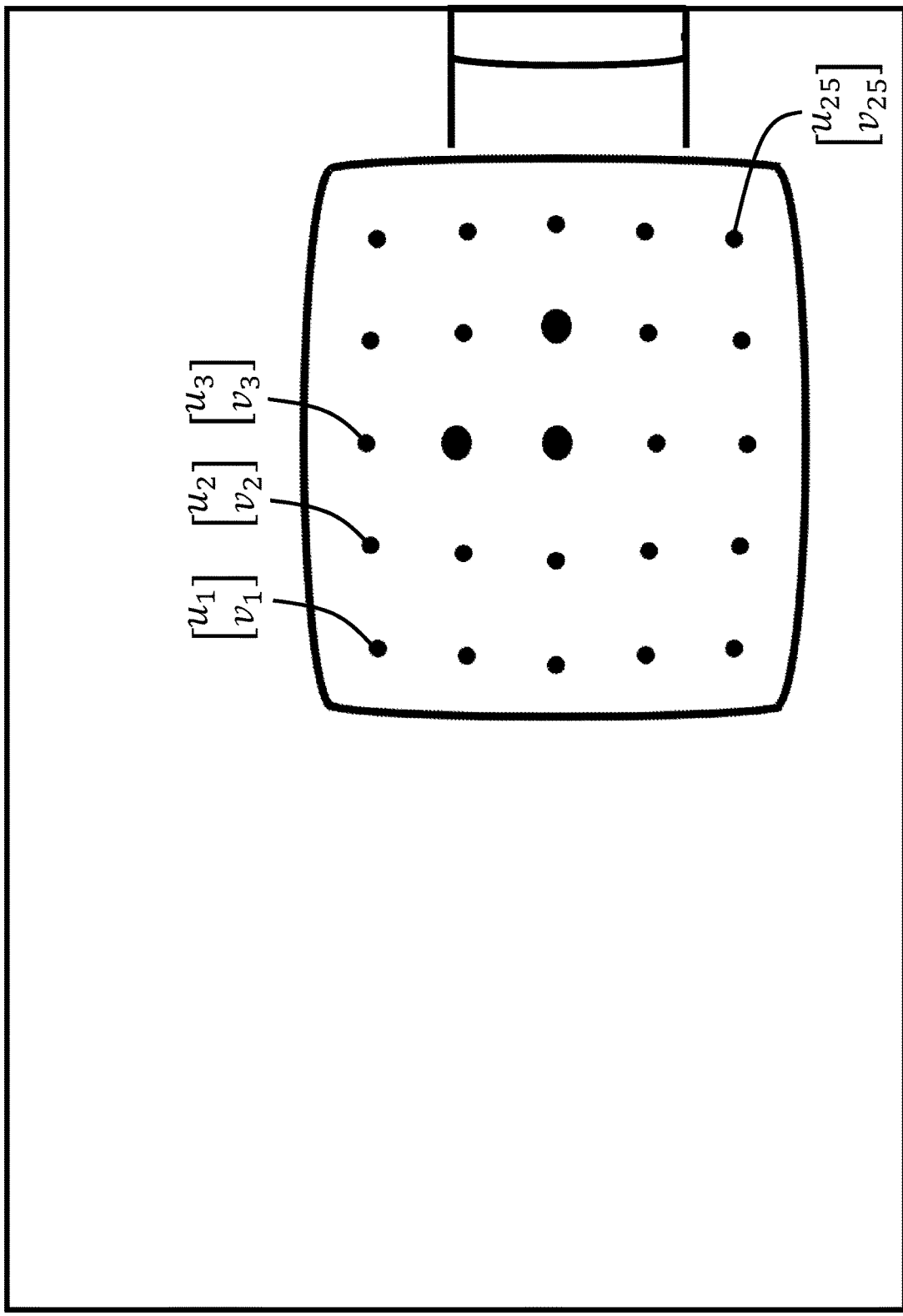

In an embodiment, the method 500 of FIG. 5 may include a step 501, in which the computing system 110, or more specifically the control circuit 111 thereof, receives the calibration image generated by the camera (e.g., 470). In some cases, step 501 may involve the computing system 110 receiving the calibration image directly from the camera (e.g., 470), such as via the communication interface 113 of FIG. 2. In some cases, the calibration image may have been stored in the non-transitory computer-readable medium 115 (e.g., a hard disk drive) or on some other device, and step 501 may involve receiving the calibration image directly from the non-transitory computer-readable medium 115. In one example, the calibration image that is received in step 501 may be one of the calibration images 680A-680E in FIGS. 6A-6E, which depict five calibration images corresponding to, e.g., five different respective poses of the calibration pattern (e.g., 460) in the camera field of view (e.g., 410). In some cases, the received calibration image in step 501 may manifest an effect of lens distortion introduced by one or more lenses of the camera (e.g., 470). For instance, the lens distortion may create a bending or other warping effect that introduces curvature into an image. As an example, FIGS. 6A, 6C, and 6E depict calibration images 680A, 680C, and 680E in which the calibration pattern (e.g., calibration pattern 460 of FIG. 4C) appears to have curved edges, even though the calibration pattern (e.g., 460) actually has straight edges.

In an embodiment, the method 500 may include a step 503, in which the computing system 110 determines a plurality of image coordinates (also referred to as image pattern element locations) that indicate or otherwise represent respective locations at which the plurality of pattern elements appear in the calibration image. For instance, as illustrated in FIG. 6E, the plurality of image coordinates may be respective pixel coordinates $[u_1\ v_1]^T$ through $[u_{25}\ v_{25}]^T$ that indicate where the pattern elements $461_1$ through $461_{25}$, respectively, appear in the calibration image. In some cases, each of the image coordinates may be a pixel coordinate $[u_n\ v_n]^T$ that indicate where a center of the respective pattern element $461_n$ appears in the calibration image. In this example, the pixel coordinates for the pattern elements $461_1$ through $461_{25}$ may be used along with corresponding defined pattern element coordinates for the pattern elements $461_1$ through $461_{25}$ so as to determine camera calibration information, as discussed below in more detail with respect to steps 505 through 509.

More particularly, steps 505 through 509 of the method 500 may be part of a camera calibration process for estimating a set of projection parameters and a set of lens distortion parameters. In step 505, the computing system 110 may determine, based on the plurality of image coordinates (e.g., $[u_1\ v_1]^T$ through $[u_{25}\ v_{25}]^T$) and the defined pattern element coordinates (e.g., $[X_1\ Y_1\ Z_1]^T_{Pattern}$ through $[X_{25}\ Y_{25}\ Z_{25}]^T_{Pattern}$), an estimate for a first lens distortion parameter of the set of lens distortion parameters while estimating a second lens distortion parameter of the set of lens distortion parameters to be zero, or without estimating the second lens distortion parameter.

Figure 7A:
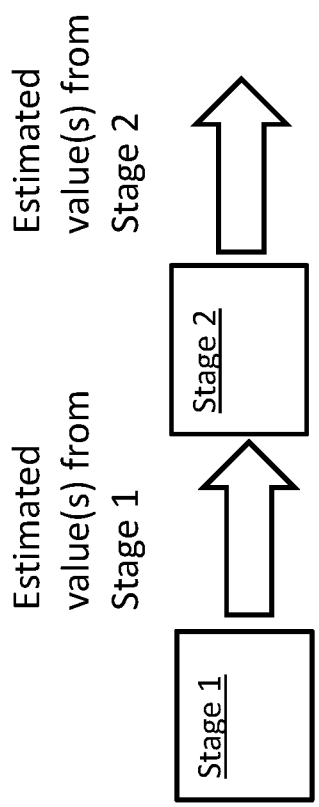
FIGS. 7A-7B illustrate an example pipeline having multiple stages for estimating camera calibration parameters, according to an embodiment herein.

In an embodiment, step 505 may be part of a first calibration stage in which the first lens distortion parameter is estimated separately from the second lens distortion parameter. For example, FIG. 7A depicts a camera calibration process that includes the first stage (labeled as Stage 1) followed by a second stage (labeled as Stage 2). In some cases, the second stage may be partially or completely subsequent to the first stage. The first calibration stage may focus on determining an estimate for the first lens distortion parameter while constraining the second lens distortion parameter to a fixed value (e.g., zero), or ignoring the second lens distortion parameter. Estimating the first lens distortion parameter separately from the second lens distortion parameter may improve the accuracy of an estimate for the first lens distortion parameter. In some cases, the estimate of the first lens distortion parameter from the first stage may be outputted to the second stage, as depicted in FIG. 7A, which may use the estimate of the first lens distortion parameter to improve an accuracy by which the second lens distortion parameter is estimated. For instance, the output of the first stage (also referred to as a first round) may be used in the second stage (also referred to as a second round) as an initial estimate (e.g., an initial guess) of the first lens distortion parameter in the second stage. The initial estimate may be used to determine an estimate of the second lens distortion parameter and/or to determine an updated estimate of the first lens distortion parameter.

As an example, method 500 may involve estimating a set of lens distortion parameters, which may refer to all lens distortion parameters of a lens distortion model being used for the camera calibration of method 500. For instance, if the lens distortion model is the polynomial distortion model, the set of lens distortion parameters may be $k_1$, $k_2$, $k_3$, $p_1$, and $p_2$. If the lens distortion model is the rational polynomial distortion model, the set of lens distortion parameters may be $k_1$, $k_2$, $k_3$, $k_4$, $k_5$, $k_6$, $p_1$, and $p_2$. In some camera calibration processes, the set of lens distortion parameters may be determined together, in a single stage (also referred to as a single round). For example, the single stage may be a curvature reduction stage (also referred to as a curvature reduction round) in which an inverse of the distortion functions $d_x$, $d_y$ (that is, $d_x^{-1}$, $d_y^{-1}$) is applied to the image coordinates (e.g., $[u_1\ v_1]^T$ through $[u_{25}\ v_{25}]^T$), or more generally to the calibration image to generate a modified version of the calibration image. In such a curvature reduction stage, an optimization technique (e.g., Levenberg-Marquardt algorithm, Nelder-Mead algorithm, or Broyden-Fletcher-Goldfarb-Shanno (BFGS) algorithm) may adjust respective values for all of the set of lens distortion parameters $k_1$, $k_2$, $k_3$, $p_1$, and $p_2$ and/or all of the projection parameters $f_x$, $f_y$, $c_x$, and/or $c_y$, so as to find an optimal set of values for all of the lens distortion parameters and/or projection parameters that minimizes an amount of curvature in the modified version of the calibration image, because the curvature may represent warping caused by the lens distortion. However, because the distortion functions $d_x$, $d_y$ and their inverse are non-linear, finding optimal values for all lens distortion parameters $k_1$, $k_2$, $k_3$, $p_1$, and $p_2$ in a single stage may be difficult, and may cause resulting estimates for the lens distortion parameters to be sub-optimal or, more generally, to lose accuracy. Thus, as stated above, one embodiment of the present application, and more specifically of step 505, involves a stage that focuses on determining an estimate for a first lens distortion parameter, such as $k_1$, while constraining one or more other lens distortion parameters to a fixed value (e.g., zero), or without estimating one or more other lens distortion parameters.

In an embodiment, the first lens distortion parameter which is estimated in step 505 may describe a first type of lens distortion, while step 505 may involve ignoring one or more other lens distortion parameters that describe a second type of lens distortion (or treating the second type of lens distortion as negligible), wherein the one or more lens distortion parameters that are ignored may include the second lens distortion parameter. For instance, the first lens distortion parameter that is estimated in step 505 may be $k_1$, which describes radial lens distortion. In this example, the computing system 110 in step 505 may ignore an effect of tangential lens distortion, or treat it as negligible, so as to focus on estimating a lens distortion parameter for radial lens distortion. Thus, the computing system 110 may estimate $k_1$ (which describes radial lens distortion), while $p_1$ and/or $p_2$ (which describe tangential lens distortion) are estimated to be zero, or are not estimated. In such an example, the lens distortion parameter $k_1$ may describe a component of lens distortion that has a much larger effect than a component described by $p_1$ or $p_2$.

In an embodiment, the first lens distortion parameter which is estimated in step 505 may describe the first type of lens distortion, such as radial lens distortion, while this step may also involve ignoring one or more lens distortion parameters that describe a same type of lens distortion, wherein the one or more lens distortion parameters that are ignored may include the second lens distortion parameter.

For example, step 505 may involve determining an estimate for $k_1$, which may describe a lowest order radial polynomial component $k_1 r^2$ (also referred to as a lowest-degree radial polynomial component or lowest-order radial distortion effect) for describing radial lens distortion from among a set of radial polynomial components (e.g., $k_1 r^2$, $k_2 r^4$, $k_3 r^6$) that describe radial lens distortion. As discussed above, the lens distortion parameters $k_2$ and $k_3$ may both describe higher-order radial polynomial components ($k_2 r^4$, $k_3 r^6$) relative to the lens distortion parameter $k_1$. In an embodiment, the computing system 110 in step 505 may assume that the lowest order radial polynomial component $k_1 r^2$ has a much larger effect than the higher-order radial polynomial components such as $k_2 r^4$, $k_3 r^6$. Thus, the computing system 110 in step 505 (e.g., in Stage 1) may focus on estimating $k_1$, and may ignore effects of the higher-order radial polynomial components $k_2 r^4$, $k_3 r^6$, or treat their effects as negligible. In other words, the computing system 110 in step 505 may determine an estimate for $k_1$, while $k_2$ and/or $k_3$ are estimated to be zero, or are not estimated.

Figure 7B:
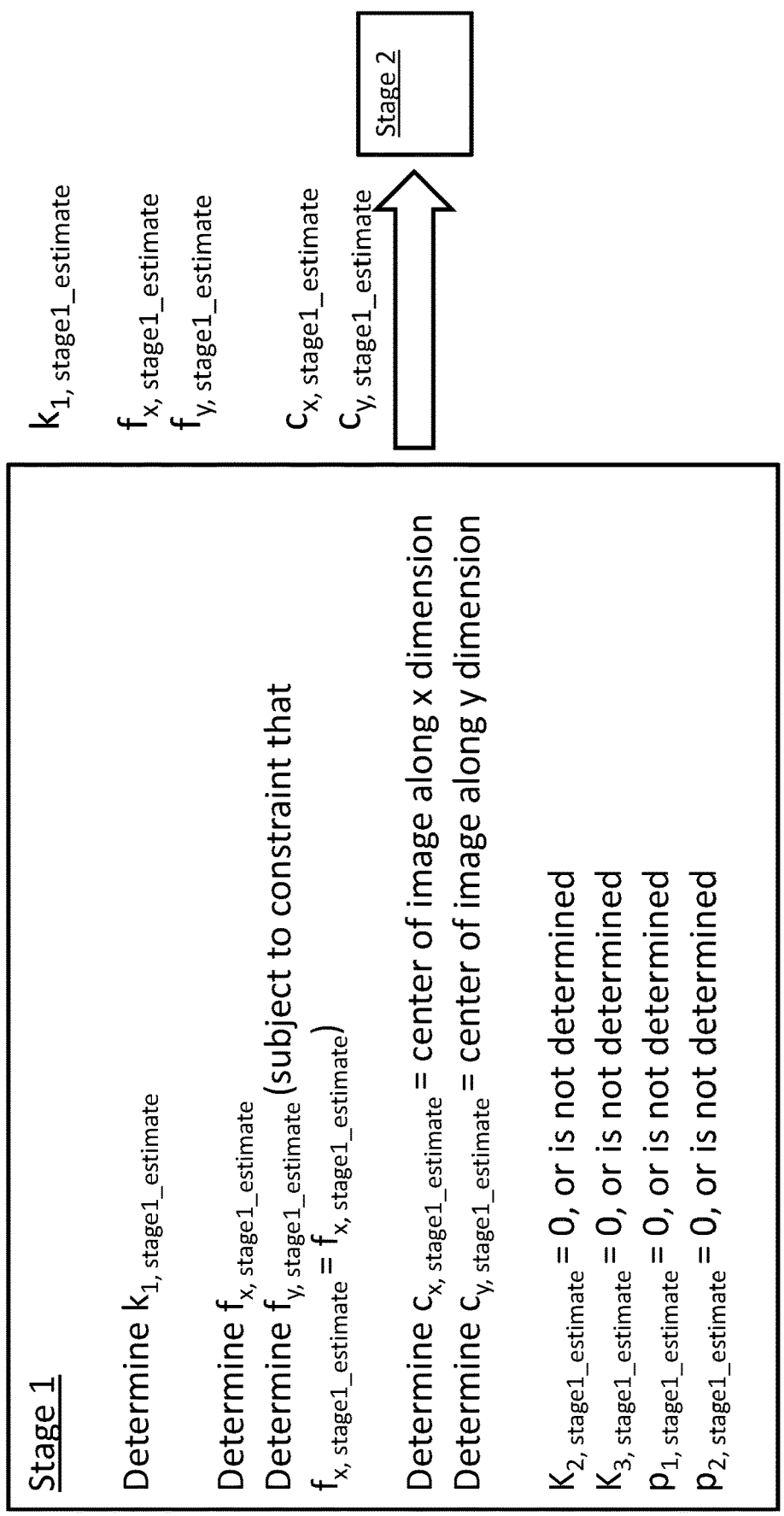

In some cases, the above embodiments for step 505 may be combined. For example, step 505 may determine an estimate for $k_1$, which may be the first lens distortion parameter, while (i) $p_1$ and/or $p_2$ are estimated to be zero, or are not estimated, and (ii) while $k_2$ and/or $k_3$ are estimated to be zero, or are not estimated. For instance, FIG. 7B depicts a more specific example in which step 505 may be part of a first stage, labeled as Stage 1, that determines an estimate $k_{1,\,stage1\_estimate}$ for the lens distortion parameter $k_1$, which may be a first lens distortion parameter. As stated above, the estimate for the first lens distortion parameter may be determined while determining an estimate for a second lens distortion parameter to be zero, or without estimating the estimate for the second lens distortion parameter. In the example of FIG. 7B, the second lens distortion parameter may be one of $k_2$, $k_3$, $p_1$, or $p_2$, such that $k_{2,\,stage1\_estimate}$, $k_{3,\,stage1\_estimate}$, $p_{1,\,stage1\_estimate}$, or $p_{2,\,stage1\_estimate}$, are determined to be zero, or are not determined. More specifically, the example of FIG. 7B may involve determining $k_{1,\,stage1\_estimate}$ while estimates for all remaining lens distortion parameters of a lens distortion model are determined to be zero, or while estimates for all of the remaining lens distortion parameters are not determined. More specifically, if the lens distortion model is the polynomial model, then $k_{2,\,stage1\_estimate}$, $k_{3,\,stage1\_estimate}$, $p_{1,\,stage1\_estimate}$, and $p_{2,\,stage1\_estimate}$ are determined to be zero in Stage 1, or are not determined in Stage 1, as illustrated in FIG. 7B. If the lens distortion model is the rational polynomial model, then $k_{2,stage1\_estimate}$, $k_{3,stage1\_estimate}$, $k_{4,stage1\_estimate}$, $k_{5,stage1\_estimate}$, $p_{1,\,stage1\_estimate}$, and $p_{2,\,stage1\_estimate}$ are determined to be zero, or are not determined in Stage 1.

In some implementations, the example in FIG. 7B may involve solving the following equations of the polynomial model for $k_1$ while constraining $k_2$, $k_3$, $p_1$, and $p_2$ to be zero.

$$\tilde{X} = d_x(\tilde{X}, \tilde{Y}) = \quad \text{(Equations 7-10)}$$
$$\tilde{X}(1 + k_1 r^2 + k_2 r^4 + k_3 r^6) + 2 p_1 \tilde{X}\tilde{Y} + p_2(r^2 + 2\tilde{X}^2)$$
$$\tilde{Y} = d_y(\tilde{X}, \tilde{Y}) = \tilde{Y}(1 + k_1 r^2 + k_2 r^4 + k_3 r^6) +$$
$$2 p_2 \tilde{X}\tilde{Y} + p_1(r^2 + 2\tilde{Y}^2)$$

-continued $$\begin{bmatrix} u \\ v \\ 1 \end{bmatrix} = K \begin{bmatrix} \hat{X} \\ \hat{Y} \\ 1 \end{bmatrix} = K \begin{bmatrix} d_x(\tilde{X}, \tilde{Y}) \\ d_y(\tilde{X}, \tilde{Y}) \\ 1 \end{bmatrix} = K \begin{bmatrix} d_x(X/Z, Y/Z) \\ d_y(X/Z, Y/Z) \\ 1 \end{bmatrix}$$

$$k = \begin{bmatrix} f_x & 0 & C_x \\ 0 & f_y & C_y \\ 0 & 0 & 1 \end{bmatrix}.$$

These equations involve the distortion functions of the polynomial distortion model and involve the projection matrix, which are discussed above. In this example, the values of $[u\ v\ 1]^T$ may be determined from the calibration image (e.g., 680E of FIG. 6E), while the values of $\tilde{X}$, $\tilde{Y}$ may be determined based on the defined pattern element coordinates. In some cases, $\tilde{X}$, $\tilde{Y}$ may be expressed relative to the camera coordinate system (e.g., the camera coordinate system of FIGS. 3B and 4B), and may be determined from the defined pattern element coordinates based on a transformation function $T^{PATTERN}{}_{CAMERA}$, such as a matrix which describes a spatial relationship between the camera (e.g., 470) and the calibration pattern (e.g., 460). In such cases, parameter values for $T^{PATTERN}{}_{CAMERA}$ may be determined via the perspective-n-point algorithm or some other technique. In an embodiment, the above equations may be solved using any technique, such as the techniques discussed in "*A Flexible New Technique for Camera Calibration*," Technical Report MSR-TR-98-71, by Zhengyou Zhang (also referred to as Zhang's algorithm), the entire content of which is incorporated by reference herein in its entirety.

In some implementations, step 505 in the example of FIG. 7B may involve solving one or more equations that involve a simplified distortion function $d_{x\_simplified}$ or $d_{y\_simplified}$, which may be obtained by setting $k_2$, $k_3$, $p_1$, and $p_2$ to zero:

$$d_{x\_simplified} = \tilde{X}(1 + k_1 r^2) \quad \text{(Equation 11)}$$

$$d_{y\_simplified} = \tilde{Y}(1 + k_1 r^2) \quad \text{(Equation 12)}$$

For example, the computing system 110 in step 505 may retrieve, or more generally receive, the simplified distortion functions $d_{x\_simplified}$ and $d_{y\_simplified}$ from the non-transitory computer-readable medium 115 and solve them along with the other equations discussed above (e.g., Equation 9 and Equation 10). In such an example, step 505 may determine an estimate for $k_1$ (that is, $k_{1,\,stage1\_estimate}$) while respective estimates for all remaining lens distortion parameters of the set of lens distortion parameters are not determined.

In an embodiment, step 505 may involve also determining respective estimates for one or more projection parameters. However, this determination may in some cases be subject to one or more constraints. For example, as depicted in FIG. 7B, respective estimates for the projection parameters $f_x$, $f_y$, $c_x$, and $c_y$ may also be determined, but may be subject to the constraint that $f_{x,stage1\_estimate} = f_{y,stage1\_estimate}$. More particularly, the computing system 110 may assume that $f_x$ and $f_y$ have very similar values, and thus may constrain them to have the same estimate in Stage 1 so as to reduce the complexity of the stage. The example in FIG. 7B may further impose the constraint that $c_{x,stage1\_estimate}$ and $c_{y,stage1\_estimate}$ have respective fixed values. As an example, $c_{x,stage1\_estimate}$ and $c_{y,stage1\_estimate}$ may each be constrained to zero. In another example, as depicted in FIG. 7B, $c_{x,stage1\_estimate}$ may be constrained to a center of the calibration image (e.g., 680E) along the $\vec{u}$ axis of FIG. 3B, and $c_{y,stage1\_estimate}$ may be constrained to a center of the calibration image along a $\vec{v}$ axis of FIG. 3B. For instance, if the calibration image has a size of a pixels by b pixels, $c_{x,stage1\_estimate}$ may be constrained to be equal to a/2, and $c_{y,stage1\_estimate}$ may be constrained to be equal to b/2. The above constraints may simplify the estimation of parameter values in Stage 1. Further, constraining the estimates of the projection parameters may allow Stage 1 to focus on optimizing an estimate of the lens distortion parameter $k_1$, so as to improve an accuracy of the estimate.

Figure 8:
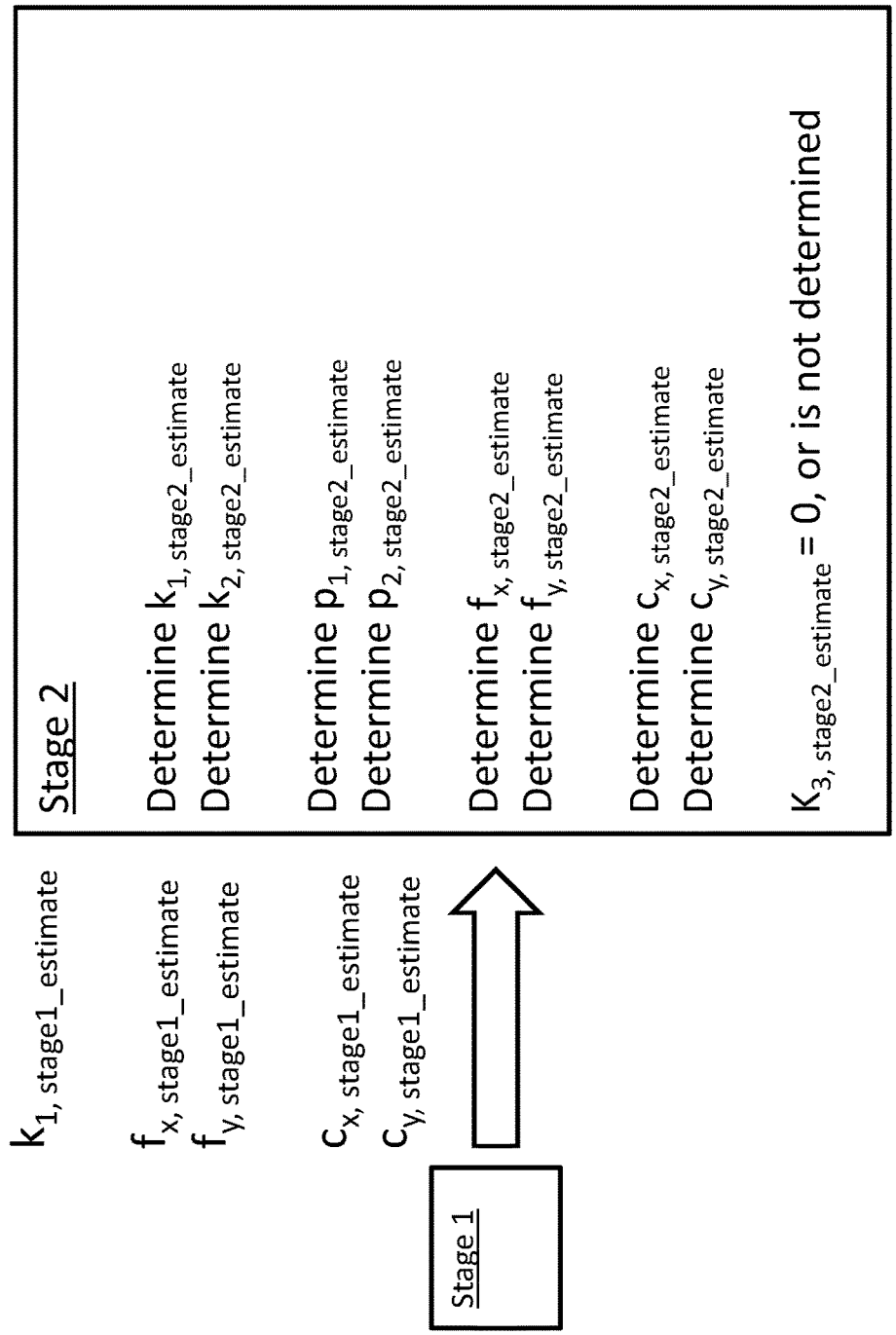
FIG. 8 illustrates an example pipeline having multiple stages for estimating camera calibration parameters, according to an embodiment herein.

Returning to FIG. 5, the method 500 may in an embodiment include a step 507, in which the computing system 110 determines, after the estimate of the first lens distortion parameter is determined, an estimate for the second lens distortion parameter based on the estimate of the first lens distortion parameter. For example, FIG. 8 depicts an example in which step 507 may be part of a second stage, labeled as Stage 2, in which an estimate $k_{2,stage2\_estimate}$ for the lens distortion parameter $k_2$, an estimate $p_{1,stage2\_estimate}$ for the lens distortion parameter $p_1$, and an estimate $p_{2,stage2\_estimate}$ for the lens distortion parameter $p_2$ are determined based on estimated values of Stage 1, which includes the estimate $k_{1,stage1\_estimate}$. In the example of FIG. 8, the second lens distortion parameter of step 507 may be $k_2$, $p_1$, or $p_2$. In some instances, as further depicted in FIG. 8, another estimate for the first lens distortion parameter $k_1$ (that is, $k_{1,stage2\_estimate}$) may be determined in Stage 2 based on the estimate $k_{1,stage1\_estimate}$ from Stage 1.

For instance, Stage 2 in FIG. 8 may also involve solving the above equations involving $d_x$, $d_y$, and the projection matrix. In an embodiment, the estimate $k_{1,stage1\_estimate}$ may be used as an initial guess (or, more generally, an initial estimate) for $k_1$ when solving the above equations during Stage 2. Because Stage 1 focuses on estimating $k_1$, its estimate $k_{1,stage1\_estimate}$ may have a high level of accuracy, which results in more accuracy in Stage 2, and/or reduced computation time. The higher level of accuracy in Stage 2 may apply to $k_{2,stage2\_estimate}$, $p_{1,stage2\_estimate}$, $p_{2,stage2\_estimate}$, as well as to $k_{1,stage2\_estimate}$. In some instances, Stage 2 may further determine one or more respective estimates $f_{x,\ stage2\_estimate}$, $f_{y,\ stage2\_estimate}$, $c_{x,\ stage2\_estimate}$, and/or $c_{y,\ stage2\_estimate}$ for one or more projection parameters based on estimated values from Stage 1 (e.g., based on $k_{1,stage1\_estimate}$, $f_{x,stage1\_estimate}$, $c_{x,stage1\_estimate}$, and/or $c_{y,stage1\_estimate}$). Stage 2 may also improve the accuracy of the respective estimates for one or more projection parameters by relying on the output of Stage 1 as initial guesses. In an embodiment, the respective estimates for the lens distortion parameters and/or projection parameters determined in Stage 2 (e.g., $k_{2,stage2\_estimate}$, $p_{1,stage2\_estimate}$, $p_{2,stage2\_estimate}$, $k_{1,stage2\_estimate}$, $f_{x,stage2\_estimate}$, $f_{y,stage2\_estimate}$, $c_{x,stage2\_estimate}$, and/or $c_{y,stage2\_estimate}$) may further be based on estimates of the projection parameters determined in Stage 1 (e.g., $f_{x,stage1\_estimate}$, $f_{y,stage1\_estimate}$, $c_{x,stage1\_estimate}$, and/or $c_{y,stage1\_estimate}$).

In an embodiment, step 507 may involve estimating only a subset of the lens distortion parameters of a lens distortion model used for camera calibration, while estimating a remaining one or more lens distortion parameters to be zero, or without estimating the remaining one or more lens distortion parameters. For instance, the estimate for the second lens distortion parameter may be determined in step 507 while an estimate for a third lens distortion parameter is determined to be zero, or is not estimated. For example, FIG. 8 depicts an example in which $k_{2,stage2\_estimate}$, $p_{1,stage2\_estimate}$, and $p_{2,stage2\_estimate}$ (one of which may be an estimate for the second lens distortion parameter) and $k_{1,stage2\_estimate}$ are determined for $k_2$, $p_1$, $p_2$, and $k_1$, respectively, while $k_{3,stage2\_estimate}$ for the lens distortion parameter $k_3$ is estimated to be zero, or is not determined. In this example, $k_3$ may be the third lens distortion parameter. In an embodiment, the third lens distortion parameter for step 507 may be a coefficient that describes a highest-order component among a set of components which describe lens distortion or a particular type of lens distortion. For instance, $k_3$ may describe a highest-order radial polynomial component $k_3 r^6$ among a set of radial polynomial components $k_1 r^2$, $k_2 r^4$, $k_3 r^6$ of the polynomial model. In an embodiment, because $k_3 r^6$ is a relatively high-order effect, the radial lens distortion may be sensitive to small changes in $k_3$, which may cause $k_3$ to be unstable and difficult to accurately estimate. Further, an inaccurate $k_3$ may negatively impact an accuracy of estimates for $k_1$, $k_2$, $p_1$, and/or $p_2$. Thus, step 507, or more specifically Stage 2, may forego estimation of the third lens distortion parameter $k_3$, or estimate it to be zero, so as to focus on estimating other lens distortion parameters (e.g., $k_1$, $k_2$, $p_1$, and/or $p_2$). For instance, the lens distortion parameters being estimated for steps 505-507 may be a set of lens distortion parameters of a distortion model (e.g., polynomial distortion model), and may be divided into the third lens distortion parameter (e.g., $k_3$) and a subset of other lens distortion parameters, such as a subset of all other lens distortion parameters (e.g., $k_1$, $k_2$, $p_1$, and $p_2$) of the set of lens distortion parameters of the distortion model. In such an example, Stage 2 may determine respective estimates for all lens distortion parameters of the subset of lens distortion parameters (e.g., $k_1$, $k_2$, $p_1$, and $p_2$) while estimating the third lens distortion parameter (e.g., $k_3$) to be zero, or without estimating the third lens distortion parameter. In some cases, estimating of the third lens distortion parameter (e.g., $k_3$) may be delayed to a subsequent stage (e.g., Stage 3), as discussed below in more detail.

In an embodiment, step 507 may involve solving equations which involve another simplified version of the distortion functions $d_x$, $d_y$. This other simplified version may be obtained by constraining the third lens distortion parameter (e.g., $k_3$) to be zero, to yield $d_{x\_simplified2}$ and $d_{y\_simplified2}$:

$$d_{x\_simplified2} = \tilde{X}(1+k_1 r^2 + k_2 r^4) + 2p_1 \tilde{X}\tilde{Y} + p_2(r^2 + 2\tilde{X}^2) \quad \text{(Equation 13)}$$

$$d_{y\_simplified2} = \tilde{Y}(1+k_1 r^2 + k_2 r^4) + 2p_2 \tilde{X}\tilde{Y} + p_1(r^2 + 2\tilde{Y}^2) \quad \text{(Equation 13)}$$

In some implementations, the computing system 110 in step 507 may receive $d_{x\_simplified2}$ and $d_{y\_simplified2}$ from the non-transitory computer-readable medium 115 and solve equations involving the simplified distortion functions and involving the projection matrix, to solve for $k_1$, $k_2$, $p_1$, $p_2$, $f_x$, $f_y$, $c_x$, and $c_y$.

Returning to FIG. 5, the method 500 may in an embodiment include a step 509 in which the computing system 110 determines camera calibration information that includes respective estimates for the set of lens distortion parameters. The respective estimates for the set of lens distortion parameters may include or be based on the estimate of the first lens distortion parameter determined in step 505 (e.g., $k_{1,\ stage1\_estimate}$) and/or the estimate of the second lens distortion parameter determined in step 507 (e.g., $k_{2,\ stage1\_estimate}$).

In an embodiment, estimating intrinsic camera calibration parameters may involve only Stage 1 and Stage 2, in which case the respective estimates for the set of lens distortion parameters may include at least the estimate of the second lens distortion parameter determined in step 507, or more specifically include $k_{1,stage2\_estimate}$, $k_{2,stage2\_estimate}$, $k_{2,stage2\_estimate}$, $p_{1,stage2\_estimate}$, $p_{2,stage2\_estimate}$, $f_{x,\ stage2\_estimate}$, $f_{y,\ stage2\_estimate}$, $c_{x,stage2\_estimate}$, and $c_{y,stage2\_estimate}$. The respective estimates may, e.g., be directly used to perform hand-eye calibration, stereo calibration, or for some other purpose. In an embodiment, estimating intrinsic camera calibration parameters in step 509 may involve additional stages, such as Stages 3-5, which are illustrated in FIGS. 9A through 12B. As stated above, an estimate from one stage may be input to a next consecutive stage to generate a more refined estimate.

Figure 9A:
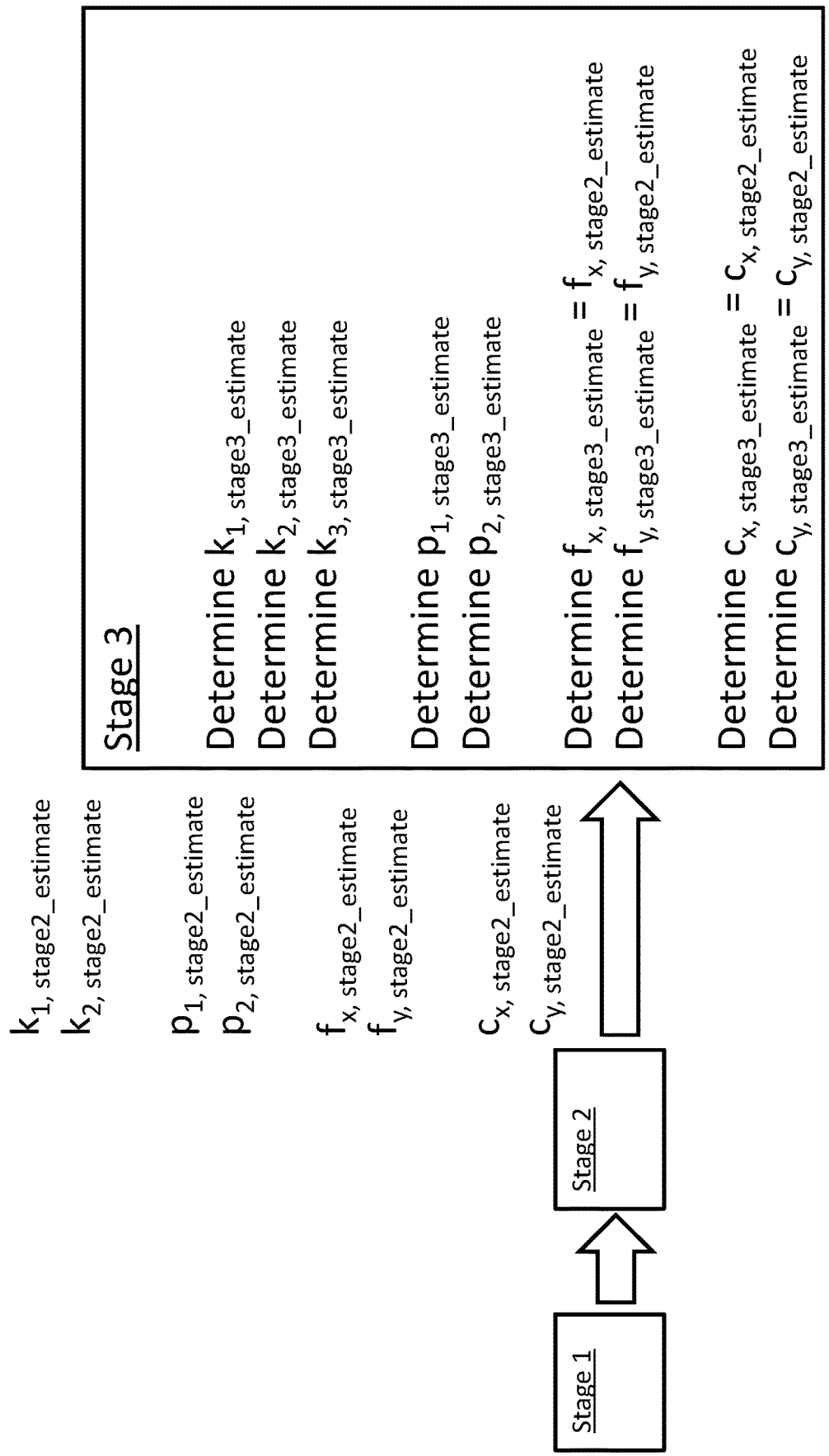
FIGS. 9A-9C illustrate an example pipeline having multiple stages that include a curvature reduction stage, according to an embodiment herein.

FIG. 9A depicts an example of a Stage 3 which follows Stage 2, and which generates more refined estimates for $k_1$, $k_2$, $p_1$, $p_2$ based on estimates of those parameters from Stage 2. More specifically, Stage 3 may generate $k_{2,stage3\_estimate}$, $p_{1,stage3\_estimate}$, $p_{2,stage3\_estimate}$, $k_{1,stage3\_estimate}$ based on an output of Stage 2. These estimates generated in Stage 3 may be considered updated estimates relative to the estimates from Stage 2.

In an embodiment, Stage 3 may be a curvature reduction stage. The curvature reduction stage may apply an inverse of the distortion functions discussed above (that is, apply $d_x^{-1}$ and $d_y^{-1}$) to the calibration image (e.g., 680E in FIG. 6E) to generate a modified version of the calibration image that attempts to remove or reduce an effect of lens distortion. For example, an inverse projection matrix $K^{-1}$ may be applied to the calibration image to determine $[\hat{X}/Z\ \hat{Y}/Z\ 1]^T$ coordinates, wherein $\hat{X}$ and $\hat{Y}$ may represent, e.g., where a particular pattern element or other feature is located in a camera field of view. The coordinates $[\hat{X}/Z\ \hat{Y}/Z\ 1]^T$ may include an effect of lens distortion, and the inverse distortion functions may be applied to $\hat{X}$ and $\hat{Y}$ to determine $\tilde{X}$ and $\tilde{Y}$ or X and Y, which may be coordinates in which the effect of the lens distortion has been removed or otherwise reduced. The projection matrix K may be applied to $\tilde{X}$ and $\tilde{Y}$ or X and Y to generate the modified version of the calibration image that reduces the effect of lens distortion. Generating the modified version of the calibration image is discussed in more detail in U.S. patent application Ser. No. 16/295,940, entitled "Method and System for Performing Automatic Camera Calibration for Robot Control," the entire content of which is incorporated by reference herein. As stated above, lens distortion may introduce curvature into the appearance of a calibration pattern (e.g., 460) in the calibration image. Stage 3 may attempt to find estimates for the lens distortion parameters such that the resulting inverse distortion functions can generate a modified version of the calibration image that removes or reduces the curvature.

In an embodiment, Stage 3 may use one or more respective initial estimates for one or more lens distortion parameters (e.g., initial estimates for $k_1$, $k_2$, $k_3$, $p_1$, $p_2$). These initial estimates may be adjusted to yield updated estimates for Stage 3. In some cases, these initial guesses may be equal to or based on (directly or indirectly) respective estimates of the lens distortion parameters from previous stages. For instance, the initial estimate for $k_1$ in Stage 3 may be equal to or based on $k_{1,stage2\_estimate}$ and/or $k_{1,stage1\_estimate}$. In this example, $k_1$ may be a first lens distortion parameter. Similarly, the initial estimate for a second lens distortion parameter (e.g., $k_2$, $p_1$, $p_2$) may be equal to or based on its estimate from Stage 2 and/or Stage 1 (e.g., $k_{2,stage2\_estimate}$ and/or $k_{2,stage1\_estimate}$). As depicted in FIG. 9A, the curvature reduction stage may also determine an estimate for $k_3$, which may be a third lens distortion parameter in this example. In some cases, Stage 3 may determine an initial estimate of $k_3$ to be zero.

Figures 9B, 9C:
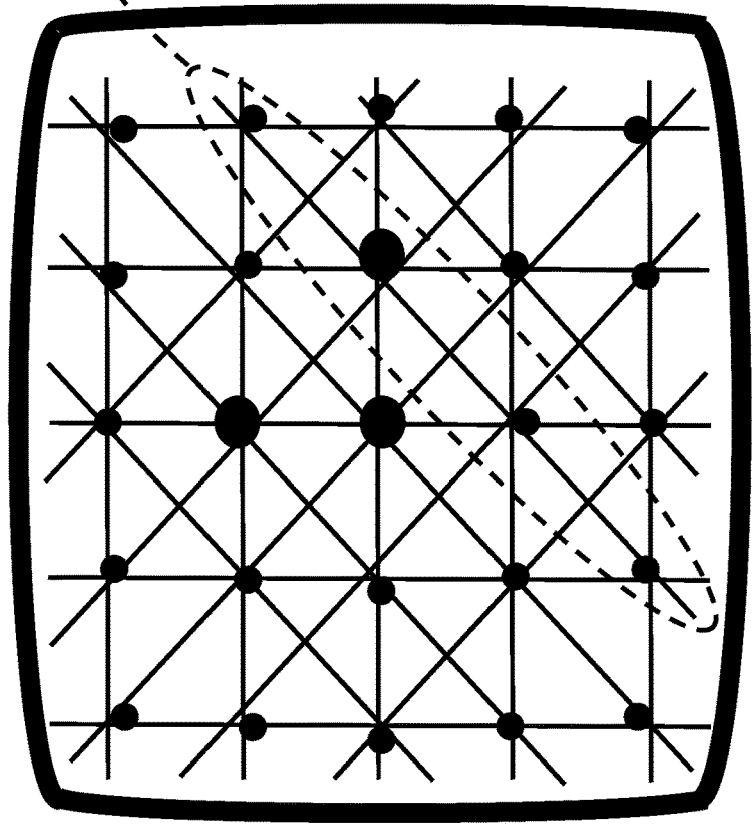

As stated above, the curvature reduction stage may generate, based on the initial estimate of $k_1$, $k_2$, $k_3$, $p_1$, and/or $p_2$ for that stage, a modified version of the calibration image that compensates against lens distortion associated with the camera (e.g., 470). For example, FIG. 9B depicts an example of a modified version of the calibration image 680E. The curvature reduction stage may further involve determining an amount of curvature in the modified version of the calibration image, and adjusting the respective initial estimates of $k_1$, $k_2$, $k_3$, $p_1$, and/or $p_2$ based on the amount of curvature in the modified version of the calibration image so as to generate respective adjusted estimates for $k_1$, $k_2$, $k_3$, $p_1$, and/or $p_2$ that reduce the amount of curvature. The adjustment may be performed once, or may be performed multiple times over multiple iterations to produce the respective adjusted estimates. The respective adjusted estimates may be set as the respective updated estimates of the lens distortion parameters produced by the curvature reduction stage. That is, the respective adjusted estimates may be set as $k_{1,stage3\_estimate}$, $k_{2,stage3\_estimate}$, $k_{3,stage3\_estimate}$, $p_{1,stage3\_estimate}$, $p_{2,stage3\_estimate}$.

In an embodiment, a line fitting technique may be used to determine an amount of curvature in the modified version of the calibration image. For instance, when the plurality of pattern elements in the calibration pattern (e.g., 460) are a plurality of dots (e.g., circular dots), the amount of curvature may be determined by: fitting a plurality of straight lines through the plurality of dots (e.g., through respective centers of the dots) in the modified version of the calibration image, and determining the amount of curvature based on a distance between each straight line of the plurality of straight lines and a respective dot (e.g., a respective center of the dot) of the plurality of dots through which the straight line is fitted. FIG. 9C illustrate the line fitting being performed for a modified version of the calibration image (also referred to as a modified calibration image) that still exhibits a degree of lens distortion. As a result, one or more of the straight lines does not go through respective centers of all of the pattern elements (e.g., dots) through which that straight line is fit. More specifically, FIG. 9C shows line fitting for a portion of the dots of FIG. 9B. In FIG. 9C, a line that is fitted through four dots are off from respective centers of three dots out of the four dots. The amount of curvature may be calculated based on a respective distance between a center of each dot and the fitted line in FIG. 9C, as indicated by a respective arrow stemming from the fitted line. In an embodiment, the amount of curvature for the modified version of the calibration image may be represented by a total curvature score, which may be, e.g., a sum of respective curvature scores for individual lines involved in the line fitting. In an embodiment, the curvature reduction stage may involve optimizing respective estimated values of a plurality of distortion parameters so as to minimize a total curvature score for a modified version of the calibration image, wherein the modified version is generated based on the estimated values. The line fitting technique is discussed in more detail in U.S. patent application Ser. No. 16/295,940, entitled "Method and System for Performing Automatic Camera Calibration for Robot Control," the entire content of which is incorporated by reference herein.

In an embodiment, one or more of the projection parameters, or more specifically the projection matrix or inverse projection matrix, may be fixed in value in Stage 3. For instance, FIG. 9A illustrates an example in which the projection parameters $f_x$, $f_y$, $c_x$, $c_y$ in Stage 3 are fixed in value at their respective estimates from Stage 2. In other words, $f_{x,stage3\_estimate}=f_{x,stage2\_estimate}$; $f_{y,stage3\_estimate}=f_{y,stage2\_estimate}$; $c_{x,stage3\_estimate}=c_{x,stage2\_estimate}$; and $c_{y,stage3\_estimate}=c_{y,stage2\_estimate}$. The updated estimates for the lens distortion parameters in Stage 3 may be determined based on the respective estimates for the projection parameters from Stage 2. In some cases, the projection parameters may describe a linear transformation between locations in a camera field of view and pixel coordinates. In such cases, the projection parameters may have little to no effect on the amount of curvature in the modified version of the calibration image, because the curvature may be due to a nonlinear effect. Thus, the projection parameters may be fixed in value during Stage 3 so as to focus on the lens distortion parameters or other parameters that do have an effect on the amount of curvature in the modified version of the calibration image.

Figure 10:
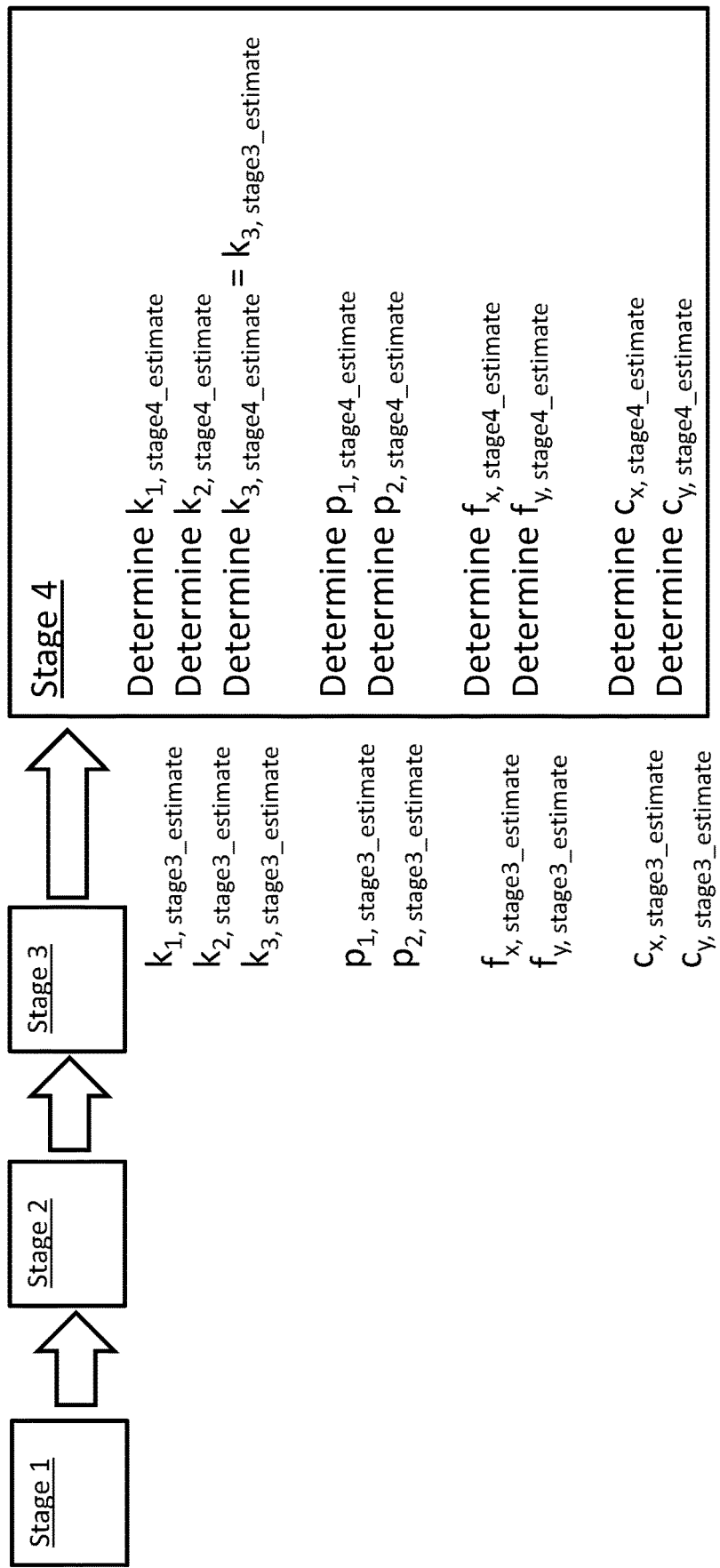
FIGS. 10-11 illustrate examples pipeline having multiple stages for estimating camera calibration parameters, according to an embodiment herein.

In an embodiment, determining the camera calibration information in step 509 may involve only Stage 1 through Stage 3, and the respective estimates for the set of lens distortion parameters may be equal to $k_{1,\ stage3\_estimate}$; $k_{2,\ stage3\_estimate}$; $k_{3,\ stage3\_estimate}$; $p_{1,\ stage3\_estimate}$; $p_{2,\ stage3\_estimate}$, which may be directly used to perform hand-eye calibration, stereo calibration, or for some other purpose. In an embodiment, as depicted in FIG. 10, determining the camera calibration information in step 509 may include a Stage 4 which follows Stage 3. Stage 4 may, for example, use estimates from Stage 3 as an input to generate more refined estimates for various lens distortion parameters and/or projection parameters.

In an embodiment, Stage 4 may fix an estimate of $k_3$, or more generally a third lens distortion parameter, in value at an estimate output by Stage 3, such that $k_{3,stage4\_estimate}$ is equal to $k_{3,stage3\_estimate}$. As stated above, the camera calibration information may include a third lens distortion parameter (e.g., $k_3$) that describes a highest-order radial polynomial component among a set of radial polynomial components of a lens distortion model (e.g., polynomial model). In some cases, Stage 4 may fix such a third lens distortion parameter in value, because the sensitivity of the third lens distortion parameter may affect an accuracy of the estimates for the other lens distortion parameters.

In an embodiment, Stage 4 may update an estimate for the projection parameters, such as $f_x$, $f_y$, $c_x$, and/or $c_y$. More specifically, as discussed above, the projection parameters may in some cases be fixed in value in Stage 3, which generates an estimate for the third lens distortion parameter (e.g., $k_{3,stage3\_estimate}$) and generates respective updated estimates for other lens distortion parameters, such as the updated estimate for the first lens distortion parameter (e.g., $k_{1,stage3\_estimate}$) and the updated estimate for the second lens distortion parameter (e.g., $k_{2,stage3\_estimate}$, $p_{1,stage3\_estimate}$, or $p_{2,stage3\_estimate}$). In Stage 3, the projection parameters may be subject to the constraints that $f_{x,stage3\_estimate} = f_{x,stage2\_estimate}$; $f_{y,stage3\_estimate} = f_{y,stage2\_estimate}$; $c_{x,stage3\_estimate} = c_{x,stage2\_estimate}$; and $c_{y,stage3\_estimate} = c_{y,stage2\_estimate}$, as depicted in FIG. 9A. After Stage 3, the estimates for the projection parameters may be updated in Step 4, as depicted in FIG. 10. For example, the computing system 110 in Stage 4 may determine $f_{x,stage4\_estimate}$; $f_{y,stage4\_estimate}$; $c_{x,stage4\_estimate}$; $c_{y,stage4\_estimate}$. These updated estimates for the projection parameters generated by Stage 4 may be determined based on the estimate of the lens distortion parameters determined from Stage 3, such as $k_{1,stage3\_estimate}$, $k_{2,stage3\_estimate}$, $k_{3,stage3\_estimate}$, $p_{1,stage3\_estimate}$, and/or $p_{2,stage3\_estimate}$.

Figure 11:
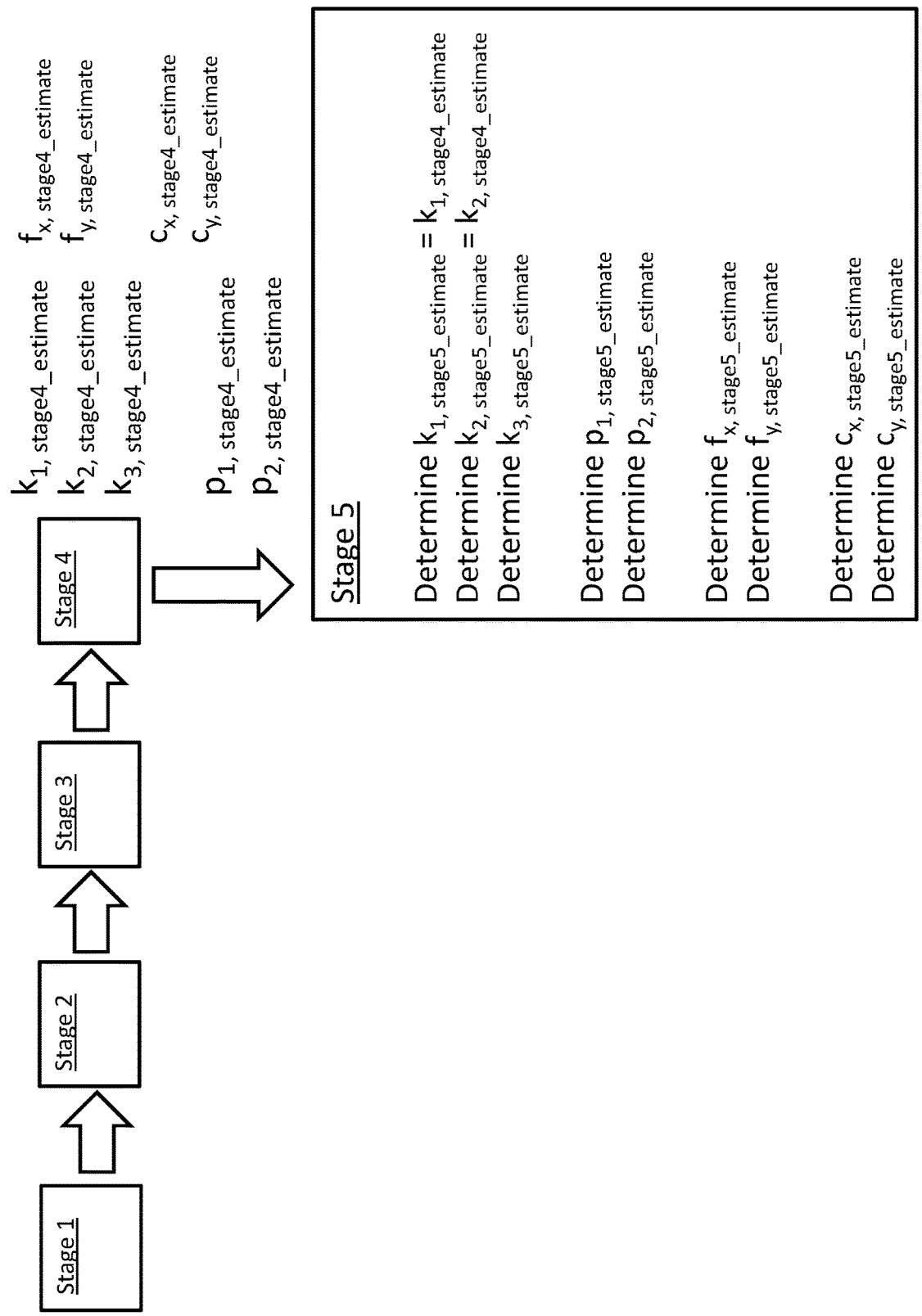

In an embodiment, determining the camera calibration information in step 509 may involve only Stage 1 through Stage 4, and the respective estimates of the set of lens distortion parameters may be equal to $k_{1,stage4\_estimate}$; $k_{2,stage4\_estimate}$; $k_{3,stage4\_estimate}$; $p_{1,stage4\_estimate}$; $p_{2,stage4\_estimate}$, and respective estimates for the projection parameters may be equal to $f_{x,stage4\_estimate}$; $f_{y,stage4\_estimate}$; $f_{y,stage4\_estimate}$; $c_{x,\ stage4\_estimate}$; and $c_{y,\ stage4\_estimate}$, which may be used to directly perform hand-eye calibration, stereo calibration, or for some other purpose. In an embodiment, step 509 may involve a Stage 5 that follows Stage 4. As depicted in FIG. 11, Stage 5 may be subsequent to Stage 4, or more generally subsequent to Stage 1.

In some cases, a first lens distortion parameter and/or a second lens distortion parameter (e.g., $k_1$ and $k_2$) may be fixed in value in Stage 5 while an estimate for an additional lens distortion parameter (e.g., $k_3$, $p_1$, $p_2$) other than the first lens distortion parameter and the second lens distortion parameter is determined in that stage. In such cases, the estimates for $k_1$ and $k_2$ from Stage 4 may be sufficiently accurate, such that the estimates do not need to be further refined in Stage 5. Further, fixing $k_1$ and $k_2$ in value may improve a stability in accurately estimating $k_3$, and thus may allow Stage 5 to focus on improving that parameter.

As depicted in FIG. 11, the first lens distortion parameter and the second lens distortion parameter (e.g., $k_1$, $k_2$) in Stage 5 may be fixed in value at an estimate outputted by Stage 4, such as $k_{1,stage4\_estimate}$ and $k_{2,stage4\_estimate}$. In some instances, if estimates of the first lens distortion parameter and the second lens distortion parameter (e.g., $k_{1,stage1\_estimate}$ and $k_{2,stage1\_estimate}$) are determined in an earlier stage (e.g., Stage 1), then the estimates of the first lens distortion parameter and the second lens distortion parameter from Stage 4 may be referred to as updated estimates of the first lens distortion parameter and the second lens distortion parameter, respectively. In such instances, the estimate for the additional lens distortion parameter(s) in Stage 5 may be referred to as being based on the updated estimate of the first lens distortion parameter and/or the updated estimate of the second lens distortion parameter.

Figure 12A:
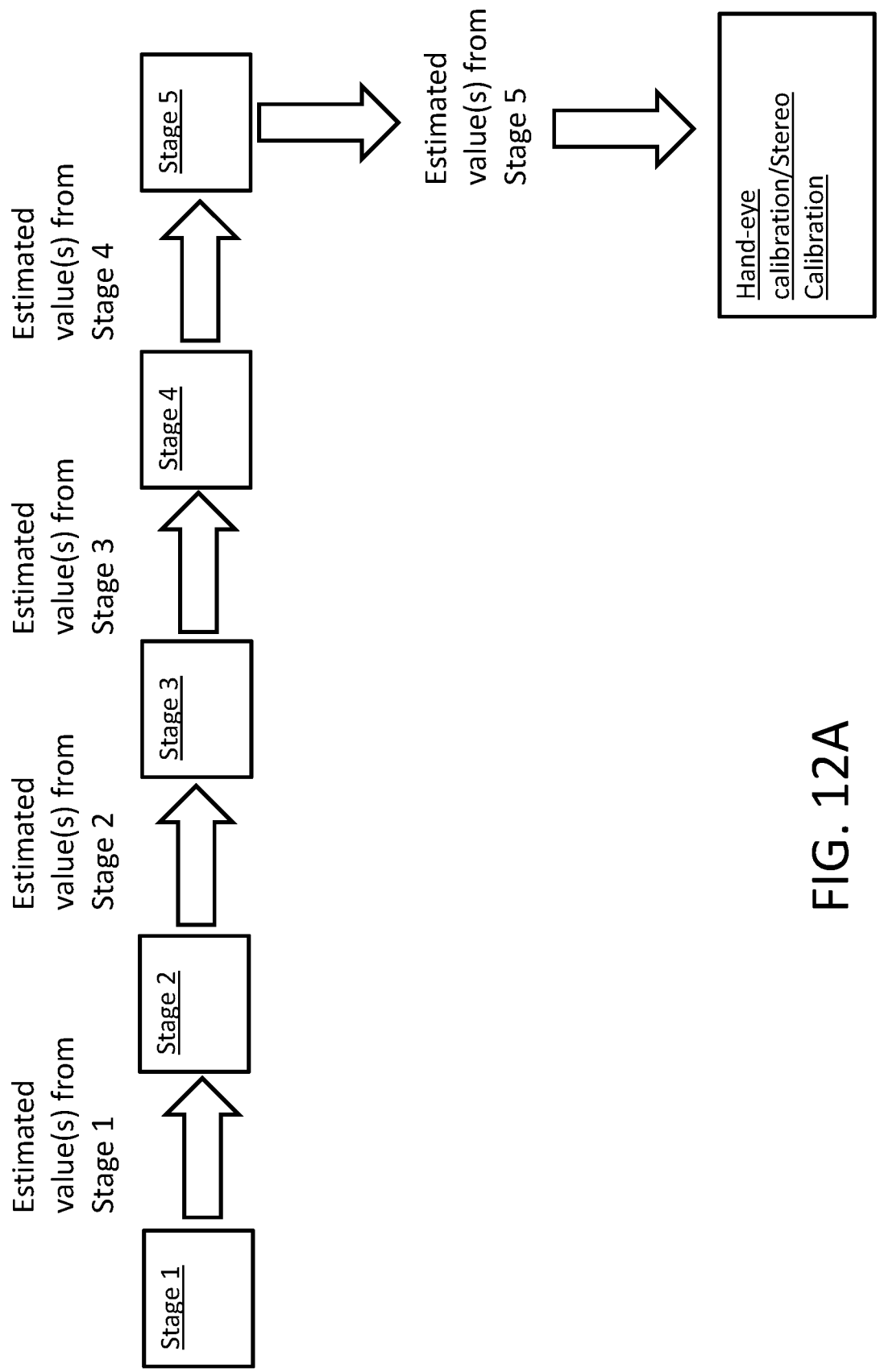
FIGS. 12A-12B illustrate example pipelines having multiple stages for estimating camera calibration parameters, according to an embodiment herein.

In an embodiment, the camera calibration determined in step 509 may include estimates from Stage 5, such as $k_{1,stage5\_estimate}$; $k_{2,stage5\_estimate}$; $k_{3,stage5\_estimate}$; $p_{1,stage5\_estimate}$; $p_{2,stage5\_estimate}$; $f_{x,stage5\_estimate}$; $f_{y,stage5\_estimate}$; $c_{x,stage5\_estimate}$; and $c_{y,stage5\_estimate}$. In an embodiment, these estimates may be used to perform hand-eye calibration and/or stereo calibration, as depicted in FIG. 12A. The hand-eye calibration may determine a relationship between the camera (e.g., 470) and its external environment, such as a spatial relationship between the camera (e.g., 470 of FIG. 4B) and a base of a robot (e.g., base 452 of robot 450). The stereo calibration may determine a spatial relationship between the camera (e.g., 170/370/470) and another camera (e.g., 180). Hand-eye calibration and stereo calibration are discussed in more detail in U.S. patent application Ser. No. 16/295,940, entitled "Method and System for Performing Automatic Camera Calibration for Robot Control," the entire content of which is incorporated by reference herein in its entirety.

Figure 12B:
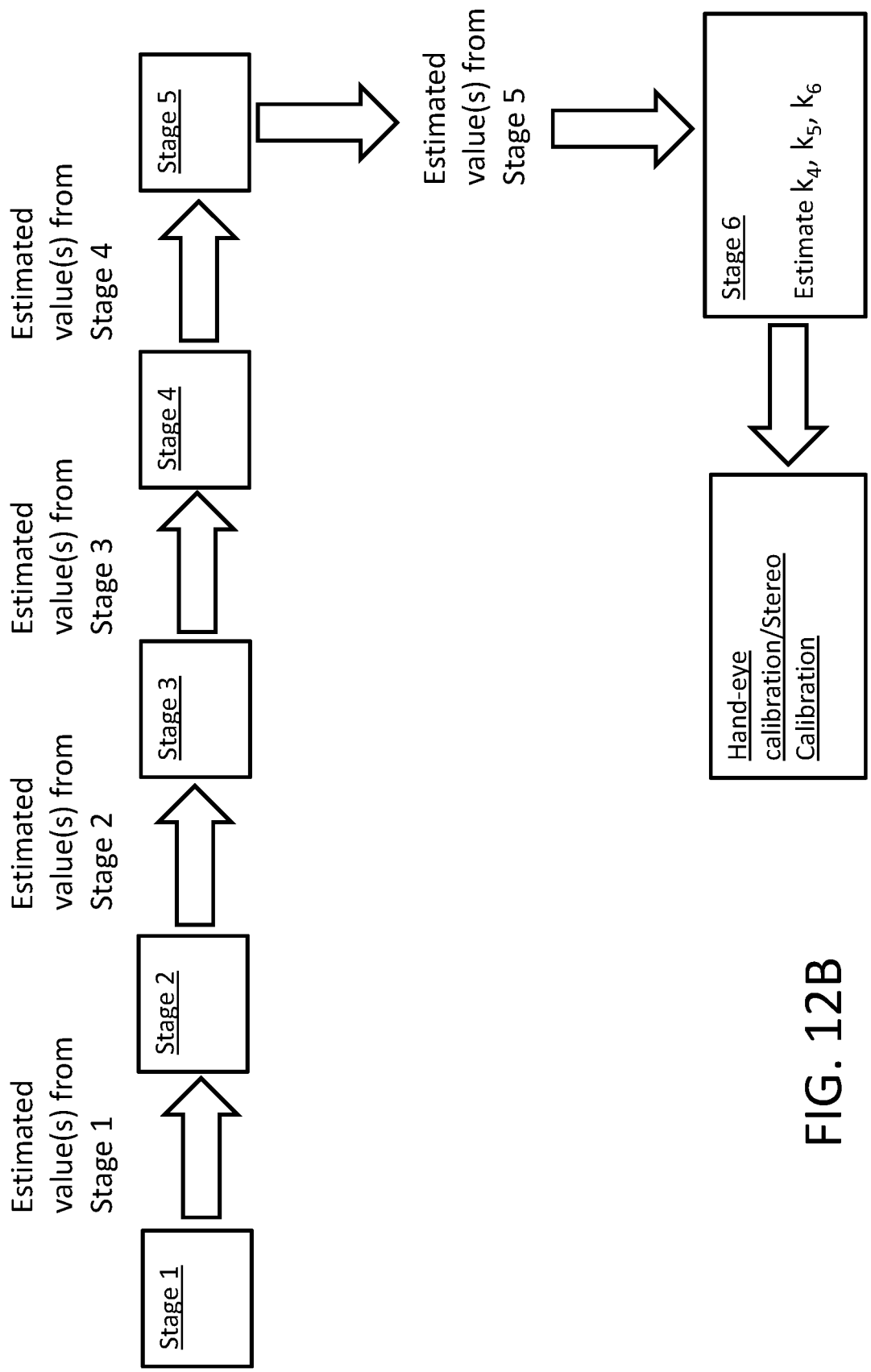

In some cases, the estimates from Stage 5 may be used to determine further estimates of the lens distortion parameters, or to determine estimates for other lens distortion parameters. For example, FIG. 12B depicts an example in which the camera calibration of method 500 uses a rational model, which involves the lens distortion parameters $k_1$, $k_2$, $k_3$, $k_4$, $k_5$, $k_6$, $p_1$, and $p_2$. In such an example, Stages 1 through 5 may be dedicated to estimating lens distortion parameters of a polynomial model, or more specifically $k_1$, $k_2$, $k_3$, $p_1$, and $p_2$, while $k_4$, $k_5$, $k_6$ in those stages are estimated to be zero, or are not estimated. In such an example, step 509 may further include a Stage 6 that determines an estimate for at least $k_4$, $k_5$, or $k_6$ based on at least the estimates of $k_1$, $k_2$, $k_3$, $p_1$, and $p_2$ from Stage 5.

In an embodiment, one or more stages of Stage 1 through Stage 6 of FIGS. 7A through 12B may be omitted, or rearranged. For example, some embodiments may omit Stages 3 through 6. As another example, some embodiments may omit Stages 4 through 6, or omit Stage 2, Stage 4, or Stage 5.

Returning to FIG. 5, the method 500 may include a step 511 in which the computing system 110 receives a subsequent image generated by the camera (e.g., 470) after camera calibration has been performed. For example, the image may be generated by the camera (e.g., 470) during a robot operation, such as a de-palletization operation or a bin picking operation. In some scenarios, the image may capture or otherwise represent an object with which there is to be robot interaction. For example, the object may be a package to be de-palletized, or a component to be gripped. In an embodiment, the method 500 may include a step 513, in which the computing system 110 generates a movement command for controlling robot movement, such as movement of the robot arm 454 of FIGS. 4A-4B. The movement command may be generated based on the subsequent image and based on the camera calibration information (e.g., intrinsic camera calibration information and/or hand-eye calibration information), and may be used to perform the robot interaction. For example, the computing system 110 may be configured to determine a spatial relationship between the robot arm 454 and the object to be gripped, wherein the spatial relationship may be determined based on the subsequent image and based on the camera calibration information, as discussed in more detail in U.S. patent application Ser. No. 16/295,940, entitled "Method and System for Performing Automatic Camera Calibration for Robot Control," the entire content of which is incorporated by reference herein in its entirety. In an embodiment, one or more steps of method 500 in FIG. 5, such as steps 511 and 513, may be omitted.

Figure 13A:
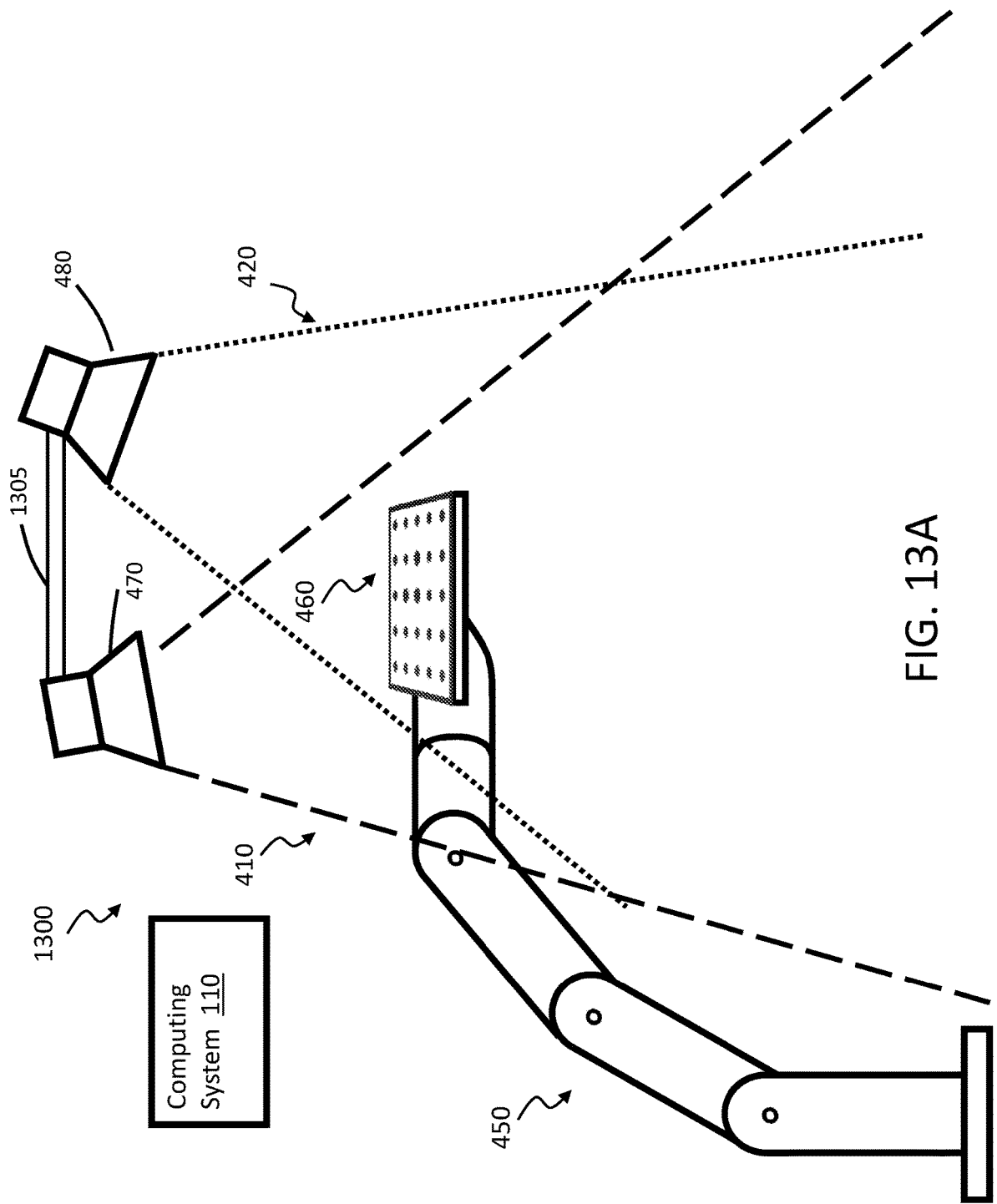
FIGS. 13A-13B depict an example system for performing stereo calibration, according to an embodiment herein.
Figure 13B:
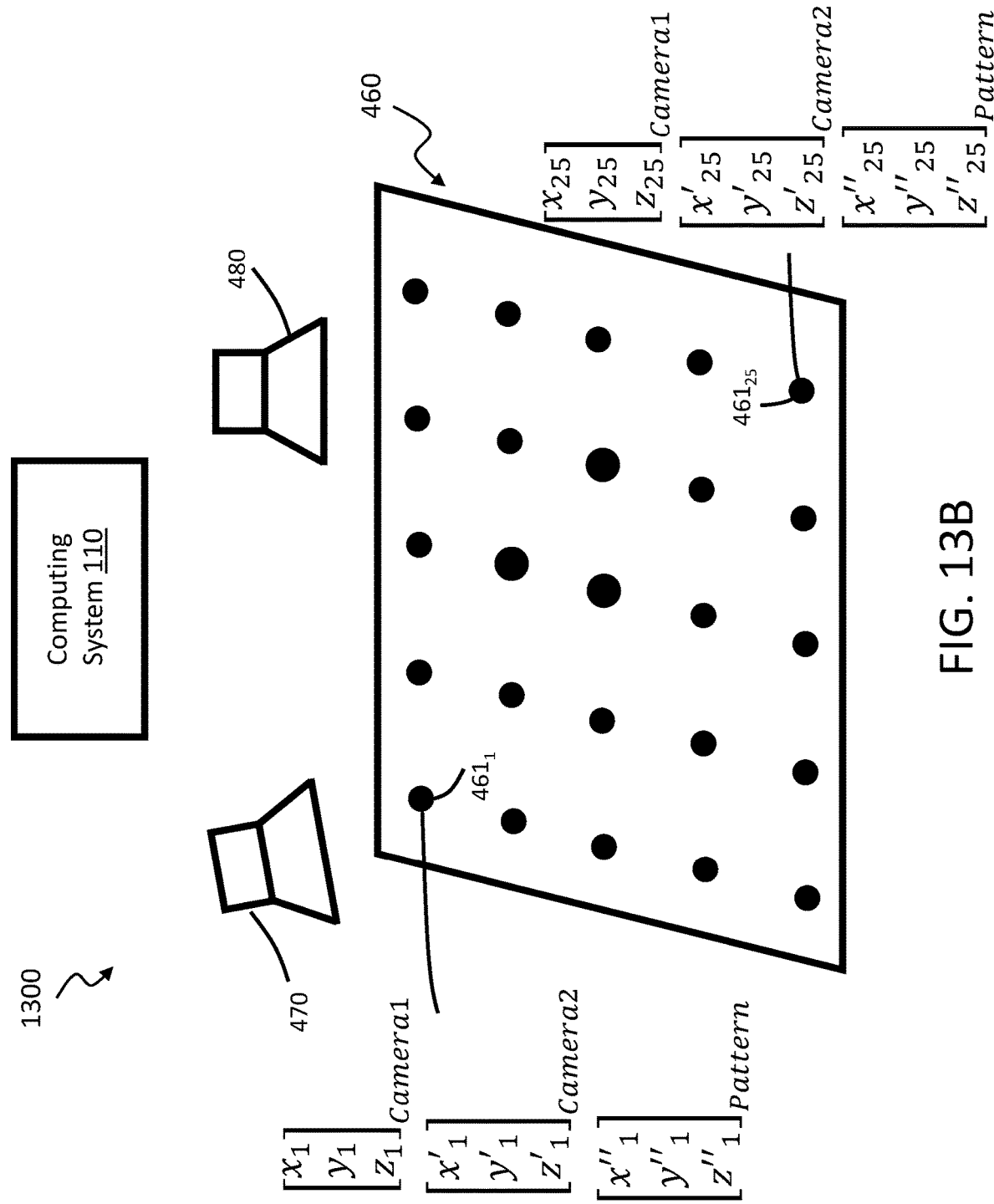

As stated above, one aspect of the present disclosure relates to improving an accuracy of stereo camera calibration, and more specifically to effectively measuring how much error there is in an estimate (e.g., estimated transformation function) used by the stereo camera calibration, so that the stereo camera calibration can be improved by reducing the error in such an estimate. The stereo camera calibration may involve, e.g., determining a spatial relationship between two cameras. For example, FIGS. 13A-13B depicts a system 1300 that includes a first camera 470 and a second camera 480. The system 1300 may be an embodiment of the system 100B of FIG. 1C, and/or of the system 400 of FIGS. 4A-4B. Further, the camera 480 may be an embodiment of the camera 180. The system 1300 may include a mounting frame 1305 to which the first camera 470 and the second camera 480 are mounted. In some cases, the mounting frame 1305 may keep the two cameras 470, 480 fixed in position and/or orientation relative to each other.

In the embodiment of FIGS. 13A-13B, stereo camera calibration may be performed to determine a spatial relationship between the first camera 470 and the second camera 480, such as a relative location and relative orientation of the two cameras. For example, the stereo calibration may involve determining a transformation function $T^{Camera1}_{Camera2}$ or $T^{Camera2}_{Camera1}$ which describes the spatial relationship. The transformation function may be, e.g., a matrix that describes a rotation and/or a translation between a coordinate system of the first camera 470 and a coordinate system of the second camera 480, such as in the following equation:

$$T^{camera1}_{camera2} = \begin{bmatrix} R^{camera1}_{\phantom{camera1}camera2} & t^{camera1}_{\phantom{camera1}camera2} \\ 0^{camera2} & 1^{camera2} \end{bmatrix} \quad \text{(Equation 14)}$$

In an embodiment, the stereo camera calibration for the system 1300 of FIGS. 13A-13B may involve the use of a calibration pattern 460, which may be disposed on a robot 450 or disposed on some other structure. As discussed above with respect to FIG. 4C, the calibration pattern may have a plurality of pattern elements, such as pattern element $461_1$. In some instances, the pattern elements may be at respective locations that have a first set of respective coordinates relative to the first camera 470 and that have a second set of respective coordinates relative to the second camera 480. More specifically, the physical locations of the pattern elements may have a first set of coordinates in a coordinate system of the first camera 470, and have a second set of coordinates in a coordinate system of the second camera. For instance, as depicted in FIG. 13B, a location of pattern element $461_1$ may have a coordinate $[x_1 \ y_1 \ z_1]^T_{Camera1}$ in a coordinate system of the first camera 470, and have a coordinate $[x'_1 \ y'_1 \ z'_1]^T_{Camera2}$ in a coordinate system of the second camera 480. Further, as discussed above with respect to FIG. 4C, the respective locations of the pattern elements may also have defined pattern element coordinates in the pattern coordinate system. For example, the pattern element $461_1$ may be at a coordinate $[x''_1 \ y''_1 \ z''_1]^T_{Pattern}$ in the pattern coordinate system, wherein values of $x''_1$, $y''_1$, and $z''_1$ are predefined. In an embodiment, stereo calibration may be performed based on the first set of coordinates, the second set of coordinates, and/or the defined pattern element coordinates, as discussed below in more detail.

Figure 15A:
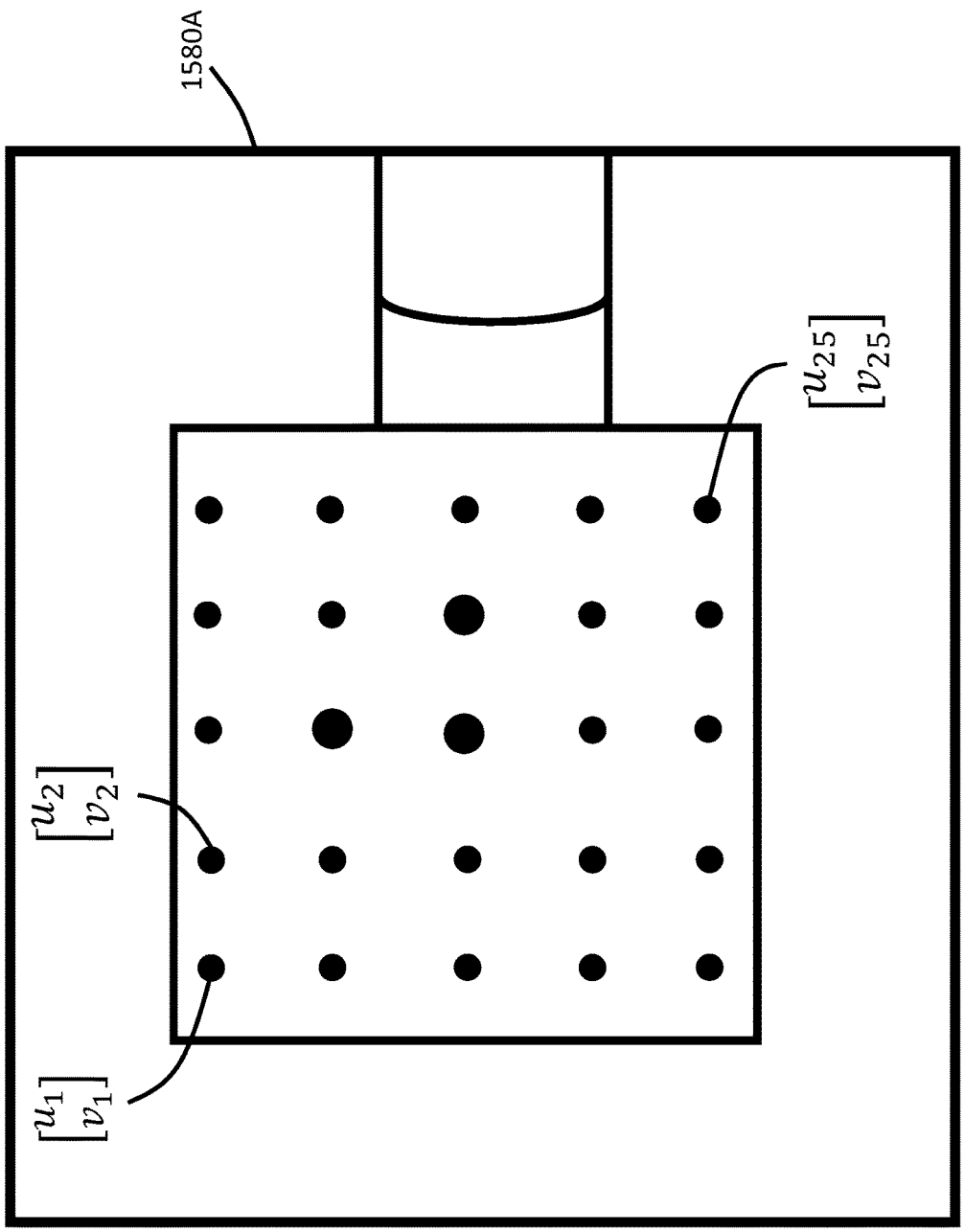
FIGS. 15A and 15B depict example calibration images, according to an embodiment herein.
Figure 15B:
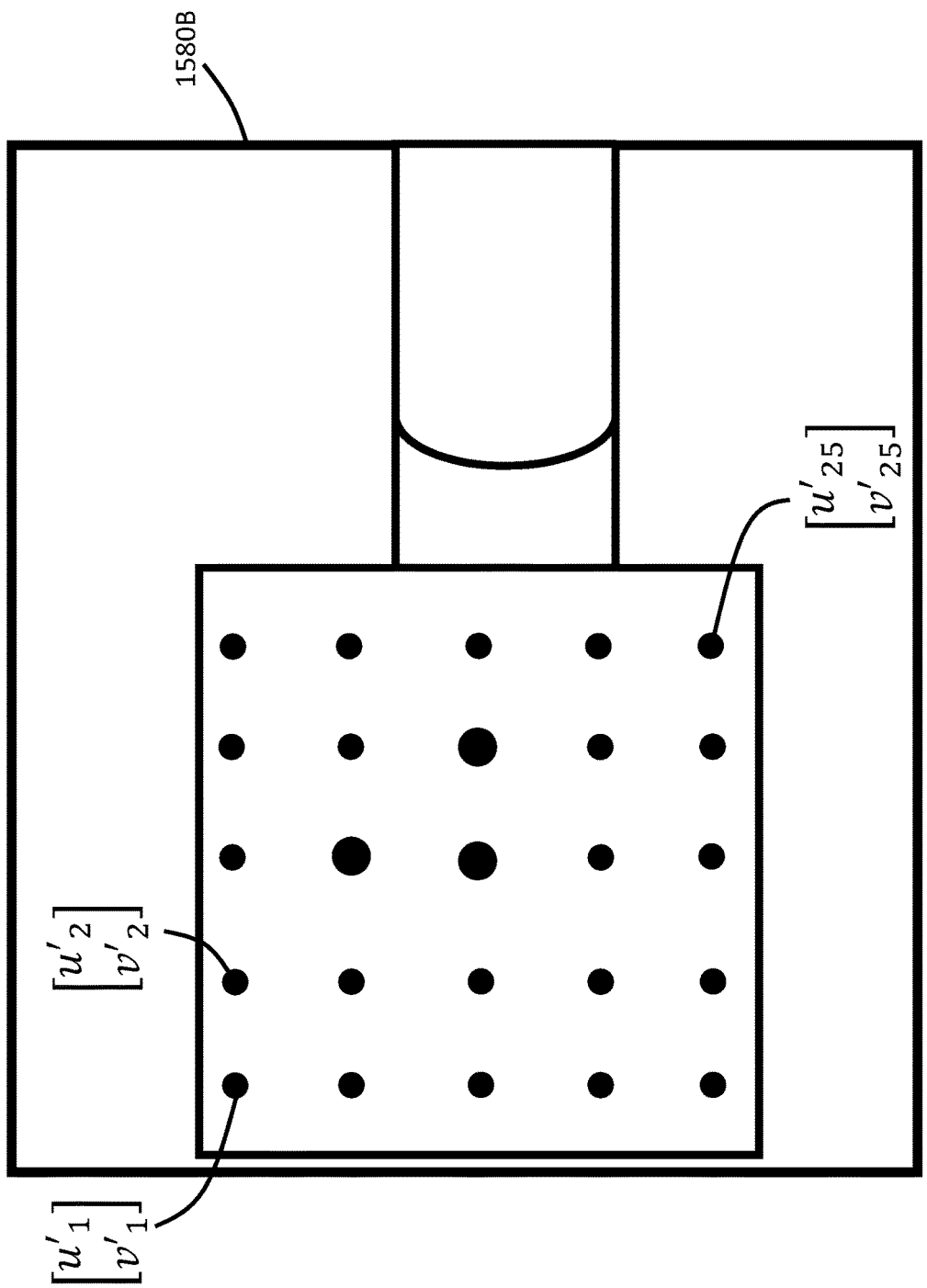

FIG. 14 depicts a flow diagram of a method 1400 for performing stereo calibration. In an embodiment, the method 1400 may be performed by the computing system 110 of FIGS. 1A-1C and of FIG. 2, or more specifically by the control circuit 111 of the computing system 110. The stereo calibration may involve a first camera (e.g., 170/470 of FIGS. 1C and 13A) having a first camera field of view (e.g., 410 of FIG. 13A) and a second camera (e.g., 180/480) having a second camera field of view (e.g., 420). As stated above, the computing system 110 may be configured to communicate with the first camera (e.g., 170/470) and the second camera (e.g., 480), such as via the communication interface 113 (of FIG. 2). In an embodiment, the method 1400 may be performed when a calibration pattern (e.g., 160/460) having a plurality of pattern elements is or has been in the first camera field of view (e.g., 410) and the second camera field of view (e.g., 420), and further when the first camera (e.g., 470) and the second camera (e.g., 480) have generated a first calibration image and a second calibration image, respectively. The first calibration image and the second calibration image may each be an image representing the calibration pattern (e.g., 460). For instance, FIGS. 15A and 15B depict a first calibration image 1580A and a second calibration image 1580B, both of which is a respective image representing the calibration pattern 460 of FIGS. 13A and 13B. The first calibration image 1580A may be generated by the first camera 470, and the second calibration image 1580B may be generated by the second camera 480. Further, the calibration pattern 460 may have remained stationary relative to the first camera 470 and the second camera 480 during a period in which the calibration images 1580A, 1580B are generated. In such a situation, the first calibration image 1580A may be referred to as corresponding with the second calibration image 1580B, or vice versa.

Returning to FIG. 14, the method 1400 may in an embodiment include a step 1401, in which the computing system 110 receives the first calibration image (e.g., 1580A) generated by the first camera (e.g., 470). The method may further include a step 1403, in which the computing system 110 receives the second calibration image (e.g., 1580B) generated by the second camera (e.g., 480). In some cases, the computing system 110 may receive the first calibration image (e.g., 1580A) and/or the second calibration image (e.g., 1580B) directly from the first camera (e.g., 470) and/or the second camera (e.g., 480). In some cases, the first calibration image (e.g., 1580A) and/or the second calibration image (e.g., 1580B) may have been stored in the non-transitory computer-readable medium 115 of FIG. 2 (e.g., a solid state drive), and the computing system 110 may receive the first and/or second calibration image from the solid state drive.

In an embodiment, the method 1400 may include a step 1405, in which the computing system determines an estimate of a transformation function for describing a spatial relationship between the first camera and the second camera, such as the matrix $T^{Camera1}_{Camera2}$ or $T^{Camera2}_{Camera1}$ discussed above. The matrix may, for instance, describe a rotation and/or a translation between a coordinate system of the first camera 470 and a coordinate system of the second camera 480. In an embodiment, the estimate of the transformation function may be determined using the eight-point algorithm or some other technique.

As stated above, one aspect of the present disclosure relates to determining an amount of error in the transformation function determined from step 1405. In some cases, the error may be determined based on comparing a first plurality of coordinates that are determined from the first calibration image (e.g., 1580A) and a plurality of transformed coordinates that are determined from the second calibration image (e.g., 1580B). As discussed below in more detail with respect to steps 1407 through 1413, the comparison may involve determining an offset between the first plurality of coordinates and the plurality of transformed coordinates (e.g., respective distances between the coordinates), and/or determining angle values based on the coordinates. As further discussed below, the computing system may determine a re-projection error, a reconstruction error, and/or a reconstruction error angle to characterize the amount of error in the transformation function. While the steps discussed below may be used to determine an error in the transformation function, they may in some cases also be used to determine the transformation function. For example, the coordinates determined in steps 1407 and 1409, which are discussed below in more detail, may in some instances be used to determine the estimate of the transformation function in step 1405.

More particularly, method 1400 may include a step 1407 in which the computing system 110 determines, based on the first calibration image (e.g., 1580A of FIG. 15A), a first plurality of coordinates that describe or otherwise represent respective locations of the plurality of the pattern elements (e.g., $461_1$ through $461_{25}$ of FIG. 4C) relative to the first camera (e.g., 470). In an embodiment, the method 1400 may include a step 1409 in which the computing system 110 determines, based on the second calibration image (e.g., 1580B of FIG. 15B), a second plurality of coordinates that describe respective locations of the plurality of pattern elements (e.g., $461_1$ through $461_{25}$ of FIG. 4C) relative to the second camera (e.g., 480 of FIGS. 13A and 13B). As discussed below in more detail (with respect to steps 1411 and 1413), the second plurality of coordinates may be transformed into a plurality of transformed coordinates using the estimate of the transformation function, which is an estimate of a spatial relationship between the first camera (e.g., 470) and the second camera (e.g., 480). If the estimate of the transformation function has a high level of accuracy, the first plurality of coordinates and the plurality of transformed coordinates may be substantially or exactly the same. As the estimate of the transformation function loses accuracy, the first plurality of coordinates and the plurality of transformed coordinates may exhibit greater differences from each other.

Referring back to steps 1407 and 1409, the first plurality of coordinates and/or the second plurality of coordinates determined in those steps may in some cases be image coordinates, or more specifically pixel coordinates. As an example, the first plurality of coordinates may be a first plurality of pixel coordinates $[u_1\ v_1]^T \ldots [u_{25}\ v_{25}]^T$, which are illustrated in FIG. 15A. These pixel coordinates may describe respective locations at which the plurality of pattern elements $461_1$ through $461_{25}$ of the calibration pattern 460 (of FIG. 4C) appear in the first calibration image 1580A of FIG. 15A. Moreover, as stated above the first plurality of pixel coordinates $[u_1\ v_1]^T \ldots [u_{25}\ v_{25}]^T$ may be expressed relative to the first camera (e.g., 470). For example, the first plurality of coordinates may be expressed in a coordinate system of an image sensor (e.g., 373/373A of FIG. 3A) of the first camera (e.g., 470). In an example depicted in FIG. 15B, the second plurality of coordinates may be a second plurality of pixel coordinates $[u'_1\ v'_1]^T \ldots [u'_{25}\ v'_{25}]^T$ that describe respective locations at which the plurality of pattern elements $461_1$ through $461_{25}$ of the calibration pattern 460 (of FIG. 4C) appear in the second calibration image 1580B. The second plurality of pixel coordinates $[u'_1\ v'_1]^T \ldots [u'_{25}\ v'_{25}]^T$ may be expressed relative to the second camera (e.g., 480). For instance, the second plurality of coordinates may be expressed in a coordinate system of an image sensor of the second camera (e.g., 480).

In some cases, the first plurality of coordinates determined in step 1407 and/or the second plurality of coordinates determined in step 1409 may be 3D coordinates. As an example, the first plurality of coordinates may be the first plurality of 3D coordinates $[X_1\ Y_1\ Z_1]^T_{Camera1} \ldots [X_{25}\ Y_{25}\ Z_{25}]^T_{Camera1}$ illustrated in FIG. 13B, which may describe or otherwise represent respective physical locations of the plurality of pattern elements $461_1$-$461_{25}$ of the calibration pattern 460 relative to the first camera 470 of FIG. 13B. The first plurality of 3D coordinates $[X_1\ Y_1\ Z_1]^T_{Camera1} \ldots [X_{25}\ Y_{25}\ Z_{25}]^T_{Camera1}$ may be expressed relative to a coordinate system of the first camera 470 (which may also be referred to as a first camera coordinate system), which may be a coordinate system defined with respect to a location and orientation of the first camera 470. As further illustrated in FIG. 13B, the second plurality of coordinates may be the second plurality of 3D coordinates $[X'_1\ Y'_1\ Z'_1]^T_{Camera2} \ldots [X'_{25}\ Y'_{25}\ Z'_{25}]^T_{Camera2}$, which may describe respective physical locations of the plurality of pattern elements $461_1$-$461_{25}$ of the calibration pattern 460 relative to the second camera 480. More specifically, the second plurality of 3D coordinates $[X'_1\ Y'_1\ Z'_1]^T_{Camera2} \ldots [X'_{25}\ Y'_{25}\ Z'_{25}]^T_{Camera2}$ may be expressed relative to a coordinate system of the second camera 480 (which may also be referred to as a second camera coordinate system), which may be a coordinate system defined with respect to a location and orientation of the second camera 480.

In an embodiment, if the first plurality of coordinates and/or the second plurality of coordinates are 3D coordinates, they may in some cases be determined based on image coordinates. For example, if the first plurality of coordinates of step 1407 are the 3D coordinates $[X_1\ Y_1\ Z_1]^T_{Camera1}\ \ldots\ [X_{25}\ Y_{25}\ Z_{25}]^T_{Camera1}$, these 3D coordinates may be determined based on the pixel coordinates $[u_1\ v_1]^T\ \ldots\ [u_{25}\ v_{25}]^T$ from the first calibration image (e.g., 1580A). In such cases, the 3D coordinates $[X_1\ Y_1\ Z_1]^T_{Camera1}\ \ldots\ [X_{25}\ Y_{25}\ Z_{25}]^T_{Camera1}$ may indicate respective physical locations of the pattern elements $461_1$-$461_{25}$ when the calibration pattern 460 was photographed by the first camera 470. The 3D coordinates $[X_1\ Y_1\ Z_1]^T_{Camera1}\ \ldots\ [X_{25}\ Y_{25}\ Z_{25}]^T_{Camera1}$ may be determined in such an example based on the perspective-n-point algorithm, based on camera calibration information (e.g., from method 500), and/or based on some other technique. Similarly, if the second plurality of coordinates of step 1409 are the 3D coordinates $[X'_1\ Y'_1\ Z'_1]^T_{Camera2}\ \ldots\ [X'_{25}\ Y'_{25}\ Z'_{25}]^T_{Camera2}$, these 3D coordinates may be determined based on the pixel coordinates $[u'_1\ v'_1]^T\ \ldots\ [u'_{25}\ v'_{25}]^T$ from the second calibration image 1580B of FIG. 15B.

In an embodiment, the method 1400 may include a step 1411 in which the computing system 110 transforms the second plurality of coordinates into a plurality of transformed coordinates based on the estimate of the transformation function, wherein the plurality of transformed coordinates are relative to the first camera (e.g., 470). In some cases, step 1411 may involve applying the estimate of the transformation function to the second plurality of coordinates (which are expressed relative to the second camera, such as camera 480) so as to generate transformed coordinates which are intended to be expressed relative to the first camera (e.g., 470). As stated above, an accuracy of the estimate of the transformation function may be gauged by how close the transformed coordinates are to the first plurality of coordinates (which are also expressed relative to the first camera).

Figure 16A:
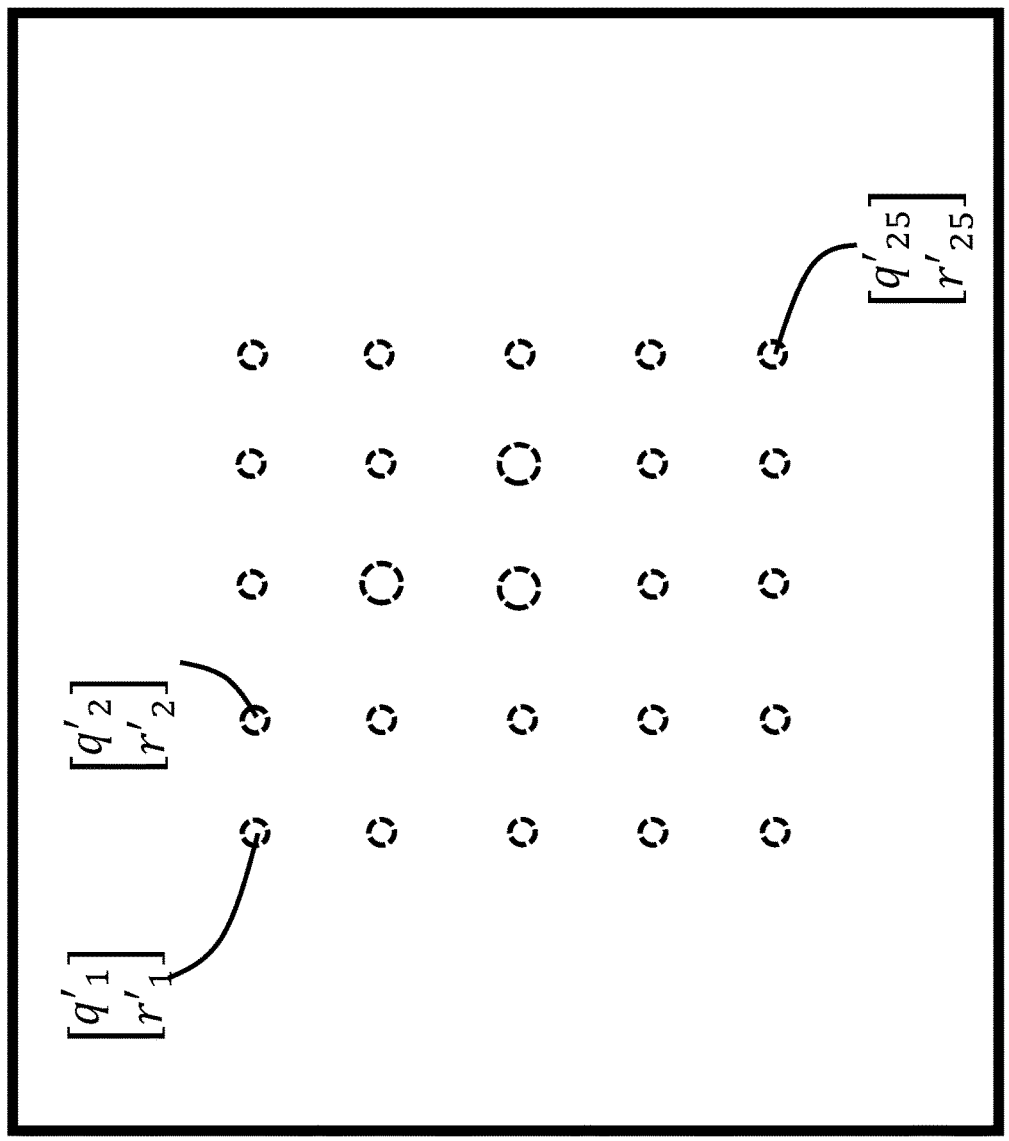
FIGS. 16A and 16B depict examples of transformed coordinates that are determined from an estimate of a transformation function, according to an embodiment herein.

In an embodiment, the plurality of transformed coordinates may be a plurality of image coordinates. If the first plurality of coordinates are also a plurality of image coordinates, then the plurality of transformed coordinates may be referred to as an additional plurality of image coordinates. If the transformed coordinates are image coordinates, they may be used to determine a re-projection error, which is discussed below in more detail. As an example, FIG. 16A depicts an example in which the plurality of transformed coordinates are image coordinates, or more specifically pixel coordinates $[q'_1\ r'_1]^T\ \ldots\ [q'_{25}\ r'_{25}]^T$, which may estimate, e.g., where the pattern elements $461_1$ to $461_{25}$ should appear in the second calibration image if the second calibration image had been generated by the first camera (e.g., 470) instead of the second camera. That is, the pixel coordinates $[q'_1\ r'_1]^T\ \ldots\ [q'_{25}\ r'_{25}]^T$ may approximate where physical locations of the pattern elements $461_1$ to $461_{25}$ would be projected onto on the image sensor of the first camera (e.g., 470).

Figure 16B:
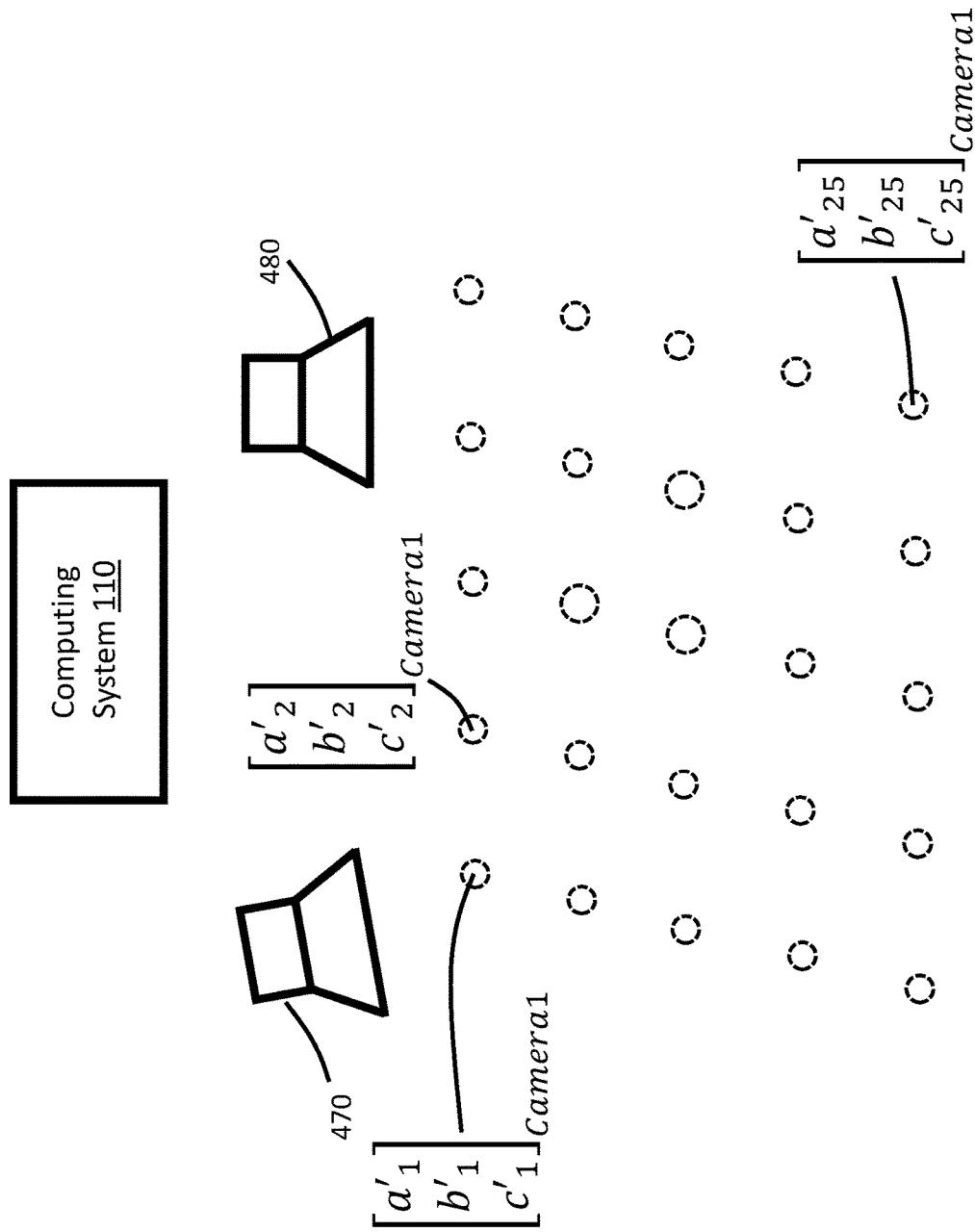

In an embodiment, if the plurality of transformed coordinates are image coordinates, they may be generated based on 3D coordinates. For instance, the 3D coordinates may describe physical locations of the pattern elements $461_1$ to $461_{25}$, and may be projected into image coordinates using a projection matrix, such as a projection matrix using the projection parameters from method 500. For example, FIG. 16B depicts a plurality of 3D coordinates $[a'_1\ b'_1\ c'_1]^T_{Camera1}\ \ldots\ [a'_{25}\ b'_{25}\ c'_{25}]^T_{Camera1}$ that are generated using the estimate of the transformation function, and that are expressed relative to or approximately relative to the first camera (e.g., 470). In some cases, the image coordinates $[q'_1\ r'_1]^T\ \ldots\ [q'_{25}\ r'_{25}]^T$ may be determined by applying a projection matrix and/or lens distortion parameters of the first camera (e.g., 470) to the 3D coordinates $[a'_1\ b'_1\ c'_1]^T_{Camera1}\ \ldots\ [a'_{25}\ b'_{25}\ c'_{25}]^T_{Camera1}$, as discussed above with respect to Equation 1 or Equations 7-10. As discussed above, the projection matrix may be used to determine how locations in the first camera's field of view (e.g., 410), or more specifically the 3D coordinates $[a'_1\ b'_1\ c'_1]^T_{Camera1}\ \ldots\ [a'_{25}\ b'_{25}\ c'_{25}]^T_{Camera1}$, are projected to an image plane for the first camera (e.g., 470). The 3D coordinates in this example may be determined based on the relationship (stated in homogeneous form):

$$[a'_n b'_n c'_n 1]^T_{Camera1} = T^{Camera2}_{Camera1}[X'_n Y'_n Z'_n 1]^T_{Camera2} \quad \text{(Equation 15)}$$

In the above example, $T^{Camera2}_{Camera1}$ may be a matrix that is an estimate of the transformation function determined in step 1405, while $[X'_n Y'_n Z'_n]^T_{Camera2}$ may be 3D coordinates that describe physical locations of the pattern elements $461_1$ to $461_{25}$ with respect to the second camera (e.g., 480), as discussed above with respect to FIG. 3B. The 3D coordinates $[X'_1\ Y'_1\ Z'_1]^T_{Camera2}\ \ldots\ [X'_{25}\ Y'_{25}\ Z'_{25}]^T_{Camera2}$ may be determined based on, e.g., the second calibration image (e.g., 1580B) and defined pattern element coordinates (e.g., $[X''_1\ Y''_1\ Z''_1]^T_{Pattern}\ \ldots\ [X''_{25}\ Y''_{25}\ Z''_{25}]^T_{Pattern}$). More specifically, a technique such as the perspective-n-point algorithm, or Zhang's algorithm may be used in determining the 3D coordinates $[X'_1\ Y'_1 Z'_1]^T_{Camera2}\ \ldots\ [X'_{25}\ Y'_{25}\ Z'_{25}]^T_{Camera2}$. Because a result of the above equation (Equation 15) may in some cases be used to determine the image coordinates $[q'_1\ r'_1]^T\ \ldots\ [q'_{25}\ r'_{25}]^T$, the image coordinates in these cases are based on the estimate of the transformation function, and thus may be used to determine an accuracy of the estimate of the transformation function, as discussed below in more detail.

In an embodiment, the plurality of transformed coordinates determined in step 1411 may be a plurality of 3D coordinates that estimate physical locations of the pattern elements $461_1$ to $461_{25}$ relative to the first camera (e.g., 470), such as relative to the first camera coordinate system. For instance, the plurality of transformed coordinates in such an embodiment may be the 3D coordinates $[a'_n\ b'_n c'_n\ 1]^T_{Camera1}$, which is determined using the estimate of the transformation function, as discussed above in Equation 15. If the first plurality of coordinates are also a plurality of 3D coordinates, then the plurality of transformed coordinates may be referred to as a plurality of transformed coordinates.

Returning to FIG. 14, the method 1400 may in an embodiment include a step 1413 in which the computing system 110 determines an error parameter value that describes respective differences between the first plurality of coordinates and the plurality of transformed coordinates.

In an embodiment, the error parameter value may be based on values representing respective distances (or, more generally, an offset) between the first plurality of coordinates and the plurality of transformed coordinates. If the first plurality of coordinates and the plurality of transformed coordinates are image coordinates (e.g., pixel coordinates), then the error parameter value may be a re-projection error, as discussed below. If the first plurality of coordinates and the plurality of transformed coordinates are 3D coordinates, the error parameter value may be a reconstruction error or reconstruction error angle, as also discussed below.

Figure 17A:
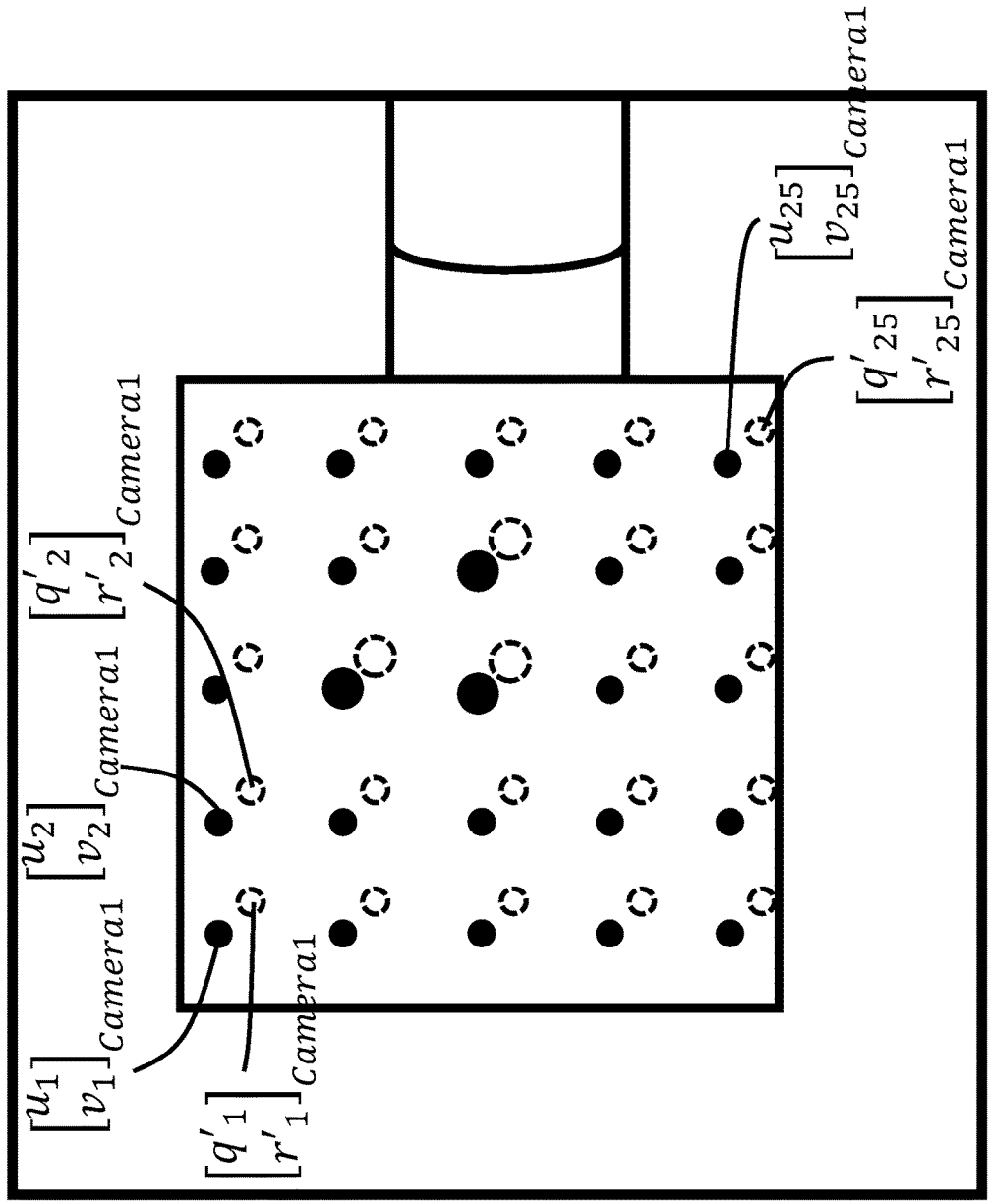
FIGS. 17A-17D depict examples of determining a re-projection error or a reconstruction error, according to an embodiment herein.

For example, FIG. 17A depicts an example in which first plurality of coordinates are the first plurality of pixel coordinates $[u_1 \ v_1]^T \ldots [u_{25} \ v_{25}]^T$ (as illustrated in FIG. 15A), and the plurality of transformed coordinates are an additional plurality of pixel coordinates $[q'_1 \ r'_1]^T \ldots [q'_{25} \ r'_{25}]^T$ (as illustrated in FIG. 16A). In such an example, the error parameter value may be based on respective distances d_pixel$_n$ between the first plurality of pixel coordinates and the additional plurality of pixel coordinates (also referred to as image distances or, more specifically, as pixel distances):

$$d\_\text{pixel}_n = \sqrt{(u_n - q'_n)^2 + (v_n - r'_n)^2}$$

In some cases, the error parameter value may be an average of the respective pixel distances (e.g., d_pixel$_1$ through d_pixel$_{25}$), or some other statistical metric based on the respective pixel distances. Such an error parameter value may be referred to as a re-projection error.

Figure 17B:
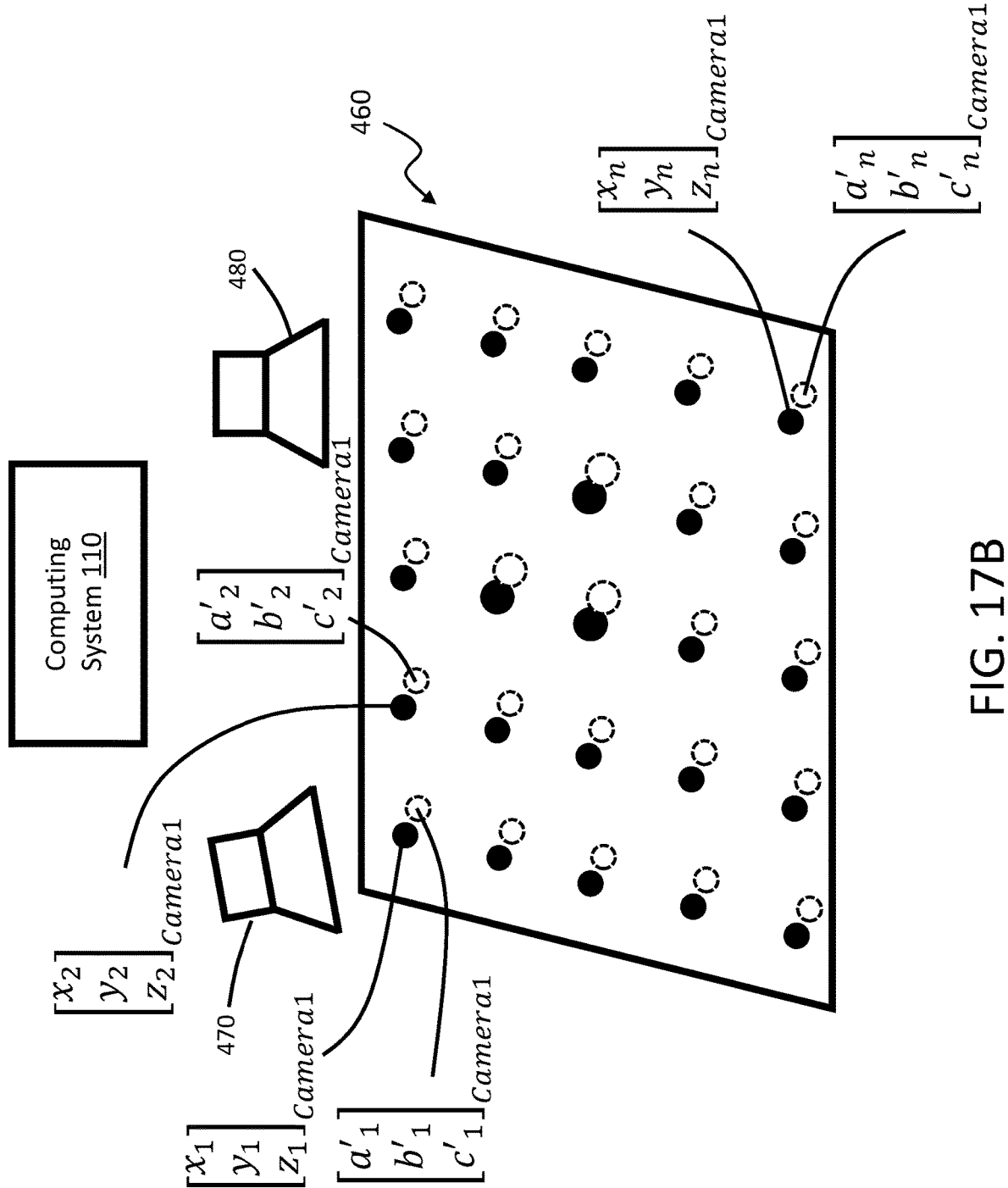

As another example, FIG. 17B illustrates a situation in which the first plurality of coordinates are the first plurality of 3D coordinates $[X_1 \ Y_1 \ Z_1]^T{}_{Camera1} \ldots [X_{25} \ Y_{25} \ Z_{25}]^T{}_{Camera1}$ (as illustrated in FIG. 13A), and the plurality of transformed coordinates are an plurality of 3D coordinates $[a'_1 \ b'_1 \ c'_1]^T{}_{Camera1} \ldots [a'_{25} \ b'_{25} \ c'_{25}]^T{}_{Camera1}$ (as illustrated in FIG. 16B). In such an example, the error parameter value may be based on respective distances d_physical$_n$ between the first plurality of 3D coordinates and the additional plurality of 3D coordinates (also referred to as 3D distances or physical distances):

$$d\_\text{physical}_n = \sqrt{(x_n - a'_n)^2 + (y_n - b'_n)^2 + (z_n - c'_n)^2}$$

In some cases, the error parameter value may be an average of the respective 3D distances (e.g., d_physical$_1$ through d_physical$_{25}$), or some other statistical metric based on the respective 3D distances. Such an error parameter value may be referred to as a reconstruction error.

Figure 17C:
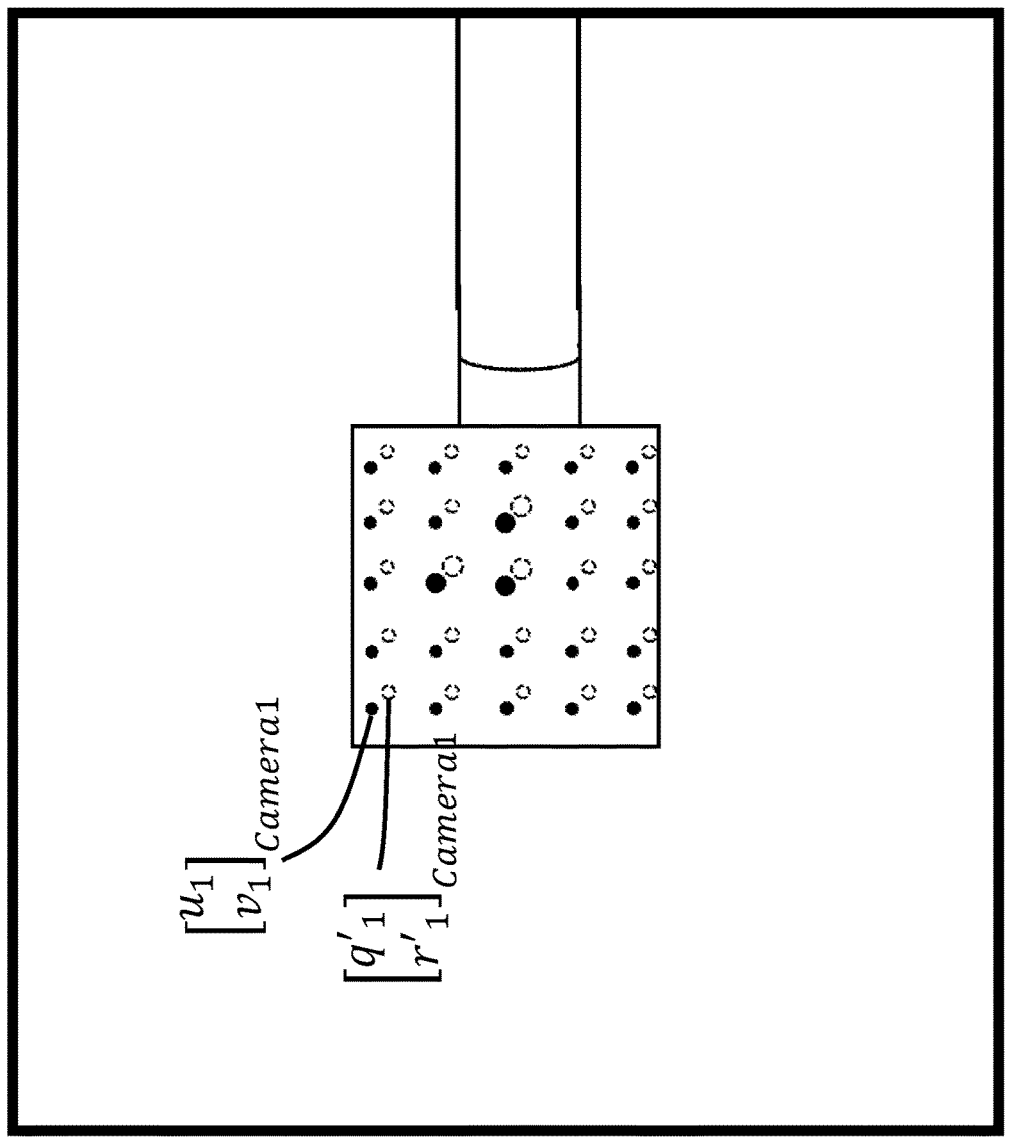

In an embodiment, a utility of the re-projection error or of the reconstruction error may depend on a distance between the first camera (e.g., 470) or second camera (e.g., 480) and the calibration pattern (e.g., 460) being captured (e.g., photographed). For instance, the re-projection error may have more utility when the calibration pattern (e.g., 460) is closer to the first camera (e.g., 470) and/or the second camera (e.g. 480). For instance, if the first camera (e.g., 470) and/or the second camera (e.g. 480) have limited resolution, distances between the first plurality of pixel coordinates and the additional plurality of pixel coordinates may become smaller and/or lose granularity as the calibration pattern (e.g., 460) is captured farther from the cameras. For example, FIG. 17C illustrates an example of a calibration image of the calibration pattern 460 generated by the first camera 470 of FIGS. 13A and 13B, in which the calibration pattern 460 is located farther from the first camera 470 relative to a situation in which the calibration image of FIG. 17A is generated. The calibration pattern 460 appears smaller in the calibration image of FIG. 17C relative to its appearance in the calibration image of FIG. 17A. The smaller appearance of the calibration image in FIG. 17C may cause $[u_n \ v_n]^T$ and $[q'_n \ r'_n]^T$ to appear closer together, and thus may reduce pixel distances d_pixel$_n$. In some cases, the reduced pixel distances may cause the error of the estimate of the transformation function to be under-assessed or down-weighted.

Figure 17D:
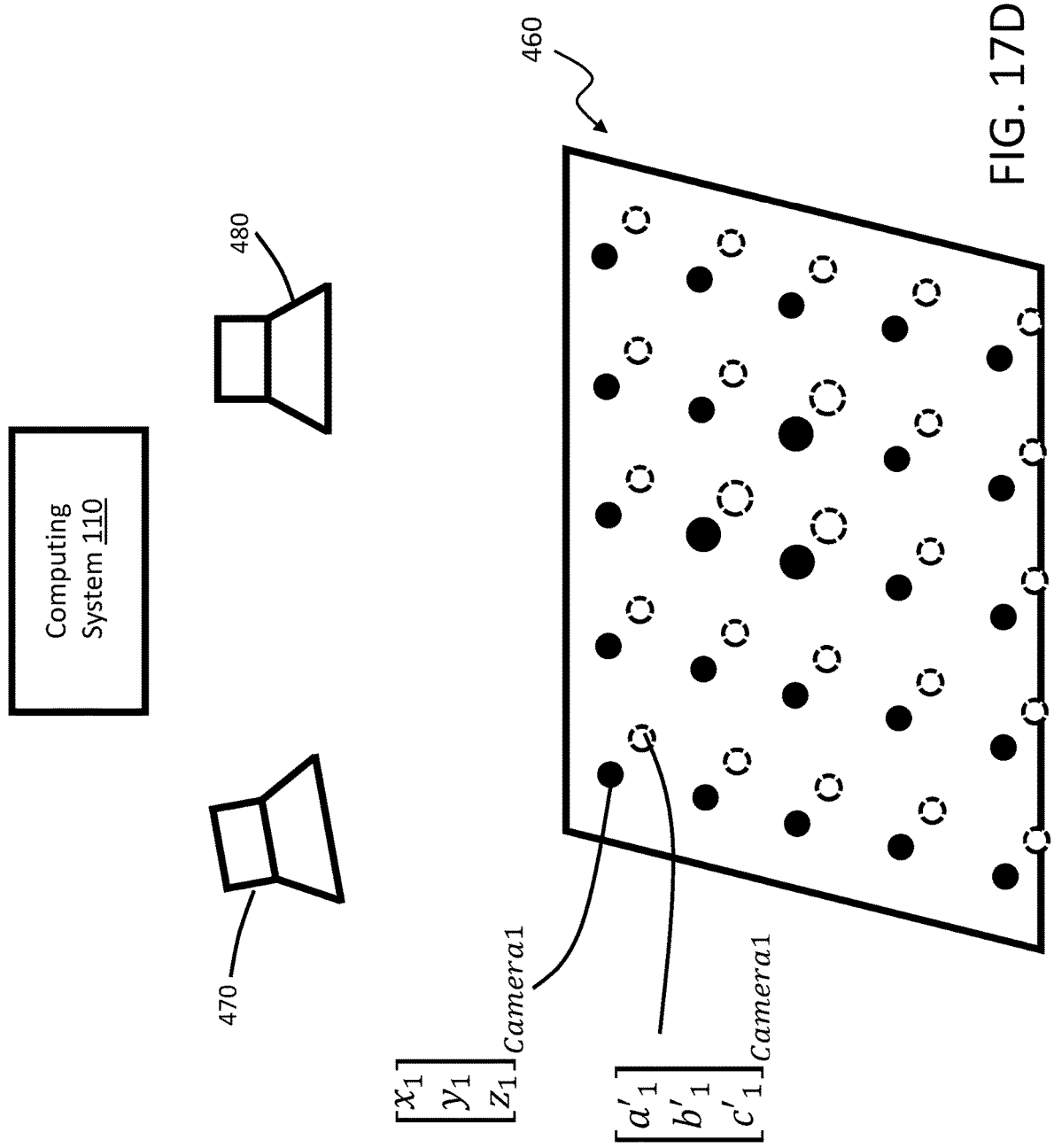

As stated above, the reconstruction error may also be dependent on a distance between the calibration pattern (e.g., 460) and the first camera (e.g., 470) and/or the second camera (e.g., 480). For instance, FIG. 17D illustrates the calibration pattern 460 being captured at a distance from the cameras that is farther relative to the scenario in FIG. 17B.

In this example, as the calibration pattern 460 moves farther from the first camera 470 and/or second camera 480, the estimate of the transformation function may cause the additional plurality of 3D coordinates $[a'_1 \ b'_1 \ c'_1]^T{}_{Camera1} \ldots [a'_{25} \ b'_{25} \ c'_{25}]^T{}_{Camera1}$ to have greater offset from the first plurality of 3D coordinates $[X_1 \ Y_1 \ Z_1]^T{}_{Camera1} \ldots [X_{25} \ Y_{25} \ Z_{25}]^T{}_{Camera1}$. The greater offset may increase the distances d_physical, which may cause the error of the estimate of the transformation function to be over-assessed or over-weighted.

Figure 18A:
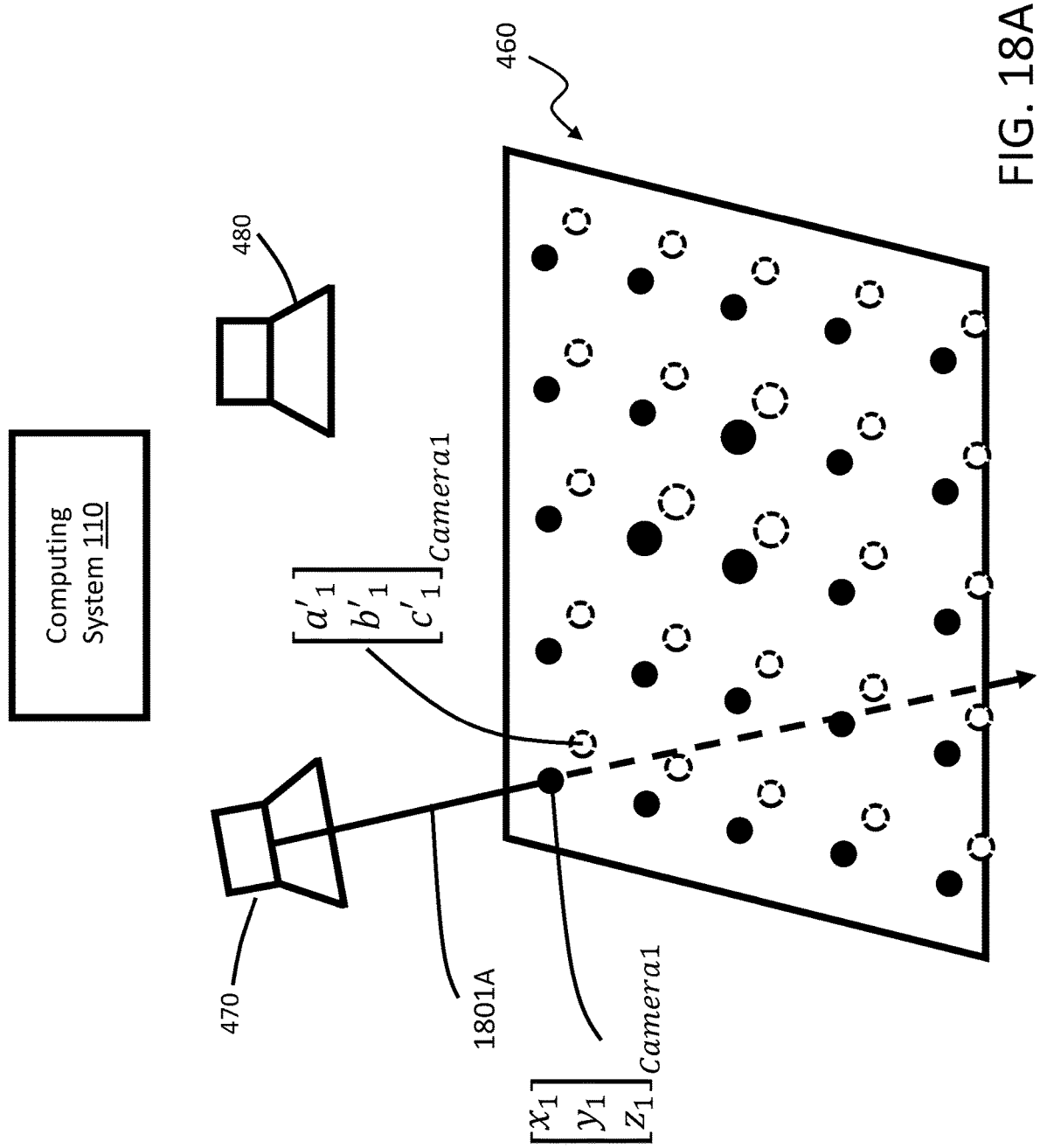
FIGS. 18A-18D depict examples of determining a reconstruction error angle, according to an embodiment herein.
Figure 18B:
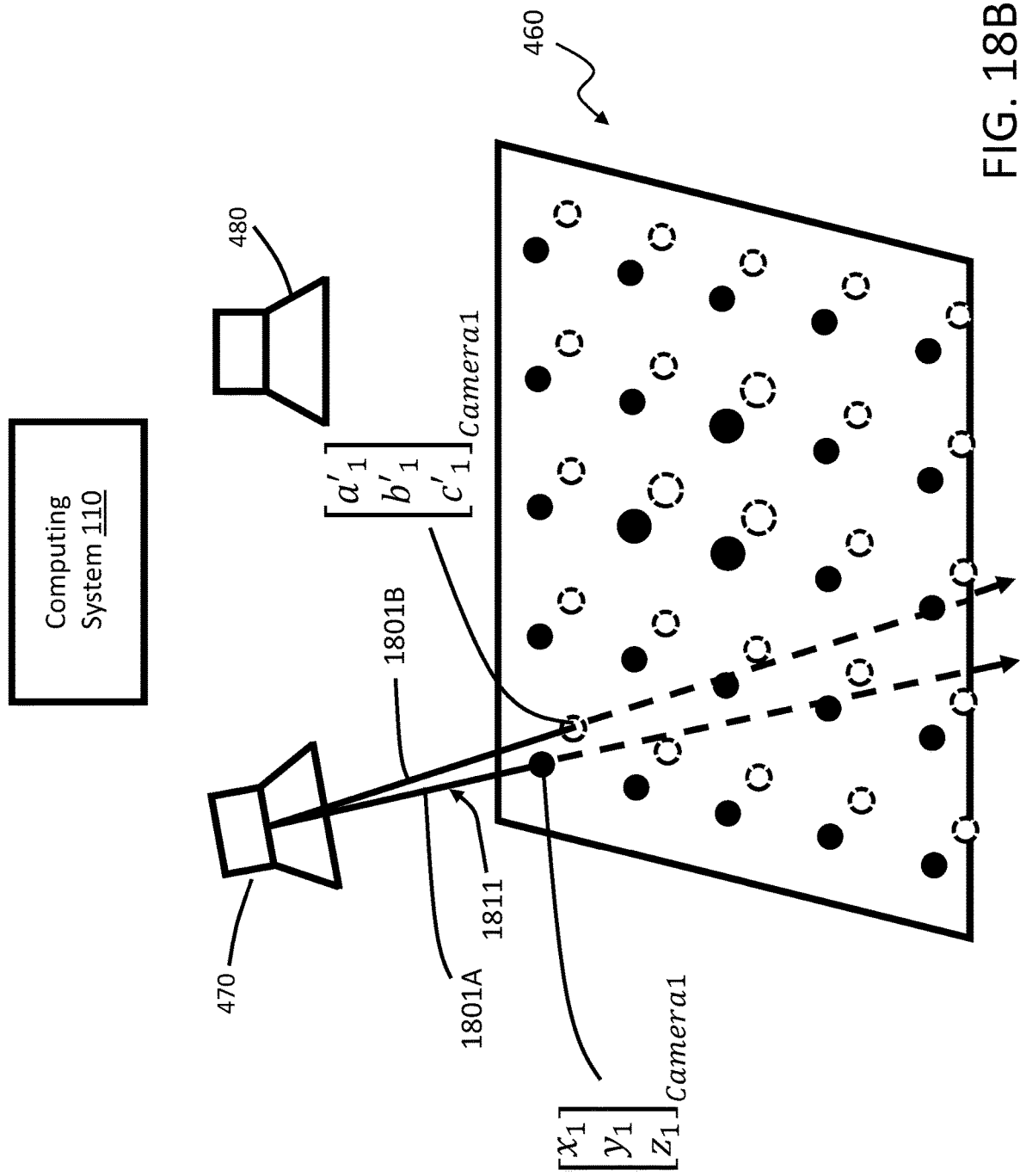

In an embodiment, step 1413 may involve determining an error parameter value that is a reconstruction error angle, which may have no dependence or less dependence on a distance between the a camera (e.g., 470) and a calibration pattern (e.g., 460) or other object being captured by the camera. More specifically, the error parameter value in such an embodiment may be based on values representing respective angles formed between respective pairs of imaginary lines that extend from a location associated with the first camera (e.g., 470) to the first plurality of 3D coordinates and the additional plurality of 3D coordinates. Each of the pairs of imaginary lines may include a first imaginary line that extends to one of the first plurality of 3D coordinates, and include a second imaginary line that extends to a corresponding one of the plurality of transformed coordinates, or more specifically the additional plurality of 3D coordinates. For instance, FIGS. 18A and 18B depict a first angle 1811 formed between a first pair of imaginary lines 1801A, 1801B. More particularly, the first pair of imaginary lines may include a first imaginary line 1801A that extends from the first camera 470 to a 3D coordinate $[X_1 \ Y_1 \ Z_1]^T{}_{Camera1}$ of the first plurality of 3D coordinates, and include a second imaginary line that extends from the first camera 470 to a corresponding 3D coordinate $[a'_1 \ b'_1 \ c'_1]^T$ of the additional plurality of 3D coordinates. In some cases, the first pair of imaginary lines may extend from a focal point of the first camera (e.g., 470).

Figure 18C:
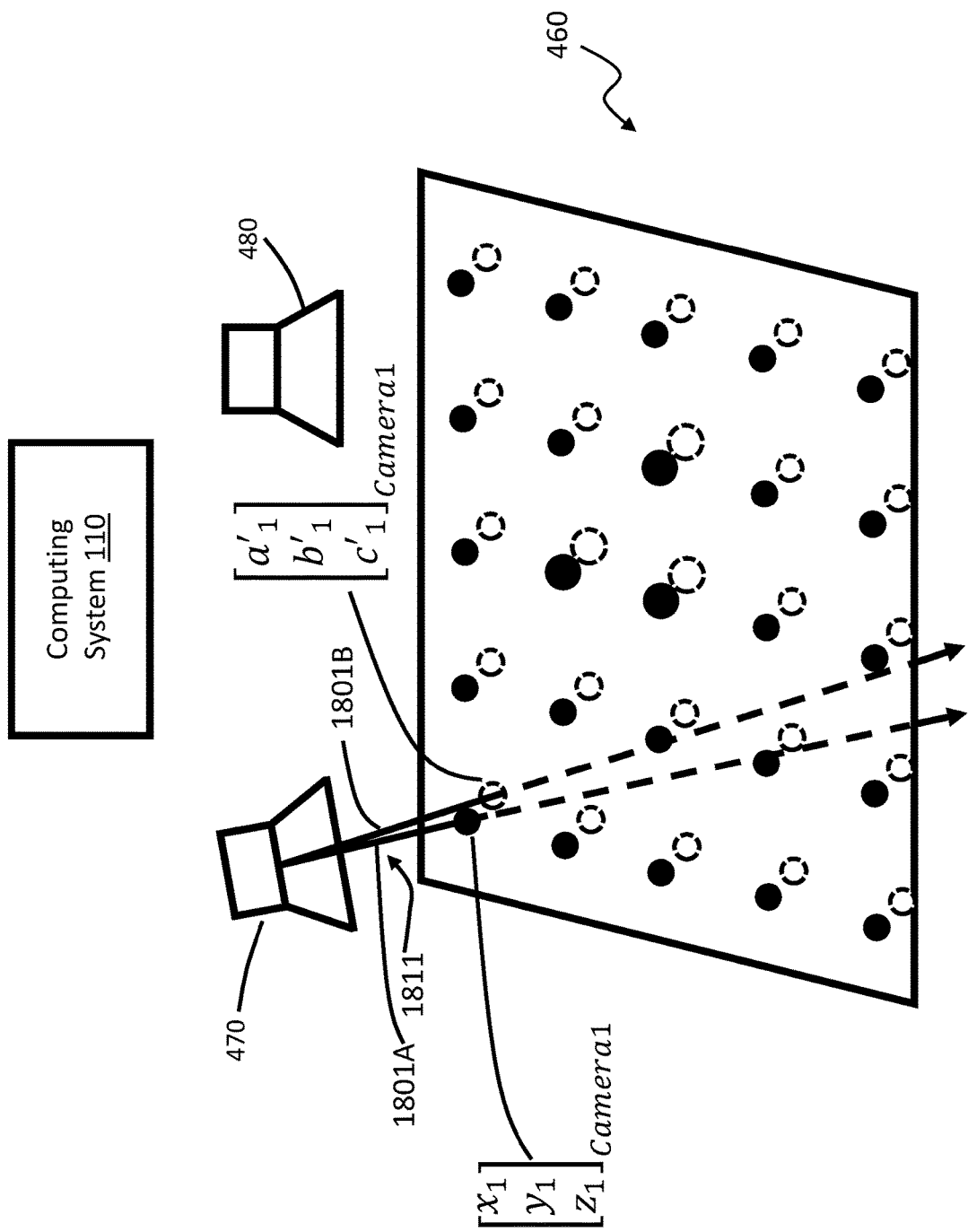

As stated above, the reconstruction error angle may have less dependence on a distance between the calibration pattern 460 and the first camera 470 and/or second camera 480. For instance, FIG. 18C illustrates a situation in which the calibration pattern 460 is moved closer to the first camera 470 relative to the scenario illustrated in FIG. 18B. In this example, the estimate of the transformation function may cause the transformed coordinate $[a'_1 \ b'_1 \ c'_1]^T{}_{Camera1}$ to become closer to a corresponding coordinate $[X_1 \ Y_1 \ Z_1]^T{}_{Camera1}$ to have a smaller offset. However, the reconstruction error angle 1811 may have a value that remains the same despite the change in distance between the scenario in FIGS. 18B and 18C.

Figure 18D:
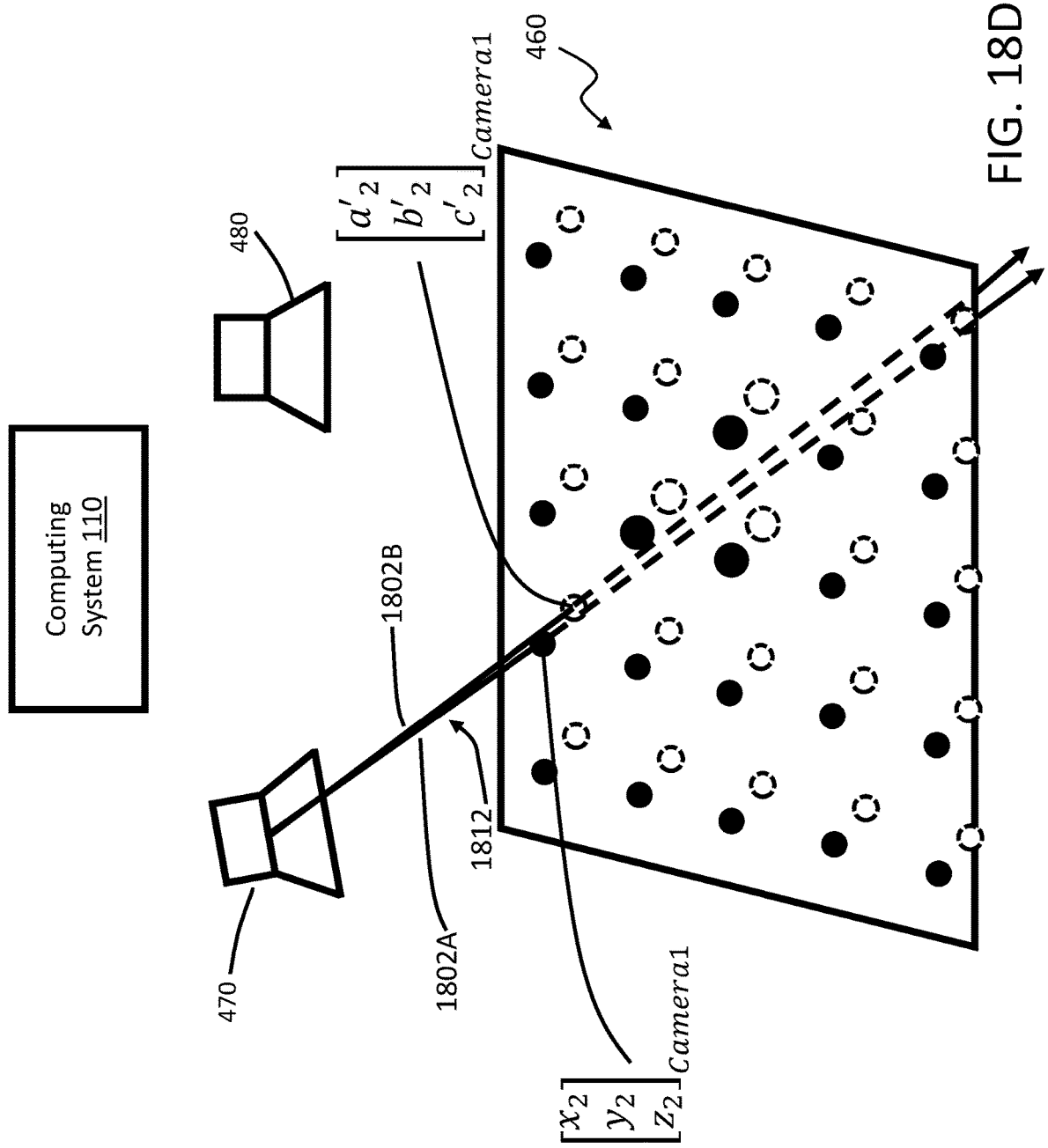

As another example of the reconstruction error angle, FIG. 18D illustrates a second angle 1812 formed between a second pair of imaginary lines 1802A, 1802B. The imaginary line 1802A may extend from the first camera 470 to another 3D coordinate $[X_2 \ Y_2 \ Z_2]^T{}_{Camera1}$ of the first plurality of 3D coordinates. The imaginary line 1802B may extend from the first camera 470 to another 3D coordinate $[a'_2 \ b'_2 \ c'_2]^T$ of the plurality of transformed coordinates. In some cases, the reconstruction error angle may be an angle value that is an average or other statistical measure of the respective angles (e.g., 1811, 1812, etc.) formed by the respective pairs of imaginary lines between the first plurality of 3D coordinates and the plurality of transformed coordinates.

Returning to FIG. 14, the method 1400 may in an embodiment include a step 1415 in which the computing system 110 updates the estimate of the transformation function based on the error parameter value to generate an updated estimate of the transformation function. For example, if the transformation function is a matrix which describes relative location and orientation between the first camera (e.g., 470) and the second camera (e.g., 480), step 1415 may use one of the optimization algorithms discussed above to adjust parameter values of the matrix so as to reduce the projection error, the reconstruction error, the reconstruction error angle, and/or some other error parameter value.

In an embodiment, the method 1400 may include a step 1417 in which the computing system 110 determines stereo calibration information that includes or is based on the updated estimate of the transformation function. For example, the stereo calibration information may be equal to the updated estimate of the transformation function.

In an embodiment, when an object other than the calibration pattern (e.g., 460) is in the first camera field of view (e.g., 410) and in the second camera field of view (e.g., 420), such as a package in a warehouse, the computing system 110 may be configured in a step 1417 to receive a first subsequent image generated by the first camera and a second subsequent image generated by the second camera. The method 1400 may further include a step 1419 in which the computing system 110 may be configured to determine object structure information for the object based on the first subsequent image, the second subsequent image, and the stereo calibration information.

In an embodiment, one or more steps of method 1400 may be omitted. For example, steps 1417 and 1419 may be omitted. In an embodiment, one or more steps from the method 1400 may be combined with one or more steps of the method 500. For example, in some cases the steps 501-513 may be performed to determine intrinsic camera calibration information associated with a camera (e.g., 470), and the intrinsic camera calibration may be used to determine the estimate of the transformation function in step 1405 and/or to transform the second plurality of coordinates into a second plurality of transformed coordinates in step 1411.

Concise Description of Various Embodiments

Embodiment A1 includes a computing system or a method performed by the computing system. The computing system in this embodiment comprises a communication interface configured to communicate with a camera having a camera field of view, and comprises a control circuit. The control circuit may execute the method (e.g., when executing instructions stored in a non-transitory computer-readable medium. In this embodiment, the control circuit is configured, when the camera has generated a calibration image for a calibration pattern in the camera field of view, and when the calibration pattern includes a plurality of pattern elements having respective defined pattern element coordinates in a pattern coordinate system, to perform camera calibration by: receiving the calibration image, the calibration image being an image representing the calibration pattern; determining a plurality of image coordinates for representing respective locations at which the plurality of pattern elements appear in the calibration image; determining, based on the plurality of image coordinates and the defined pattern element coordinates, an estimate for a first lens distortion parameter of a set of lens distortion parameters which describe lens distortion associated with the camera, wherein the estimate for the first lens distortion parameter is determined while estimating a second lens distortion parameter of the set of lens distortion parameters to be zero, or is determined without estimating the second lens distortion parameter; determining, after the estimate of the first lens distortion parameter is determined, an estimate for the second lens distortion parameter based on the estimate for the first lens distortion parameter; and determining camera calibration information that includes respective estimates for the set of lens distortion parameters, wherein the respective estimates for the set of lens distortion parameters includes or are based on the estimate for the first lens distortion parameter and the estimate for the second lens distortion parameter. In this embodiment, the control circuit is further configured, when the communication interface is in communication with the camera and with a robot, to receive a subsequent image generated by the camera after the camera calibration has been performed, and to generate a movement command for controlling robot movement, wherein the movement command is based on the subsequent image and based on the camera calibration information.

Embodiment A2 includes the computing system of embodiment A1, wherein the control circuit is configured to determine the estimate for the first lens distortion parameter while estimating all other lens distortion parameters of the set of lens distortion parameters to be zero, or is configured to determine the estimate for the first lens distortion parameter without estimating any other lens distortion parameter of the set of lens distortion parameters.

Embodiment A3 includes the computing system of embodiment A1 or A2, wherein the first lens distortion parameter describes a first type of lens distortion associated with the camera, and the second lens distortion parameter describes a second type of lens distortion associated with the camera.

Embodiment A4 includes the computing system of embodiment A3, wherein the first type of lens distortion is radial lens distortion, and the second type of lens distortion is tangential lens distortion.

Embodiment A5 includes the computing system of embodiment A1 or A2, wherein the first lens distortion parameter and the second lens distortion parameter describes a same type of lens distortion associated with the camera.

Embodiment A6 includes the computing system of embodiment A5. In this embodiment, the set of lens distortion parameters include multiple lens distortion parameters that describe multiple respective radial polynomial components which are part of a model of radial lens distortion associated with the camera, and wherein the first lens distortion parameter is one of the multiple lens distortion parameters and describes a lowest-degree radial polynomial component among the multiple respective radial polynomial components.

Embodiment A7 includes the computing system of embodiment A6, wherein the set of lens distortion parameters include a third lens distortion parameter, wherein the third lens distortion parameter describes a highest-degree radial polynomial component among the multiple respective radial polynomial components. In this embodiment, the estimate for the second lens distortion parameter is determined based on the estimate for the first lens distortion parameter, and is determined while estimating the third lens distortion parameter to be zero, or without estimating the third lens distortion parameter.

Embodiment A8 includes the computing system of embodiment A7, wherein the estimate for the first lens distortion parameter is a first estimate thereof, and is determined during a first camera calibration stage, and wherein the estimate for the second lens distortion parameter is determined during a subsequent camera calibration stage that follows the first camera calibration stage. In this embodiment, the set of lens distortion parameters include the third lens distortion parameter and a subset having other lens distortion parameters of the set. Further, the control circuit is configured, during the subsequent camera calibration stage, to estimate lens distortion parameters of the subset of lens distortion parameters while estimating the third lens distortion parameter to be zero, or without estimating the third lens distortion parameter. Additionally, the estimating of lens distortion parameters of the subset includes determining the estimate of the second lens distortion parameter and determining a second estimate of the first lens distortion parameter.

Embodiment A9 includes the computing system of any one of embodiments A1-A8, wherein the camera calibration information describes a set of projection parameters that describe camera image projection associated with the camera, wherein the control circuit is configured: to determine respective estimates for the set of projection parameters; to determine, after the estimate for the first lens distortion parameter and the estimate for the second lens distortion parameter are determined, an updated estimate for the first lens distortion parameter and an updated estimate for the second lens distortion parameter based on the respective estimates for the set of projection parameters. In this embodiment, the updated estimate for the first lens distortion parameter and the updated estimate for the second lens distortion parameter are determined while the set of projection parameters are fixed in value at the respective estimates thereof.

Embodiment A10 includes the computing system of embodiment A9, wherein the updated estimate of the first lens distortion parameter and the updated estimate of the second lens distortion parameter are determined with a curvature reduction stage in which the control circuit is configured to perform the following: (a) determining, for the curvature reduction stage, an initial estimate for the first lens distortion parameter and an initial estimate for the second lens distortion parameter based on the estimate of the first lens distortion parameter and based on the estimate of the second lens distortion parameter; (b) generating, based on the initial estimate of the first lens distortion parameter, on the initial estimate of the second lens distortion parameter, and on the calibration image, a modified version of the calibration image that compensates against the lens distortion associated with the camera, (c) determining an amount of curvature in the modified version of the calibration image, (d) adjusting the initial estimate of the first lens distortion parameter and the initial estimate of the second lens distortion parameter based on the amount of curvature in the modified version of the calibration image so as to generate an adjusted estimate for the first lens distortion parameter and an adjusted estimate for the second lens distortion parameter that reduce the amount of curvature, wherein the adjusted estimate for the first lens distortion parameter is the updated estimate thereof, and the adjusted estimate for the second lens distortion parameter is the updated estimate thereof. In this embodiment, the control circuit is configured to determine the camera calibration information based on the updated estimate of the first lens distortion parameter and the updated estimate of the second lens distortion parameter.

Embodiment A11 includes the computing system of embodiment A9 or A10, wherein the set of lens distortion parameters includes a third lens distortion parameter, wherein an estimate of the third lens distortion parameter is determined in the curvature reduction stage along with the updated estimate for the first lens distortion parameter and the updated estimate for the second lens distortion parameter. In this embodiment, the control circuit is configured, after the updated estimate of the first lens distortion parameter and the updated estimate of the second lens distortion parameter have been determined, to determine respective updated estimates for the set of projection parameters based on the updated estimate of the first lens distortion parameter, the updated estimate of the second lens distortion parameter, and the estimate of the third lens distortion parameter while fixing the estimate of the third lens distortion parameter in value at the estimate thereof.

Embodiment A12 includes the computing system of any one of embodiments A1-A11, wherein the set of lens distortion parameters include an additional lens distortion parameter other than the first lens distortion parameter and the second lens distortion parameter. In this embodiment, the control circuit is configured to: (a) determine an updated estimate for the first lens distortion parameter based on the estimate of the first lens distortion parameter and based on the estimate of the second lens distortion parameter, and (b) determine an estimate for the additional lens distortion parameter based on the updated estimate for the first lens distortion parameter, wherein the estimate for the additional lens distortion parameter is determined while the first lens distortion parameter is fixed in value at the updated estimate thereof.

Embodiment A13 includes the computing system of any one of embodiments A1-A12, wherein the camera with which the communication interface is configured to communicate is a first camera, wherein the calibration image is a first calibration image, and the camera field of view is a first camera field of view, and wherein the communication interface is further configured to communicate with a second camera having a second camera field of view. In this embodiment, the control circuit is configured, when the calibration pattern is or has been in the first camera field of view and in the second camera field of view, to: receive a second calibration image, wherein the second calibration image is a second image representing the calibration pattern and is generated by the second camera; determine an estimate of a transformation function for describing a spatial relationship between the first camera and the second camera; determine, based on the first calibration image, a first plurality of coordinates that describe respective locations of the plurality of the pattern elements relative to the first camera; determine, based on the second calibration image, a second plurality of coordinates that describe respective locations of the plurality of the pattern elements relative to the second camera; transform, based on the estimate of the transformation function, the second plurality of coordinates into a plurality of transformed coordinates that are relative to the first camera; determine an error parameter value that describes respective differences between the first plurality of coordinates and the plurality of transformed coordinates; and update the estimate of the transformation function based on the error parameter value to generate an updated estimate of the transformation function.

Embodiment A14 includes the computing system of embodiment A13. In this embodiment, the first plurality of coordinates are the plurality of respective image coordinates that represent respective locations at which the plurality of pattern elements appear in the first calibration image. In this embodiment, the plurality of transformed coordinates are an additional plurality of respective image coordinates representing the plurality of pattern elements, and wherein the control circuit is configured to determine the additional plurality of respective image coordinates based on the camera calibration information for describing calibration for the first camera.

Embodiment A15 includes the computing system of embodiment A13. In this embodiment, the first plurality of coordinates are a plurality of 3D coordinates for the pattern elements in a first camera coordinate system, which is a coordinate system for the first camera. In this embodiment, the plurality of transformed coordinates are an additional plurality of 3D coordinates for the pattern elements in the first camera coordinate system.

Embodiment A16 includes the computing system of embodiment A15. In this embodiment, the error parameter value is based on values representing respective distances between the first plurality of 3D coordinates and the additional plurality of 3D coordinates.

Embodiment A17 includes the computing system of embodiment A15. In this embodiment, the error parameter value is based on values representing respective angles formed between respective pairs of imaginary lines which extend from a location associated with the first camera, each of the respective pairs of imaginary lines have a respective first imaginary line extending to a respective 3D coordinate of the first plurality of 3D coordinates, and having a respective second imaginary line extending to a respective 3D coordinate of the additional plurality of 3D coordinates.

Embodiment B1 relates to a computing system or a method performed by the computing system. The method may be performed when, e.g., the computing system executes instructions stored on a non-transitory computer-readable medium. In this embodiment, the computing system comprises a communication interface configured to communicate with a first camera having a first camera field of view and a second camera having a second camera field of view, and comprises a control circuit. The control circuit is configured, when a calibration pattern having a plurality of pattern elements is or has been in the first camera field of view and in the second camera field of view, and when the first camera has generated a first calibration image for the calibration pattern, and the second camera has generated a second calibration image for the calibration pattern, to: receive the first calibration image, wherein the first calibration image is a first image representing the calibration pattern; receive a second calibration image, wherein the second calibration image is a second image representing the calibration pattern; determine an estimate of a transformation function for describing a spatial relationship between the first camera and the second camera; determine, based on the first calibration image, a first plurality of coordinates that describe respective locations of the plurality of the pattern elements relative to the first camera; determine, based on the second calibration image, a second plurality of coordinates that describe respective locations of the plurality of the pattern elements relative to the second camera; transform, based on the estimate of the transformation function, the second plurality of coordinates into a plurality of transformed coordinates that are relative to the first camera; determine an error parameter value that describes respective differences between the first plurality of coordinates and the plurality of transformed coordinates; update the estimate of the transformation function based on the error parameter value to generate an updated estimate of the transformation function; and determine stereo calibration information that includes or is based on the updated estimate of the transformation function. In this embodiment, the control circuit is further configured, when an object other than the calibration pattern is in the first camera field of view and in the second camera field of view, to receive a first subsequent image generated by the first camera and a second subsequent image generated by the second camera, and to determine object structure information representing the object based on the first subsequent image, the second subsequent image, and the stereo calibration information.

Embodiment B2 includes the computing system of embodiment B1. In this embodiment, the first plurality of coordinates are a first plurality of respective image coordinates for representing respective locations at which the plurality of pattern elements appear in the first calibration image. In this embodiment, when the communication interface is in or has been in communication with the first camera, the control circuit is configured to determine intrinsic camera calibration information that describes how locations in the first camera field of view are projected to an image plane for the first camera. Further in this embodiment, the plurality of transformed coordinates are an additional plurality of respective image coordinates representing the plurality of pattern elements, and wherein the control circuit is configured to determine the additional plurality of respective image coordinates based on the intrinsic camera calibration information.

Embodiment B3 includes the computing system of embodiment B1. In this embodiment, the first plurality of coordinates are a plurality of 3D coordinates representing the pattern elements in a first camera coordinate system, which is a coordinate system for the first camera. In this embodiment, the plurality of transformed coordinates are an additional plurality of 3D coordinates representing the pattern elements in the first camera coordinate system.

Embodiment B4 includes the computing system of embodiment B3. In this embodiment, the error parameter value is based on values representing respective distances between the first plurality of 3D coordinates and the additional plurality of 3D coordinates.

Embodiment B5 includes the computing system of embodiment B3. In this embodiment, the error parameter value is an angle value that is based on values representing respective angles formed between respective pairs of imaginary lines which extend from a location associated with the first camera, each of the respective pairs of imaginary lines have 1) a respective first imaginary line extending to a respective 3D coordinate of the first plurality of 3D coordinates, and 2) a respective second imaginary line extending to a respective 3D coordinate of the additional plurality of 3D coordinates.

Embodiment B6 includes the computing system of embodiment B5. In this embodiment, the location from which the respective pairs of imaginary lines extend is a focal point for the first camera.

Embodiment B7 includes the computing system of any one of embodiments B1-B6. In this embodiment, the transformation function is a transformation matrix that describes a relative location and relative orientation between the first camera and the second camera, and wherein updating the estimate of the transformation function includes updating the transformation matrix to reduce the error parameter value.

Embodiment B8 includes the computing system of any one of embodiments B1-B7. In this embodiment, when the plurality of pattern elements of the calibration pattern have respective defined pattern element coordinates, the control circuit is configured to: determine, based on the first plurality of coordinates and the defined pattern element coordinates, an estimate for a first lens distortion parameter of a set of lens distortion parameters which describe lens distortion associated with the first camera, wherein the estimate for the first lens distortion parameter is determined while estimating a second lens distortion parameter of the set of lens distortion parameters to be zero, or is determined without estimating the second lens distortion parameter; determine, after the estimate of the first lens distortion parameter is determined, an estimate for the second lens distortion parameter based on the estimate for the first lens distortion parameter; and determine camera calibration information that describes calibration for the first camera and that includes respective estimates for the set of lens distortion parameters. In this embodiment, the respective estimates for the set of lens distortion parameters include or are based on the estimate for the first lens distortion parameter and the estimate for the second lens distortion parameter.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

The invention claimed is:

1. A computing system comprising:
a control circuit configured, to perform a calibration operation by:
receiving a calibration image of a calibration pattern, the calibration pattern including a plurality of pattern elements each having defined pattern element coordinates in a pattern coordinate;
determining a plurality of image coordinates, each image coordinate representing a respective location at which a corresponding pattern element appears in the calibration image;
determining, based on the plurality of image coordinates and the defined pattern element coordinates, an estimate of a parameter of a first distortion model;
determining an estimate of a parameter of a second distortion model using the estimate of the parameter of the first distortion model as an estimate for at least one parameter of the second distortion model; and
determining calibration information based on the second distortion model including the estimate of the parameter of the second distortion model,
wherein the control circuit is further configured to receive a subsequent image after the calibration operation has been performed, and to generate instructions for causing movement of a robot, wherein the instructions are based on the subsequent image and based on the calibration information.

2. The computing system of claim 1, wherein the control circuit is configured to determine the estimate of the parameter of the first distortion model while estimating all other parameters of the first distortion model to be zero, or is configured to determine the estimate of the parameter of the first distortion model without estimating any other distortion parameter of the first distortion model.

3. The computing system of claim 1, wherein the parameter of the first distortion model describes a first type of distortion, and the parameter of the second distortion model describes a second type of distortion.

4. The computing system of claim 3, wherein the first type of distortion is radial lens distortion, and the second type of distortion is tangential lens distortion.

5. The computing system of claim 1, wherein the parameter of the first distortion model and the parameter of the second distortion model describes a same type of lens distortion associated with a camera that captured the calibration image.

6. The computing system of claim 5, wherein the parameter of the first distortion model and the parameter of the second distortion model each describe a radial polynomial component which are part of a model of radial lens distortion associated with the camera, and wherein the parameter of the first distortion model describes a lower-degree radial polynomial component than the parameter of the second distortion model.

7. The computing system of claim 6, wherein the second distortion model includes a third parameter, wherein the third parameter describes a higher-degree radial polynomial component than the parameter of the second distortion model, and
wherein the estimate of the parameter of the second distortion model is determined while estimating the third parameter to be zero, or without estimating the third parameter.

8. The computing system of claim 7, wherein the estimate of the parameter of the first distortion model is a first estimate thereof, and is determined during a first calibration stage, and wherein the estimate of the parameter of the second distortion model is determined during a subsequent calibration stage that follows the first calibration stage,
wherein the second distortion model includes the third parameter and a subset of parameters,
wherein the control circuit is configured, during the subsequent calibration stage, to estimate the subset of parameters while estimating the third parameter to be zero, or without estimating the third parameter,
wherein the estimating the subset of parameters includes determining the estimate of the parameter of the second distortion model and determining a second estimate of the parameter of the first distortion model.

9. The computing system of claim 8, wherein the calibration information describes a set of projection parameters that describe camera image projection associated with a camera configured to generate the calibration image, wherein the control circuit is configured:
to determine respective estimates for the set of projection parameters; and
to determine, after the estimate of the parameter of the first distortion model and the estimate of the parameter of the second distortion model are determined, an updated estimate of the parameter of the second distortion model and another parameter of the second distortion model based on the respective estimates for the set of projection parameters, and
wherein the updated estimate of the parameter of the second distortion model and the other parameter of the second distortion model are determined while the set of projection parameters are fixed in value at the respective estimates thereof.

10. The computing system of claim 9, wherein the updated estimate of the parameter of the second distortion model and the other parameter of the second distortion model are determined with a curvature reduction stage in which the control circuit is configured to perform the following:
(a) determining, for the curvature reduction stage, an initial estimate of the parameter of the second distortion model based on the estimate of the parameter of the second distortion model;
(b) generating, based on the initial estimate of the parameter of the second distortion model, and on the calibration image, a modified version of the calibration image that compensates against the distortion,
(c) determining an amount of curvature in the modified version of the calibration image, and
(d) adjusting the initial estimate of the parameter of the second distortion model based on the amount of curvature in the modified version of the calibration image so as to generate an adjusted estimate of the parameter of the second distortion model that reduces the amount of curvature, wherein the adjusted estimate of the second distortion model is the updated estimate thereof, and
wherein the control circuit is configured to determine the calibration information based on the second distortion model including the updated estimate of the parameter of the second distortion model.

11. The computing system of claim 10, wherein an estimate of the third distortion parameter is determined in the curvature reduction stage along with the updated estimate of the parameter of the second distortion model, wherein the control circuit is configured, after the updated estimate of the parameter of the second distortion model has been determined, to determine respective updated estimates for the set of projection parameters based on the updated estimate of the parameter of the second distortion model and the estimate of the third parameter while fixing the estimate of the third parameter in value at the estimate thereof.

12. The computing system of claim 1, wherein the second distortion model includes an additional parameter,
wherein the control circuit is configured to:
(a) determine an updated estimate of another parameter of the second distortion model based on the estimate of the parameter of the second distortion model, and
(b) determine an estimate of the additional parameter based on the updated estimate of the other parameter of the second distortion model, wherein the estimate of the additional parameter is determined while the other parameter is fixed in value at the updated estimate thereof.

13. The computing system of claim 1, further comprising a communication circuit configured to communicate with a first camera, wherein the calibration image is a first calibration image captured by the first camera having a first camera field of view, and wherein the communication circuit is further configured to communicate with a second camera having a second camera field of view,
wherein the control circuit is configured to:
receive a second calibration image, wherein the second calibration image is a second image representing the calibration pattern and is generated by the second camera;
determine an estimate of a transformation function for describing a spatial relationship between the first camera and the second camera;
determine, based on the first calibration image, a first plurality of coordinates that describe respective locations of the plurality of pattern elements relative to the first camera;
determine, based on the second calibration image, a second plurality of coordinates that describe respective locations of the plurality of pattern elements relative to the second camera;
transform, based on the estimate of the transformation function, the second plurality of coordinates into a plurality of transformed coordinates that are relative to the first camera;
determine an error parameter value that describes respective differences between the first plurality of coordinates and the plurality of transformed coordinates; and
update the estimate of the transformation function based on the error parameter value to generate an updated estimate of the transformation function.

14. The computing system of claim 13, wherein the first plurality of coordinates are the plurality of respective image coordinates that represent respective locations at which the plurality of pattern elements appear in the first calibration image, and
wherein the plurality of transformed coordinates are an additional plurality of respective image coordinates representing the plurality of pattern elements, and wherein the control circuit is configured to determine the additional plurality of respective image coordinates based on the calibration information.

15. The computing system of claim 13, wherein the first plurality of coordinates are a first plurality of 3D coordinates for the pattern elements in a first camera coordinate system, which is a coordinate system for the first camera, and
wherein the plurality of transformed coordinates are an additional plurality of 3D coordinates for the pattern elements in the first camera coordinate system.

16. The computing system of claim 15, wherein the error parameter value is based on values representing respective distances between the first plurality of 3D coordinates and the additional plurality of 3D coordinates.

17. The computing system of claim 15, wherein the error parameter value is based on values representing respective angles formed between respective pairs of imaginary lines which extend from a location associated with the first camera, each of the respective pairs of imaginary lines have a respective first imaginary line extending to a respective 3D coordinate of the first plurality of 3D coordinates, and having a respective second imaginary line extending to a respective 3D coordinate of the additional plurality of 3D coordinates.

18. A non-transitory computer-readable medium having instructions thereon that, when executed by a control circuit of a computing system, causes the control circuit to:
receive a calibration image representing a calibration pattern, the calibration pattern having a plurality of pattern elements each having defined pattern element coordinates in a pattern coordinate system;
determine a plurality of image coordinates for representing respective locations at which each of the plurality of pattern elements appear in the calibration image;
determine, based on the plurality of image coordinates and the defined pattern element coordinates, an estimate of a parameter of a first distortion model;
determine, after the estimate of the parameter of the first distortion model is determined, an estimate of a parameter of a second distortion model using the estimate of the parameter of the first distortion model as an estimate for at least one parameter of the second distortion model; and determine calibration information based on the second distortion model including the estimate of the parameter of the second distortion model, receive a subsequent image generated after the calibration has been performed, and generate instruction for causing movement of a robot, wherein the instruction is based on the subsequent image and based on the calibration information.

19. The non-transitory computer-readable medium of claim 18, wherein the instructions, when executed by the control circuit, further cause the control circuit to determine the estimate of the parameter of the first distortion model while estimating all other parameters of the first distortion model to be zero, or to determine the estimate of the parameter of the first distortion model without estimating any other parameter of the first distortion model.

20. A method performed by a computing system for camera calibration, comprising:

receiving a calibration image of a calibration pattern by the computing system, the calibration pattern having a plurality of pattern elements each with respective defined pattern element coordinates in a pattern coordinate system;

determining a plurality of image coordinates, each image coordinate for representing a respective location at which a corresponding pattern element appears in the calibration image;

determining, based on the plurality of image coordinates and the defined pattern element coordinates, an estimate of a first parameter of a first distortion model, wherein the estimate of the first parameter of the first distortion model is determined while estimating a second parameter of the first distortion model to be zero, or is determined without estimating the second parameter;

determining, after the estimate of the first parameter of the first distortion model is determined, an estimate of a parameter of a second distortion model based on the estimate of the first parameter of the first distortion model;

determining calibration information based on the second distortion model including the estimate of the parameter of the second distortion model; and receiving a subsequent image after the calibration has been performed, and generating instructions for causing robot movement, wherein the instruction is based on the subsequent image and based on the calibration information.

* * * * *